United States Patent
Hwang

(10) Patent No.: US 9,758,918 B2
(45) Date of Patent: *Sep. 12, 2017

(54) WASHING MACHINE

(71) Applicant: Dongbu Daewoo Electronics Corporation, Seoul (KR)

(72) Inventor: Ui Kun Hwang, Bucheon-si (KR)

(73) Assignee: Dongbu Daewoo Electronics Corporation, Seoul (KR)

(*) Notice: Subject to any disclaimer, the term of this patent is extended or adjusted under 35 U.S.C. 154(b) by 89 days.

This patent is subject to a terminal disclaimer.

(21) Appl. No.: 14/022,065

(22) Filed: Sep. 9, 2013

(65) Prior Publication Data

US 2014/0090427 A1   Apr. 3, 2014

(30) Foreign Application Priority Data

| Sep. 28, 2012 | (KR) | 10-2012-0108775 |
| Sep. 28, 2012 | (KR) | 10-2012-0108776 |
| Oct. 11, 2012 | (KR) | 10-2012-0113197 |
| Dec. 7, 2012 | (KR) | 10-2012-0141939 |
| Dec. 7, 2012 | (KR) | 10-2012-0141940 |

(51) Int. Cl.
| *D06F 39/10* | (2006.01) |
| *D06F 39/08* | (2006.01) |
| *D06F 39/12* | (2006.01) |
| *D06F 31/00* | (2006.01) |
| *D06F 37/22* | (2006.01) |
| *F16K 15/04* | (2006.01) |

(52) U.S. Cl.
CPC .............. *D06F 39/10* (2013.01); *D06F 31/00* (2013.01); *D06F 37/22* (2013.01); *D06F 39/081* (2013.01); *D06F 39/083* (2013.01); *D06F 39/088* (2013.01); *D06F 39/12* (2013.01); *D06F 39/125* (2013.01); *F16K 15/042* (2013.01)

(58) Field of Classification Search
None
See application file for complete search history.

(56) References Cited

U.S. PATENT DOCUMENTS 5,887,456 A * 3/1999 Tanigawa et al. ................ 68/20
7,237,569 B2 * 7/2007 Shieh ....................... 137/533.13
(Continued)

FOREIGN PATENT DOCUMENTS

| BE | EP 2594686 A1 * | 5/2013 | ............ D06F 39/12 |
| CN | 101578409 A | 11/2009 | |
| WO | WO 2011051184 A1 * | 5/2011 | |

OTHER PUBLICATIONS

Chinese Office Action dated Jul. 4, 2017 issued in corresponding Chinese Patent Application No. 201610362573.8 and English translation thereof.

*Primary Examiner* — Michael Barr
*Assistant Examiner* — Cristi Tate-Sims

(57) ABSTRACT

A washing machine includes a rear panel mounted on a wall; a tub supported by the rear panel and configured to contain wash water; a front panel having an opening therein and on or in front of the tub; a rotatable drum in the tub; a driving unit providing power to the drum; a cover on the rear panel so as to cover the tub and the front panel; a water supply device supplying wash water to the tub; and a drain device having a drain filter in a wash water discharge path, the drain filter being configured to filter foreign matter in the wash water.

5 Claims, 60 Drawing Sheets

(56) References Cited

U.S. PATENT DOCUMENTS

| | | | |
|---|---|---|---|
| 2007/0137265 A1* | 6/2007 | Shikamori et al. | 68/208 |
| 2008/0276657 A1* | 11/2008 | Kim et al. | 68/12.13 |
| 2010/0064736 A1 | 3/2010 | Jeong et al. | |
| 2011/0100071 A1* | 5/2011 | Mazzon | D06F 39/10 68/208 |
| 2012/0186306 A1* | 7/2012 | Kim | D06F 39/10 68/18 F |
| 2013/0139913 A1* | 6/2013 | Haeckel et al. | 137/512 |

* cited by examiner

WASHING MACHINE

CROSS-REFERENCES TO RELATED APPLICATIONS

The present application claims priority to Korean application number 10-2012-0108775, filed on Sep. 28, 2012, Korean application number 10-2012-0108776, filed on Sep. 28, 2012, Korean application number 10-2012-0113197, filed on Oct. 11, 2012, Korean application number 10-2012-0141939, filed on Dec. 7, 2012, and Korean application number 10-2012-0141940, filed on Dec. 7, 2012, each of which are incorporated by reference in its entirety.

BACKGROUND OF THE INVENTION

The present invention relates to a washing machine, and more particularly, to a washing machine which may be mounted on a wall surface.

A general wall-mounted drum washing machine includes a cabinet, a tub movably installed in the cabinet and containing water, a drum rotatably installed in the tub and housing laundry therein, a driving unit to provide power to the drum, a water supply device supplying wash water to the tub, and a drain device discharging wash water from the tub to the outside of the cabinet.

When a user puts laundry into the drum and starts a washing process, wash water is supplied into the tub and the drum by operation of the water supply device, and the washing process is started while the drum is rotated by operation of the driving unit.

After the washing process is ended, the wash water having been contained in the tub and the drum is discharged to the outside of the cabinet through the drain device by operation of the drain device.

The related art of the present invention is disclosed in Utility Model Registration Notification No. 20-0305578 published on Feb. 26, 2003 and titled "Wall-mounted Small Drum Washing Machine", and Utility Model Registration Notification No. 0304125 published on Jan. 30, 2003 and titled "Adaptor for connecting faucet with water supplying hose of washing machine".

SUMMARY OF THE INVENTION

Embodiments of the present invention are directed to a washing machine capable of effectively filtering foreign matter contained in wash water discharged to the outside of a tub of the washing machine.

Embodiments of the present invention are directed to a washing machine capable of simply removing foreign matter collected in a drain filter of the wash machine.

Embodiments of the present invention are directed to a washing machine capable of stably inducing wash water supplied from one supply pipe to a plurality of water supply hoses.

Embodiments of the present invention are directed to a washing machine capable of blocking a backflow of wash water at a plurality of points.

Embodiments of the present invention are directed to a washing machine capable of filtering a foreign matter having a large volume among the foreign matter in the wash water discharged from a tub.

In one embodiment, a washing machine includes: a rear panel mounted (or configured to be mounted) on a wall; a tub supported by the rear panel and containing (or configured to contain) wash water; a front panel on the tub, the front panel having an opening therein; a rotatable drum in the tub; a driving unit providing power to the drum; a cover on or in front of the rear panel covering the tub and the front panel; a water supply device configured to supply wash water to the tub; and a drain device in a wash water discharge path, having a drain filter configured to filter foreign matter in the wash water.

The drain filter may include a main body configured to communicate with a drain hole in the tub and having a bottom side opening to the outside of the cover; and a cap unit coupled to the opening at the bottom side of the main body and having a filter portion to filter foreign matter in the wash water passing through the main body.

The main body may include a tub connection portion connected to the tub and configured to communicate with the drain hole; a central portion having a hollow shape and connected to the bottom of the tub connection portion; an actuator installation portion connected to and/or communicating with one side of the central portion configured to receive an end portion of an actuator; a hose connection portion connected to and/or communicating with a rear surface of the actuator installation portion, such that the end portion of the actuator opens and closes a connection portion between the actuator installation portion and the hose connection portion; and a cap coupling portion having an open bottom side, configured to communicate with a bottom of the central portion, and coupled to the cap unit.

The cap unit may include a main body coupling portion rotatably coupled to the cap coupling portion, configured to cover an opening in the main body.

In another embodiment, the washing machine includes a rear panel configured to be mounted on a wall; a tub supported by the rear panel and configured to contain wash water; a front panel having an opening therein, on or in front of the tub; a rotatable drum in the tub; a driving unit providing power to the drum; a cover on the rear panel covering the tub and the rear panel; a water supply device configured to supply wash water to the tub; and a drain device having a drain filter in a wash water discharge path, configured to filter foreign matter in the wash water, and a filter cap detachably attached to the drain filter, an inside of which is opened/closed by detaching/attaching the drain filter.

The drain filter may include a main body to communicating with a drain hole in the tub, forming a flow path to discharge wash water outside of the rear panel or the cover, and having a bottom side exposed through the cover, the filter cap opening to expose the drain filter and closing to cover the drain filter.

The filter cap may include a main body coupling portion rotatably coupled to the main body and blocking or covering an opening in the main body; and a filter portion protruding at one side of the main body coupling portion, in the main body across a wash water flow path inside the filter main body, and configured to filter foreign matter in the wash water.

The filter cap may further include a depressed groove portion having a concave upward shape at a bottom side exposed through the cover; and a manipulation portion having a handle that protrudes in the depressed groove portion.

In another embodiment, a water supply hose connection device for a washing machine includes a water supply pipe connection unit in a water supply pipe, configured to supply wash water and having a connection portion at an end thereof; a diverging connection unit including a main flow path portion having one end contacting the water supply pipe connection unit and another end connected to a water supply hose of a main washing machine, a detachable assembling portion coupled to the one end of the main flow path portion and attached to or detached from the connection portion, and a diverging flow path portion diverging from the main flow path portion; and a sub hose connection unit having a valve unit connected to the diverging flow path portion and connected to a water supply hose of a sub washing machine.

The water supply hose connection device may further include a cap coupled to an end of the main flow path portion so as to block a flow of wash water through an end of the diverging connection unit.

The water supply hose connection device may further include a main hose connection unit having a main hose connection portion at an end of the main flow path portion and connected to a water supply hose of the main washing machine.

The sub hose connection unit may include a diverging connection portion connected to and/or communicating with the diverging flow path portion; a sub hose connection portion connected to and/or communicating with the diverging connection portion and connected to the water supply hose of the sub washing machine; and a valve installation portion between the diverging connection portion and the sub hose connection portion such that an end portion of the valve unit is in the valve installation portion.

In another embodiment, a washing machine includes a rear panel configured to be mounted on a wall surface; a tub supported by the rear panel and configured to contain wash water; a front panel on or in front of the tub, the front panel having an opening therein; a rotatable drum in the tub; a driving unit providing power to the drum; a cover covering the tub and the front panel; and a check valve between the cover and the tub, the check valve device including a first main body having an introduction hole configured to introduce wash water supplied from an external water supply source and having a first flow path portion therein, a second main body detachably coupled to the first main body and having a discharge hole configured to discharge wash water introduced from the first main body, and an opening/closing unit opening/closing the first flow path portion at a plurality of different points.

The first flow path portion may include a first opening/closing hole portion connected to the introduction hole; a first inclined hole portion connected to the first opening/closing hole portion and having an inner diameter which increases as a distance from the first opening/closing hole portion increases; a second opening/closing hole portion connected to the first inclined hole portion and having a larger inner diameter than the first opening/closing hole portion; and a second inclined hole portion connected to the second opening/closing hole portion and having an inner diameter which increases as a distance from the second opening/closing hole portion increases, wherein the opening/closing unit opens/closes the first and second opening/closing hole portions.

The opening/closing unit may include a first opening/closing unit having a spherical shape and an outer diameter larger than the first opening/closing hole portion and smaller than the second opening/closing hole portion; and a second opening/closing unit having a spherical shape and an outer diameter larger than the second opening/closing hole portion and smaller than the maximum outer diameter of the second opening/closing hole portion.

The washing machine may further include a sealing unit between the first and second main bodies so as to seal a gap between the first and second main bodies.

In another embodiment, a washing machine includes a housing; a tub in the housing and configured to contain wash water; a rotatable drum in the tub; a driving unit providing power to the drum; and a drain device connected to the tub and configured to filter foreign matter in wash water discharged from the tub, wherein the drain device includes a connection pipe unit connected to the tub configured to move wash water discharged from the tub; a drain motor unit configured to open and close the connection pipe unit to control a flow of wash water; and a drain hose unit connected to the connection pipe unit, having a wash water flow path configured to filter the foreign matter.

The connection pipe unit may include a tub connection portion connected to the tub; a central pipe portion connected to the tub connection portion; a bellows movement portion connected to the central pipe unit and coupled to the drain motor unit; and a discharge hole portion connected to the bellows movement portion and connected to the drain hose unit so as to discharge wash water to the drain hose unit. The drain motor unit includes a bellows portion to control a flow of the wash water inside the bellows movement portion, and the discharge hole potion has a maximum inner-diameter portion overlapping a section in which the bellows portion is inside the bellows movement portion.

The maximum inner-diameter portion of the discharge hole portion may be on the same line as the center of the section in which the bellows portion is inside the bellows movement portion.

The central pipe portion may have a central bump characterized by a difference in inner diameter from the bellows movement portion, and the bellows portion may be at the central bump.

DESCRIPTION OF SPECIFIC EMBODIMENTS

Hereinafter, exemplary embodiments of the present invention will be described in detail with reference to the accompanying drawings. The drawings are not necessarily to scale and in some instances, proportions may have been exaggerated in order to clearly illustrate features of various embodiments. Furthermore, terms to be used in this disclosure are defined in consideration of functions in the present invention, and may be defined differently depending on the intention or practice of a user or operator. Thus, the terms must be defined on the basis of the overall content of the disclosure.

Figure 1:
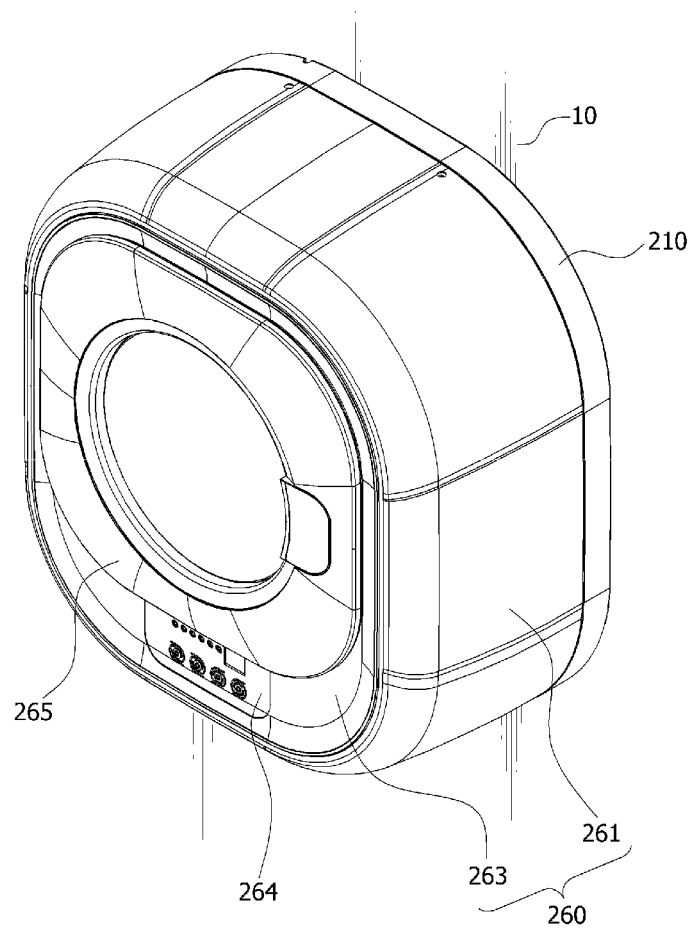
FIG. 1 is a front top perspective view of a washing machine in accordance with an embodiment of the present invention.
Figure 2:
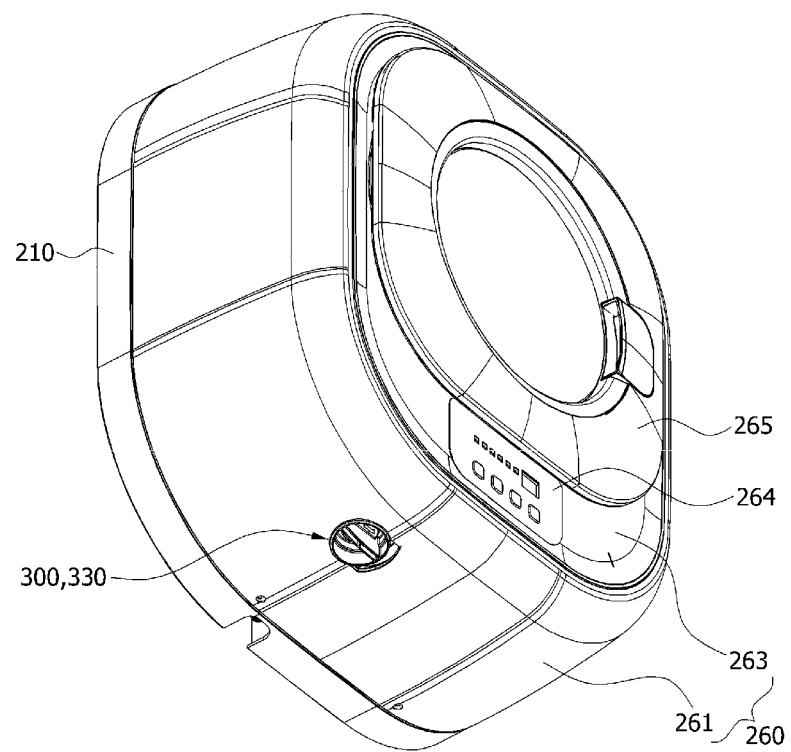
FIG. 2 is a front bottom perspective view of the washing machine in accordance with embodiment(s) of the present invention.
Figure 3:
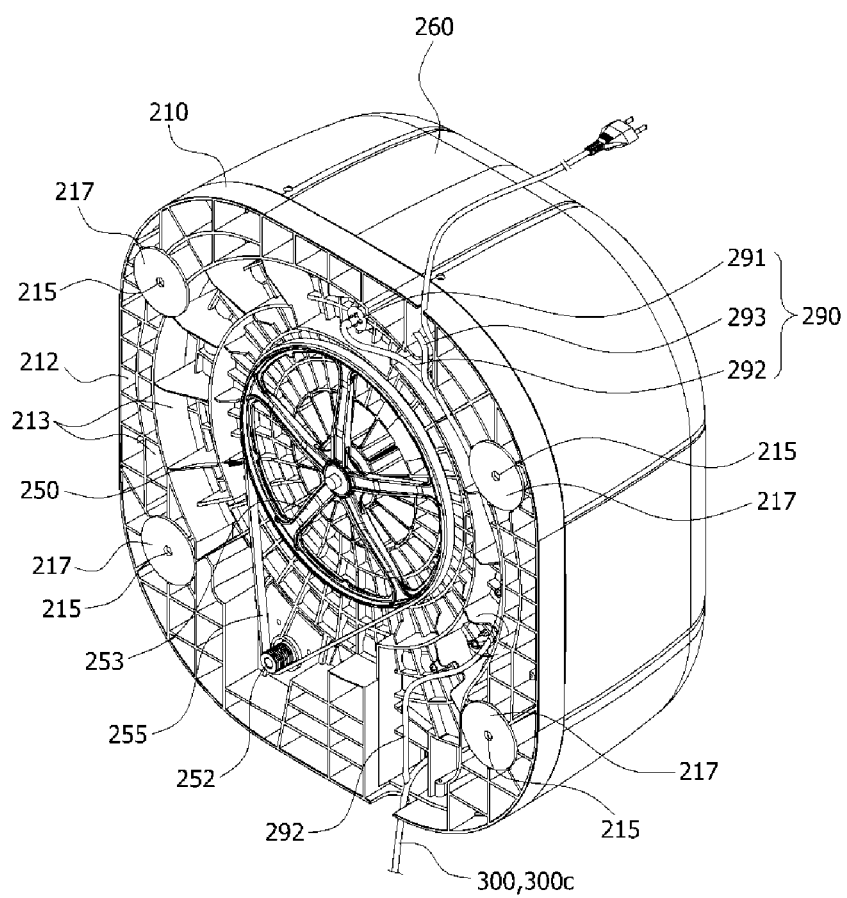
FIG. 3 is a rear perspective view of the washing machine in accordance with embodiment(s) of the present invention.
Figure 4:
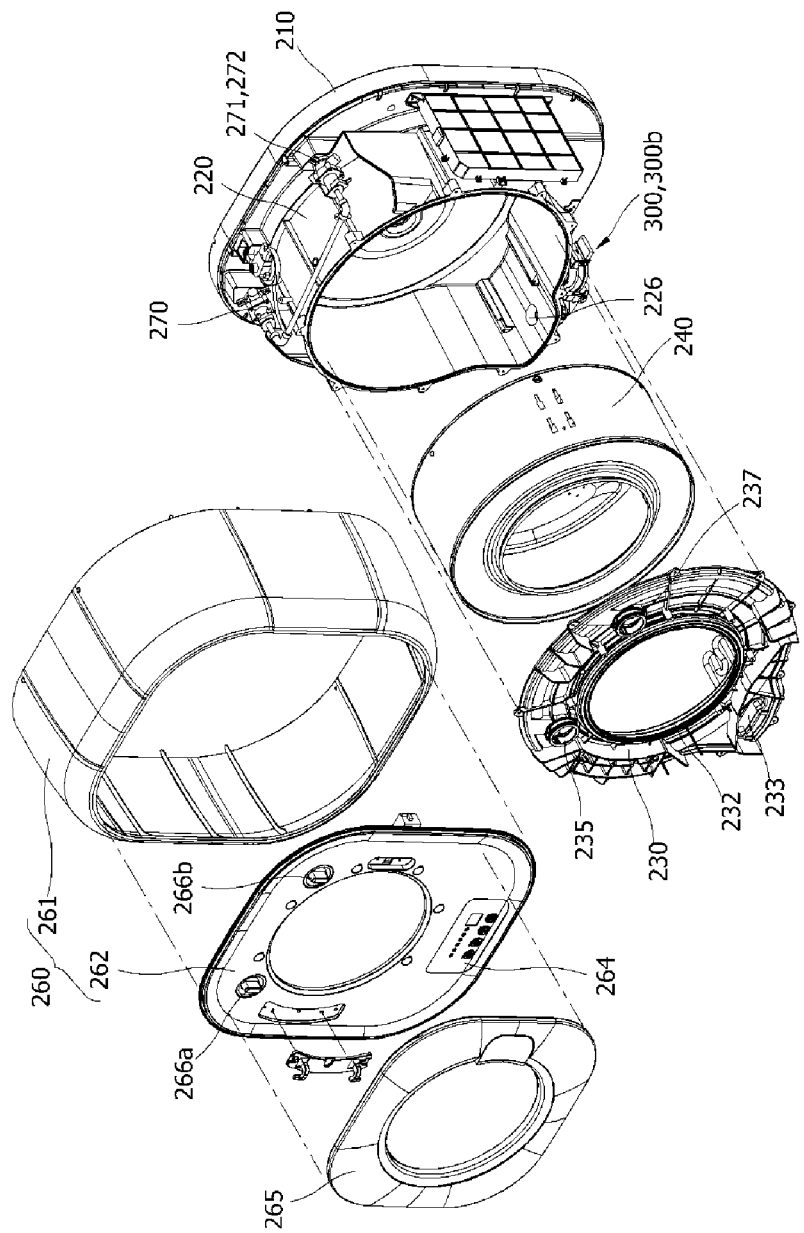
FIG. 4 is an exploded perspective view of the washing machine in accordance with embodiment(s) of the present invention.
Figure 5:
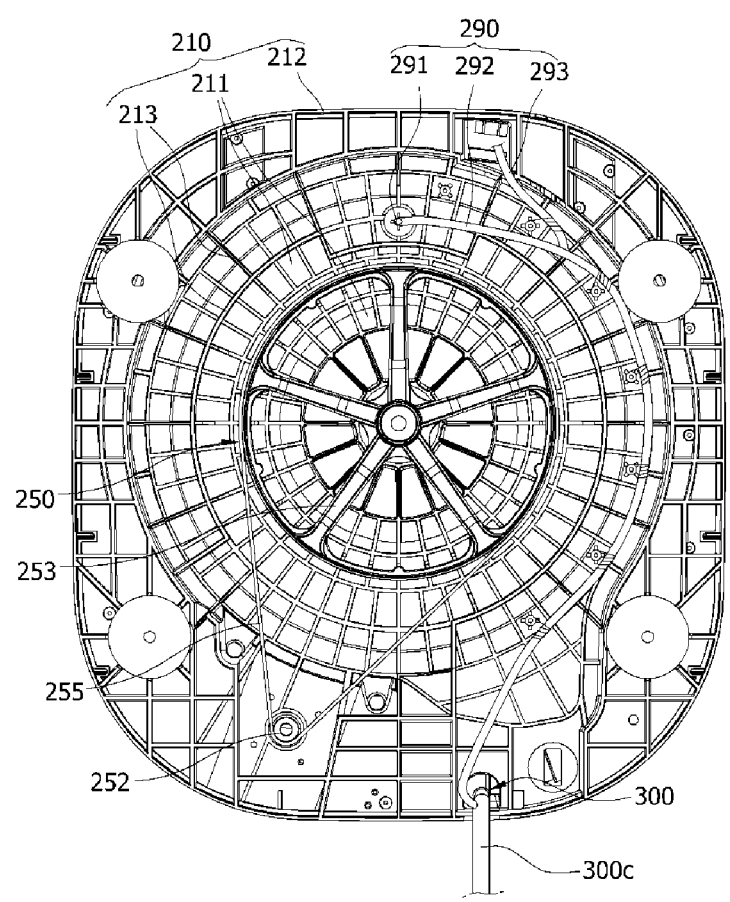
FIG. 5 is a rear view of the washing machine in accordance with embodiment(s) of the present invention.
Figure 6:
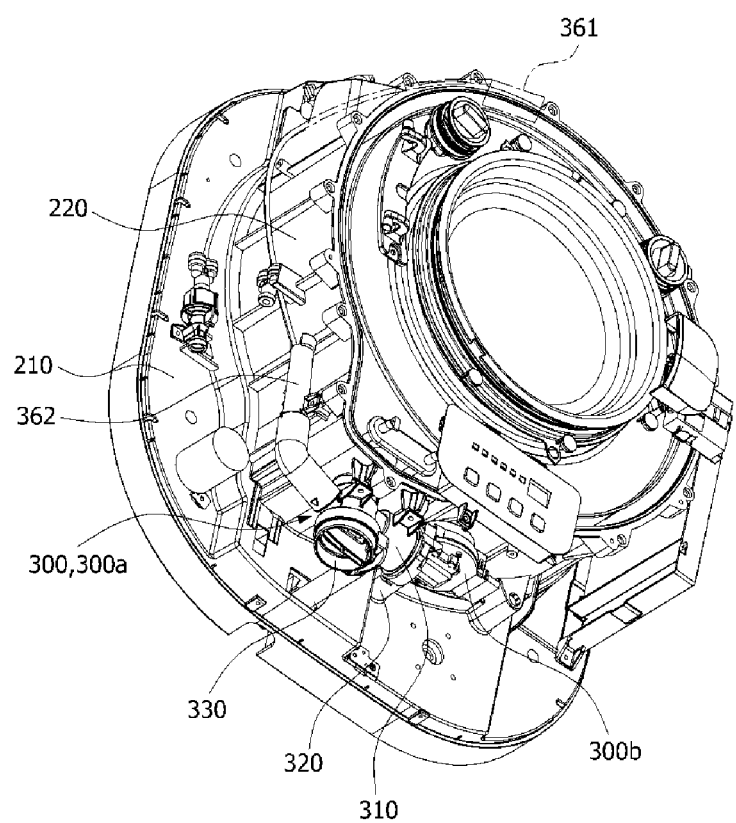
FIG. 6 is a perspective view for explaining an installation state of a drain device of the washing machine in accordance with embodiment(s) of the present invention.
Figure 7:
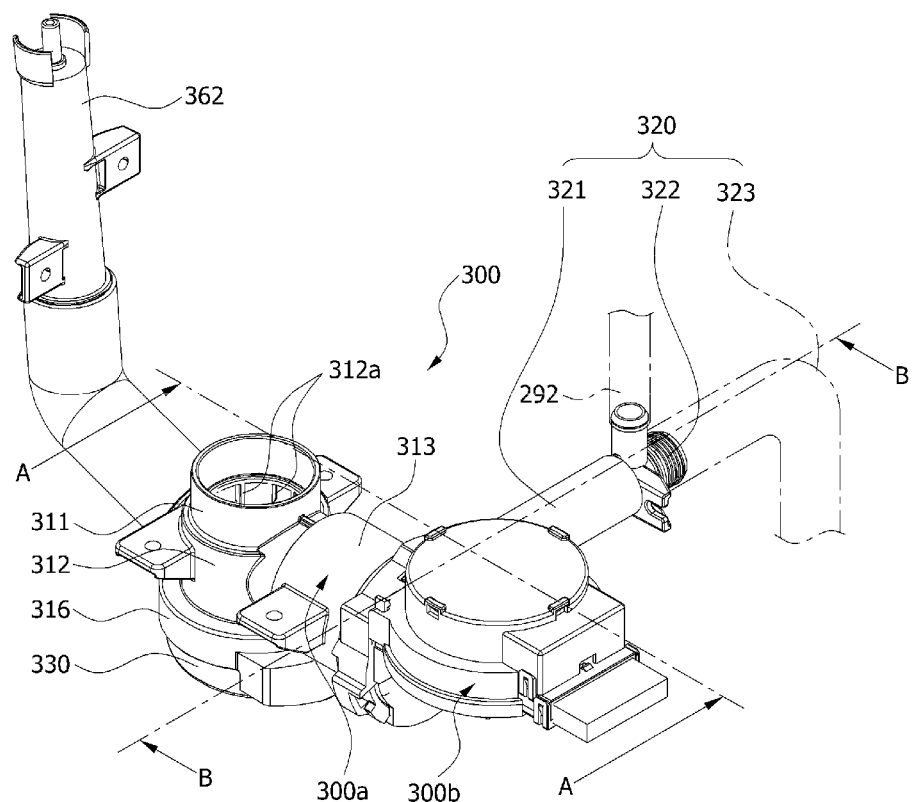
FIG. 7 is a top perspective view of the drain device of the washing machine in accordance with embodiment(s) of the present invention.
Figure 8:
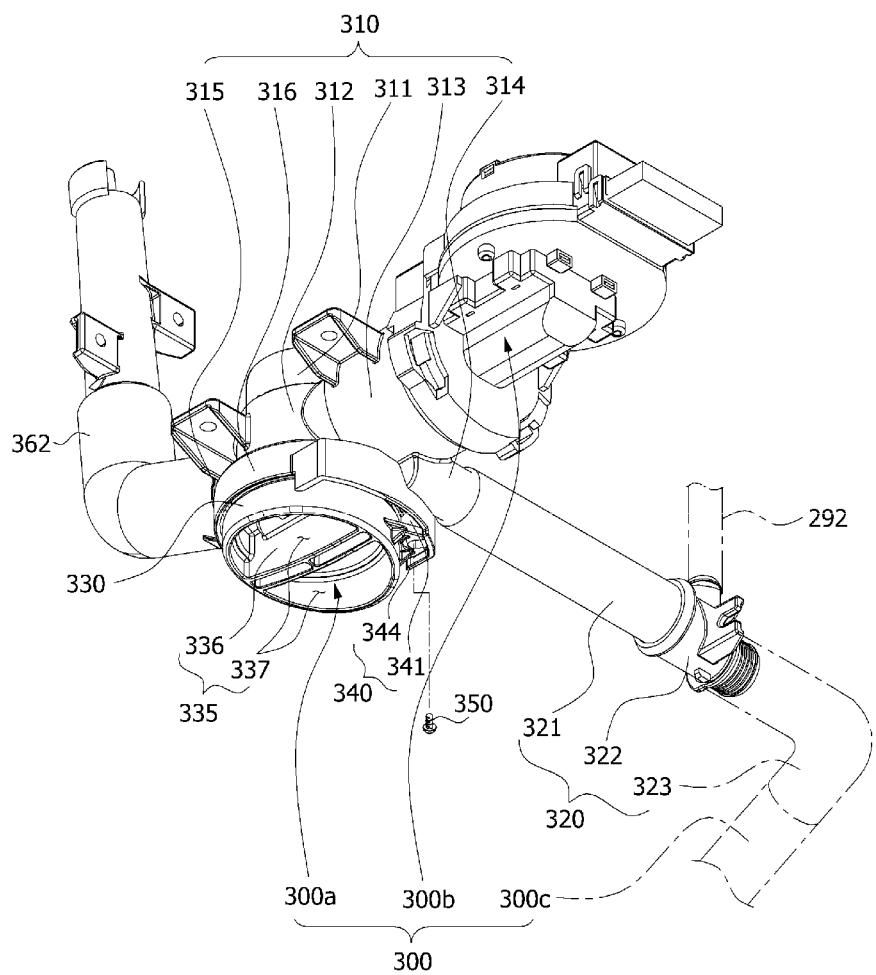
FIG. 8 is a bottom perspective view of the drain device of the washing machine in accordance with embodiment(s) of the present invention.
Figure 9:
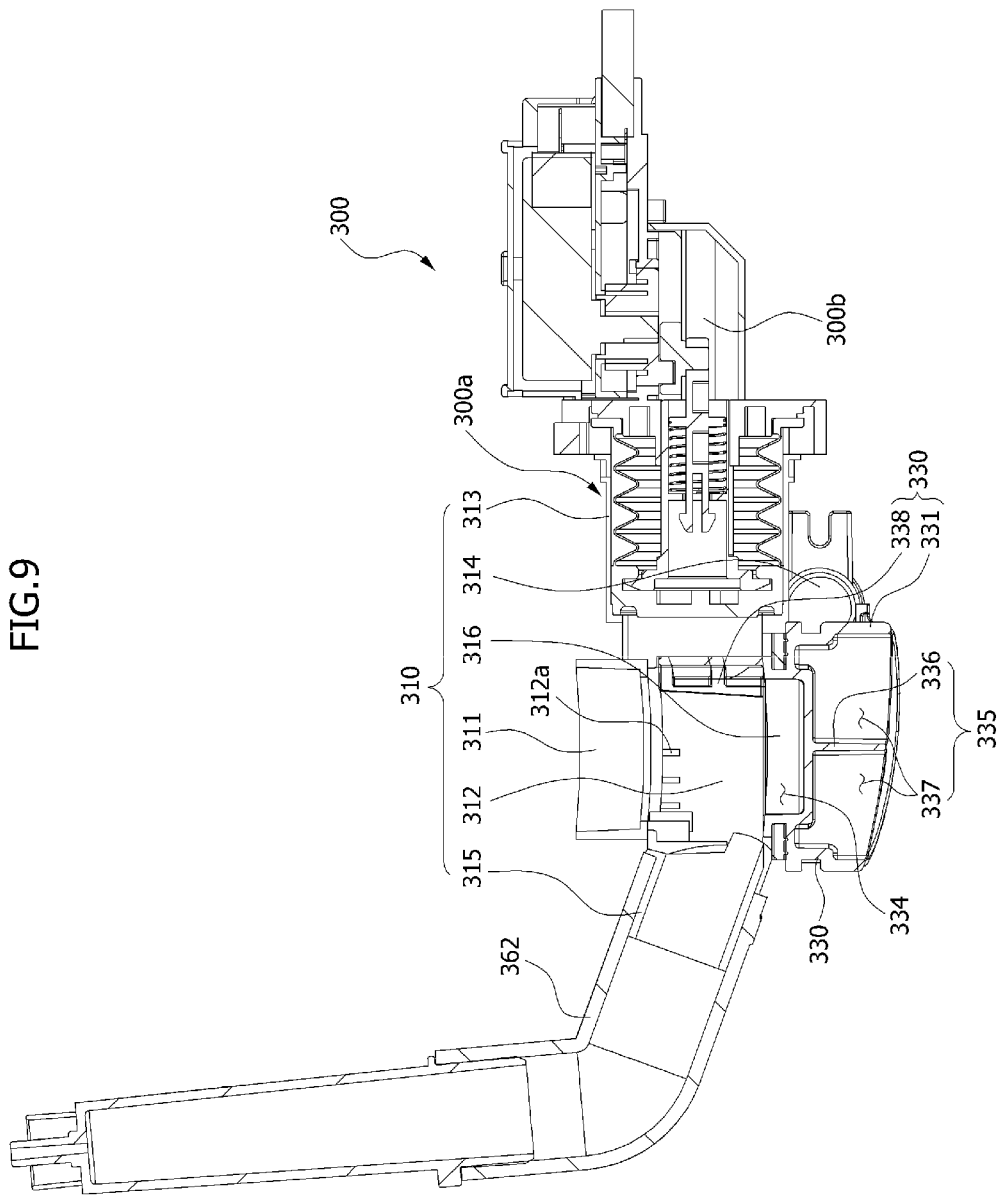
FIG. 9 is a cross-sectional view of the drain device of the washing machine in accordance with embodiment(s) of the present invention, taken along line A-A of FIG. 7.
Figure 10:
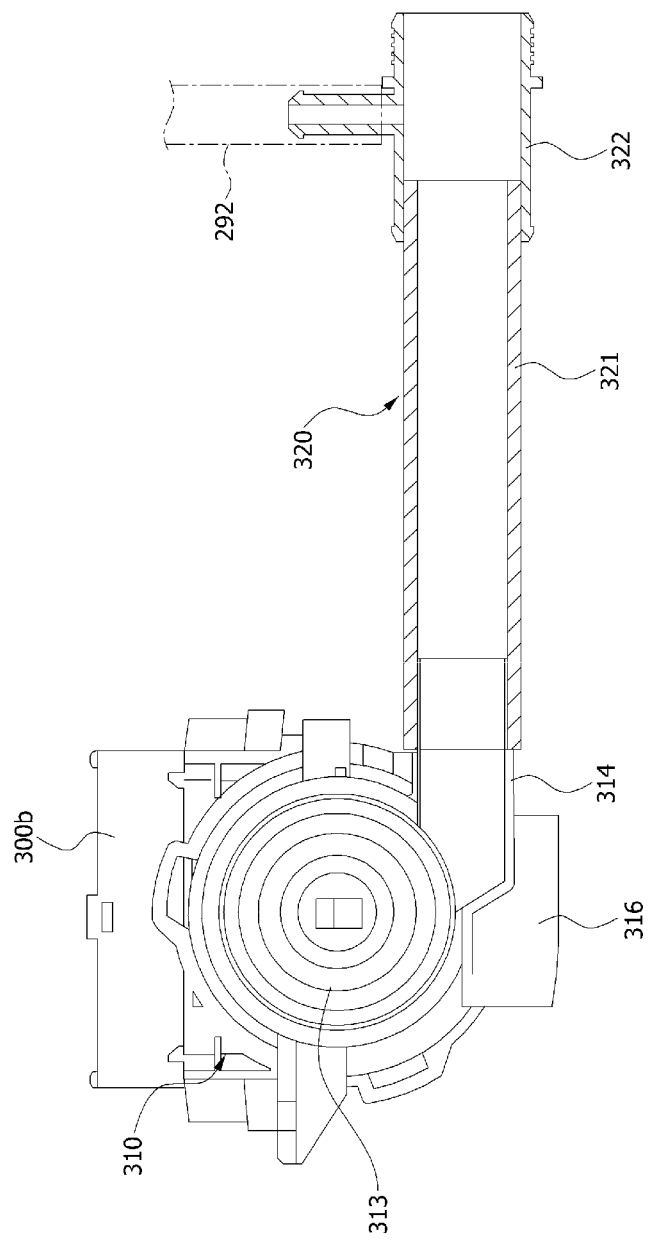
FIG. 10 is a perspective view of the drain device of the washing machine in accordance with embodiment(s) of the present invention, taken along line B-B of FIG. 7.
Figure 11:
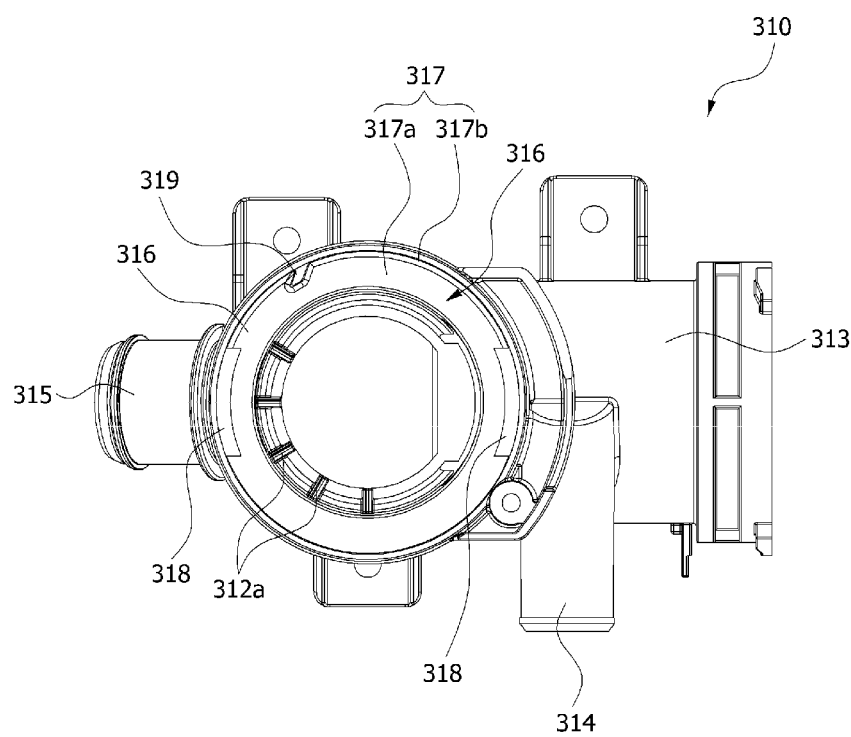
FIG. 11 is a bottom view of a filter main body of the washing machine in accordance with embodiment(s) of the present invention.
Figure 12:
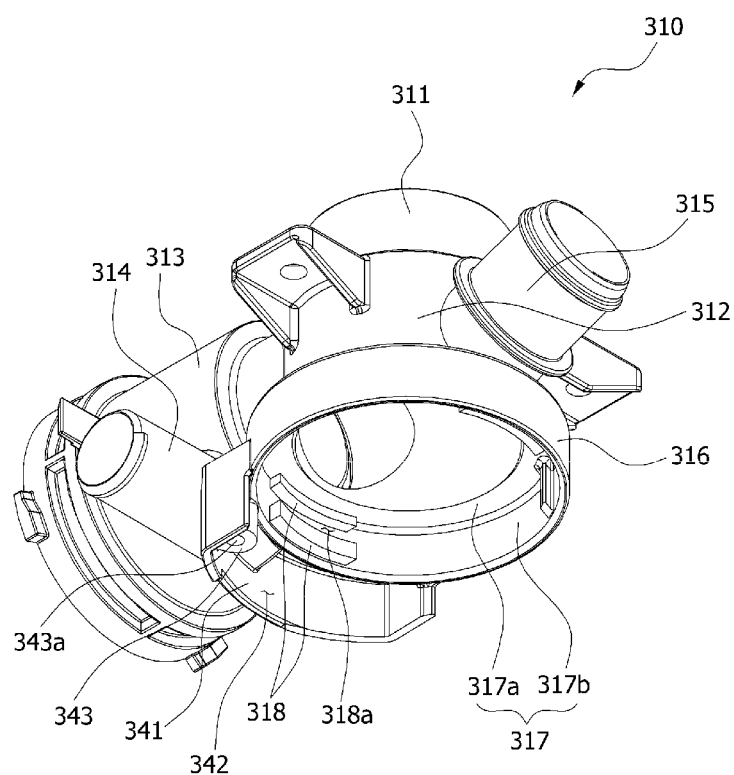
FIG. 12 is a left bottom perspective view of the filter main body of the washing machine in accordance with embodiment(s) of the present invention.
Figure 13:
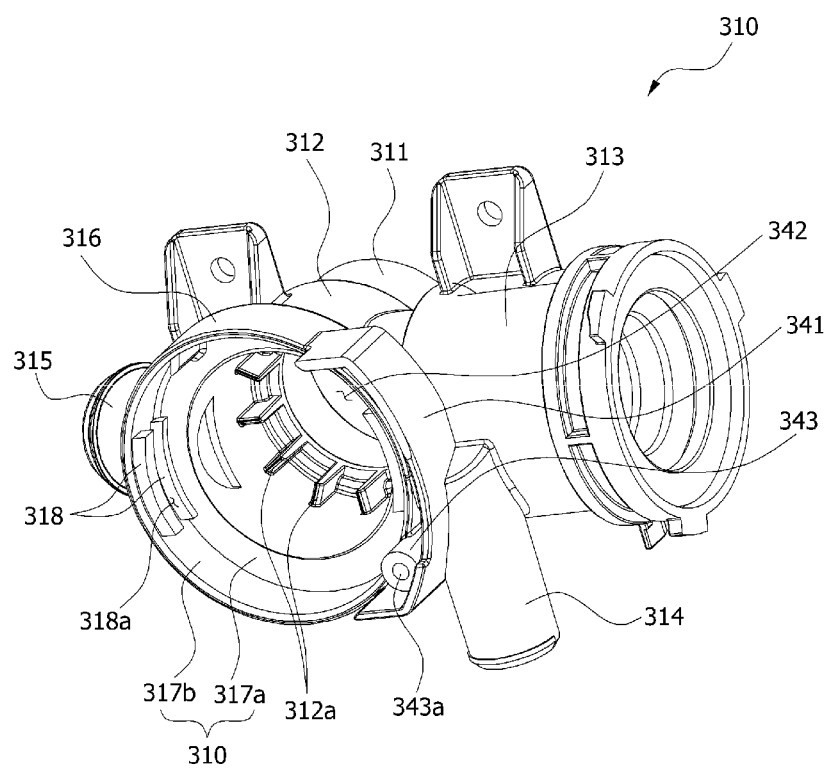
FIG. 13 is a right bottom perspective view of the filter main body of the washing machine in accordance with embodiment(s) of the present invention.
Figure 14:
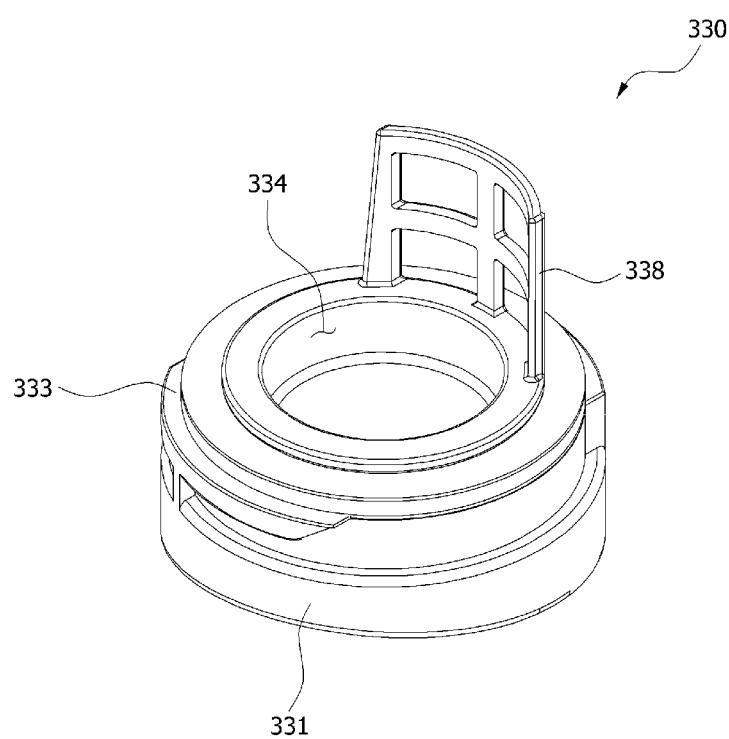
FIG. 14 is a left top perspective view of a filter cap unit of the washing machine in accordance with embodiment(s) of the present invention.
Figure 15:
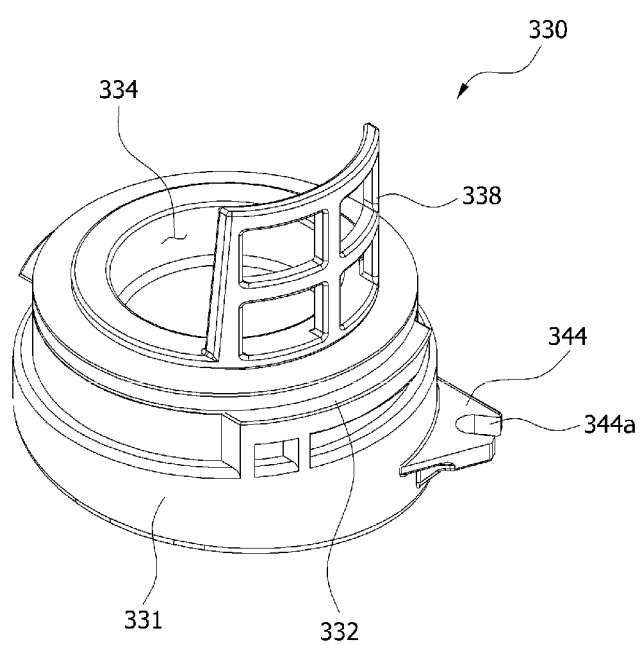
FIG. 15 is a right top perspective view of the filter cap unit of the washing machine in accordance with embodiment(s) of the present invention.
Figure 16:
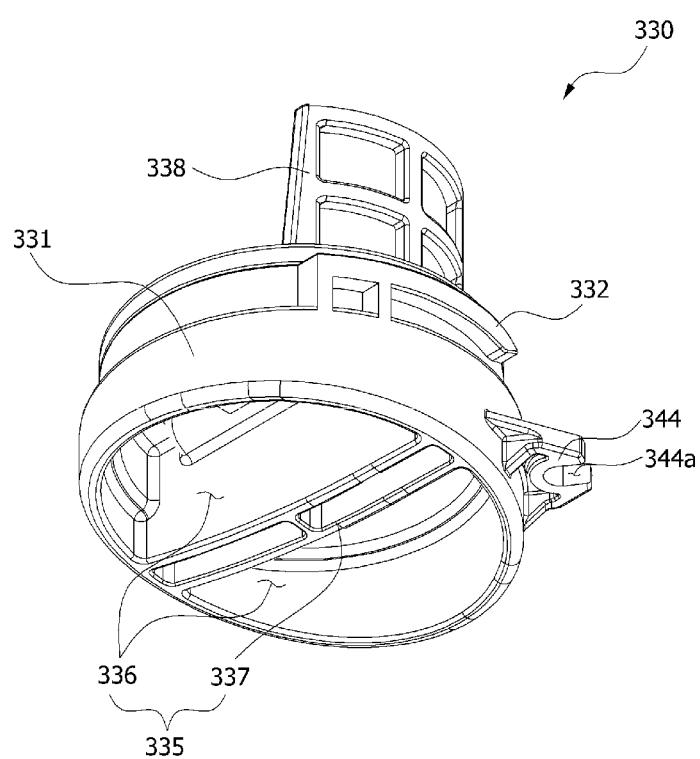
FIG. 16 is a bottom perspective view of the filter cap unit of the washing machine in accordance with embodiment(s) of the present invention.
Figure 17:
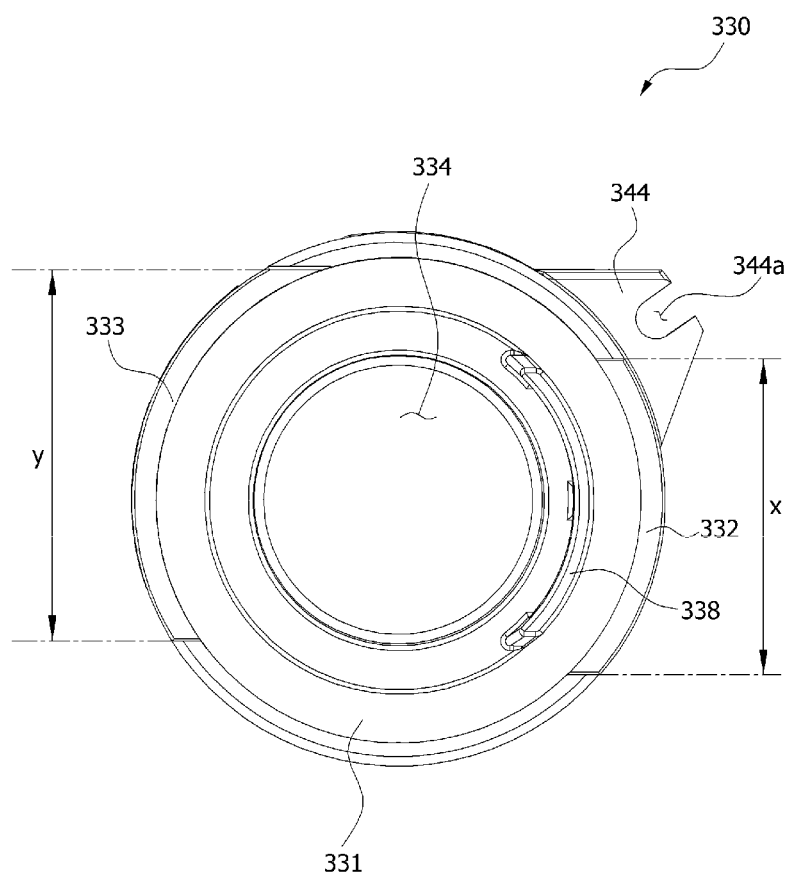
FIG. 17 is a plan view of the filter cap unit of the washing machine in accordance with embodiment(s) of the present invention.
Figure 18:
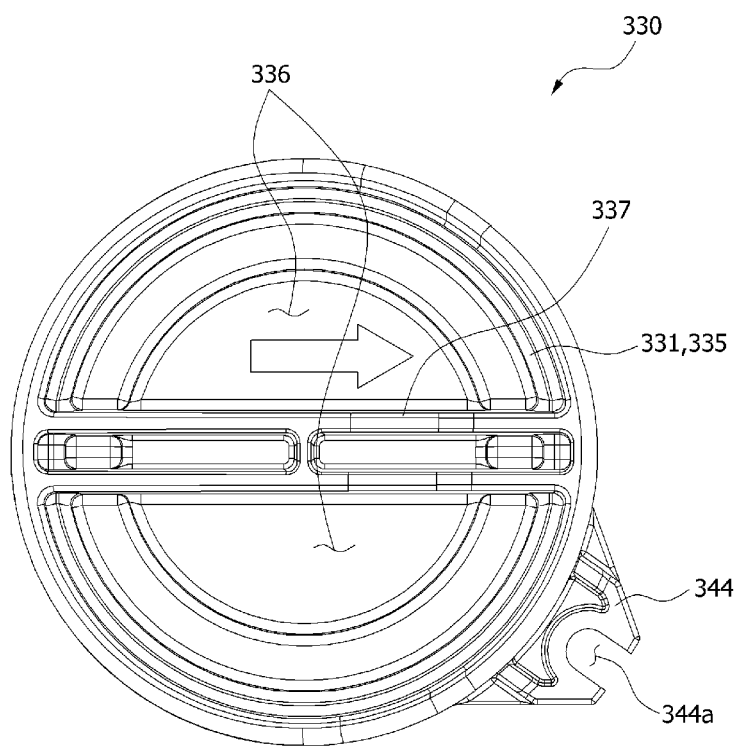
FIG. 18 is a bottom view of the filter cap unit of the washing machine in accordance with embodiment(s) of the present invention.

FIG. 1 is a front top perspective view of a washing machine in accordance with one or more embodiments of the present invention. FIG. 2 is a front bottom perspective view of the washing machine in accordance with embodiment(s) of the present invention. FIG. 3 is a rear perspective view of the washing machine in accordance with embodiment(s) of the present invention. FIG. 4 is an exploded perspective view of the washing machine in accordance with embodiment(s) of the present invention. FIG. 5 is a rear view of the washing machine in accordance with embodiment(s) of the present invention. FIG. 6 is a perspective view for explaining an installation state of a drain device of the washing machine in accordance with embodiment(s) of the present invention. FIG. 7 is a top perspective view of the drain device of the washing machine in accordance with embodiment(s) of the present invention. FIG. 8 is a bottom perspective view of the drain device of the washing machine in accordance with embodiment(s) of the present invention. FIG. 9 is a cross-sectional view of the drain device of the washing machine in accordance with embodiment(s) of the present invention, taken along line A-A of FIG. 7. FIG. 10 is a perspective view of the drain device of the washing machine in accordance with embodiment(s) of the present invention, taken along line B-B of FIG. 7. FIG. 11 is a bottom view of a filter main body of the washing machine in accordance with embodiment(s) of the present invention. FIG. 12 is a left bottom perspective view of the filter main body of the washing machine in accordance with embodiment(s) of the present invention. FIG. 13 is a right bottom perspective view of the filter main body of the washing machine in accordance with embodiment(s) of the present invention. FIG. 14 is a left top perspective view of a filter cap unit of the washing machine in accordance with embodiment(s) of the present invention. FIG. 15 is a right top perspective view of the filter cap unit of the washing machine in accordance with embodiment(s) of the present invention. FIG. 16 is a bottom perspective view of the filter cap unit of the washing machine in accordance with embodiment(s) of the present invention. FIG. 17 is a plan view of the filter cap unit of the washing machine in accordance with embodiment(s) of the present invention. FIG. 18 is a bottom view of the filter cap unit of the washing machine in accordance with embodiment(s) of the present invention.

Referring to FIGS. 1 to 5, the washing machine in accordance with one or more embodiments of the present invention includes a rear panel 210, a tub 220, a drum 240, a driving unit 250, a front panel 230, a cover 260, a water supply device 270, a drain device 300 and a ventilation device 290.

The rear panel 210 has a panel shape and is mounted and fixed on a wall 10 during use.

The rear panel 210 in accordance with embodiment(s) of the present invention has a rectangular panel shape of which the corners are rounded. However, the present invention is not limited thereto, and the rear panel 210 may be formed in various shapes such as rectangular, square, square with rounded corners, circular and elliptical.

The rear panel 210 includes a panel portion 211, a circumference portion 212, and a rib portion 213.

The panel portion 211 has a panel shape that extends in parallel to the wall 10.

The circumference portion 212 protrudes from the edge of the panel portion 211 toward the wall, and a space is formed between the panel portion 211 and the wall 10 by the circumference portion 212.

The rib portion 213 includes a plurality of ribs on a rear surface of the panel portion 211 in the space formed between the panel portion 211 and the wall 10.

Since the strength of the rear panel 210 is reinforced by the rib portion 213, deformation and/or damage to the rear panel 210 from vibrations generated by rotation of the drum 240 may be reduced, minimized or prevented.

The rear panel 210 has a through-hole 215 into which a fixing anchor coupled to the wall 10 is inserted, and a buffer member 217 is between the through-hole 215 and the wall 10.

The tub 220 is supported by the rear panel 210 and contains wash water.

In embodiment(s) of the present invention, the tub 220 having a cylindrical shape is integrally connected to the front surface of the rear panel 210, and protrudes forward from the front surface of the rear panel 210. For example, the tub 220 and rear panel 210 may be unitary, and formed simultaneously by a molding process such as injection molding.

The tub 220 has a drain hole 226 at the bottom thereof, and wash water within the tub 220 is discharged to the outside through the drain hole 226.

The rotatable drum 240 having a cylindrical shape is installed in the tub 220, and houses laundry therein.

The drum 240 has a rotatable driving shaft 243 installed in and/or through the rear panel 210, and the drum and/or driving shaft 243 are connected to a driving unit 250 installed on the rear panel 210 (e.g., the rear surface thereof) through the panel portion 211.

The driving unit 250 provides power to the drum 240.

The driving unit 250 in accordance with embodiment(s) of the present invention includes a motor, a driving wheel 253, and a belt 255.

The motor is installed on the front surface of the rear panel 210, and has a rotating shaft 252 extending to the rear surface of the rear panel 210 through the rear panel 210.

The rotatable driving wheel 253 is installed on the rear surface of the panel portion 211 in a space at the rear side of the panel portion 211, and connected to the driving shaft 243 of the drum 240.

The belt 255 transmits the power of the motor to the driving wheel 253.

Part of the belt 255 contacts the circumference of the rotating shaft 252, and another part of the belt 255 contacts the circumference of the driving wheel 253.

As the motor is driven, the torque of the motor is transmitted to the driving wheel 253 of the belt 255, and the drum 240 connected to the driving wheel 253 rotates to perform a washing operation.

The front panel 230 has an opening 232 provided at a position corresponding to an opening of the tub 220, and is installed on the front surface of the tub 220.

The front panel 230 includes a control unit 233 installed at the bottom thereof, and has a detergent box installation hole 235 and a conditioner box installation hole 237 at the top thereof.

The control unit 233 is connected to a manipulation unit 264 in a cover portion 263 of the cover 260, and controls water supplying, drainage, spin-drying, rotation of the drum 240 and the like according to manipulations of the manipulation unit 264 or performed by the manipulation unit 264.

The cover 260 is installed on the rear panel 210 so as to cover the tub 220 and the front panel 230, and forms the exterior of the wall-mounted drum washing machine in accordance with embodiment(s) of the present invention.

The cover 260 in accordance with embodiment(s) of the present invention includes a box portion 261 and the cover portion 263.

The box portion 261 is installed on the rear panel 210 so as to cover the circumference of the tub 220.

The cover portion 263 is coupled to a front surface of the box portion 261 so as to cover the front panel 230, and includes a door 265 installed at a position corresponding to the opening 232.

The cover portion 263 includes a manipulation unit 264 at the bottom thereof. The manipulation unit 264 includes manipulation buttons, a figure display device and the like, and is connected to the control unit 233.

The detergent box 266a and the conditioner box 266b are inserted and/or installed into the detergent box installation hole 235 and the conditioner installation hole 237, respectively, through the upper part of the cover portion 263.

The detergent box 266a and the conditioner box 266b may be rotationally manipulated to be coupled to the cover portion 263 or separated from the cover portion 263. When the detergent box 266a and the conditioner box 266b are separated from the cover portion 263, the detergent box 266a and the conditioner box 266b may be taken outside the cover portion 263 or inserted into the front panel 230.

The water supply device 270 is coupled to the top of the rear panel 210, and supplies washing water into the tub 220.

The water supply device 270 in accordance with embodiment(s) of the present invention includes a water supply valve 272 and a water supply pipe (not illustrated).

The water supply valve 272 controls a flow rate of washing water supplied into the tub 220 through the water supply pipe.

One side of the water supply valve 272 is coupled to the top of the rear panel 210 and connected to the water supply pipe, and another side of the water supply valve 272 is coupled to the tub 220 so as to supply the washing water received through the water supply pipe into the tub 220.

The water supply pipe is inserted into the circumference portion 212 from an external water supply source, and extends to the top of the rear panel 210 so as to be connected to the water supply valve 272.

The drain device 300 discharges wash water from the tub 220 to the outside of the wall-mounted drum washing machine 200 in accordance with embodiment(s) of the present invention, or specifically, to the outside of the cover 260 or the rear panel 210.

The drain device 300 includes a drain filter 300a which may filter foreign matter contained in the wash water and of which the inside may be opened or closed by respectively detaching or attaching a filter cap unit 330. The drain device 300, drain filter 300a and/or filter cap unit 330 may be in the wash water discharge path.

The drain device 300 in accordance with one or more embodiments of the present invention includes a drain filter 300a, an actuator 300b, and a drain hose 300c.

The drain filter 300a is coupled to the bottom of the tub 220 so as to communicate with the drain hole 226, and has a rear end connected to the drain hose 300c so as to face the rear panel 210.

The drain filter 300a serves to filter foreign matter contained in the wash water which is discharged to the outside of the tub 220 and then flows toward the drain hose 300c.

The actuator 300b controls a drain state of the wash water while opening/closing a flow path within the drain filter 300a.

The drain hose 300c is connected to the drain filter 300a, and extends to the outside of the washing machine through the rear panel 210.

The ventilation device 290 forms a flow path through which air flows to the inside or outside of the tub 220.

When wash water is supplied into the tub 220 through the water supply device 270, air stored in the tub 220 is discharged to the outside of the tub 220 in the same volume as the supplied wash water through the ventilation device 290.

When the wash water within the tub 220 is discharged through the drain device 300, air outside the tub 220 is introduced into the tub 220 in the same volume as the discharged wash water through the ventilation device 290.

Foam formed in the tub 220 by the detergent put into the tub 220 is also discharged to the outside of the tub 220 through the ventilation device 290.

The ventilation device 290 is connected to the drain device 300 such that the foam introduced from the tub 220 is discharged to the outside through the drain device 300.

The ventilation device 290 in accordance with embodiment(s) of the present invention includes an air discharge hole 291, a foam discharge pipe 292, and a ventilation pipe 293.

The air discharge hole 291 is at the top of the rear panel 210 so as to communicate with the inside of the tub 220.

Foam that exceeds the level of the air discharge hole 291 is discharged to the outside of the tub 220 through the air discharge hole 291.

The foam discharge pipe 292 connects the air discharge hole 291 to the drain filter 300a or the drain hole 300c.

One end of the foam discharge pipe 292 is connected to the air discharge hole 291, and another end of the foam discharge pipe 292 extends downward and connected to the drain filter 300a or the drain hose 300c.

The foam introduced to the air discharge hole 291 is moved toward the drain hose 300c through the foam discharge pipe 292, and then discharged to the outside of the rear panel 210 through the drain hose 300c.

The ventilation pipe 293 is connected to the foam discharge pipe 292 over a connection portion of the drain device 300.

Referring to FIGS. 7 to 10, the drain filter 300a in accordance with embodiment(s) of the present invention includes a filter main body 310, a hose connection unit 320, a filter cap unit 330, and a fixing unit 340, and is installed at the bottom of the tub 200 as illustrated in FIG. 6.

The filter main body 310 communicates with the drain hole 226 in the tub 220 (refer to FIG. 4), and forms a flow path to discharge wash water to the outside of the rear panel 210 or the cover 260.

The bottom of the filter main body 310 is opened or exposed to the outside of the cover 260, and the inside of the filter main body 310 is opened or closed according to whether the filter cap unit 330 is assembled or not.

The filter cap unit 330 is coupled to the opening at the bottom of the filter main body 310, and includes a filter portion 338 to filter foreign matter contained in the wash water passing through the filter main body 310.

Referring to FIGS. 11 to 13, the filter main body 310 in accordance with embodiment(s) of the present invention includes a tub connection portion 311, a central portion 312, an actuator installation portion 313, a hose connection portion 314, an air trap connection portion 315, and a cap coupling portion 316.

The tub connection portion 311, the central portion 312, the actuator installation portion 313 and the hose connection portion 314 form a stable path to discharge wash water within the tub 200 toward the rear panel 210.

The tub connection portion 311 is connected to the tub 220, and communicates with the drain hole 226.

The central portion 312 has a hollow shape and is connected to the bottom of the tub connection portion 311.

The central portion 312 includes a plurality of ribs 312a on the inner surface thereof, and the plurality of ribs 312a contact the filter portion 338 of the filter cap unit 330 when the filter cap unit 330 is assembled to the filter main body 310.

When the filter cap unit 330 is assembled to the filter main body 310, a user may insert the filter cap unit 330 into the filter main body 310 in an inappropriate direction (for example, the opposite direction to a direction illustrated in FIGS. 8 and 18). In this case, the filter portion 338 of the filter cap unit 330 may not be inclined, but stably rotated and moved to an assembling position (for example, the direction and position illustrated in FIGS. 8 and 18) when the filter portion 338 contacts the ribs 312a.

The actuator installation portion 313 is connected to and/or in communication with one side of the central portion 312, and an end of the actuator 300b is inserted and/or installed into the actuator installation portion 313.

The hose connection portion 314 is connected to and/or in communication with the rear surface of the actuator installation portion 313, and the connection (connection flow path) between the hose connection portion 314 and the actuator installation portion 313 is opened or closed through a linear motion of the end of the actuator 300b inserted into the hose connection portion 314.

The hose connection portion 314 is at the bottom of the actuator installation portion 313 and protrudes downward, so that wash water does not remain at the bottom of the actuator installation portion 313.

The wash water introduced into the actuator installation portion 313 is introduced into the hose connection portion 314 while flowing downward toward the bottom of the actuator installation portion 313, thereby preventing wash water from remaining at the bottom of the actuator installation portion 313.

The air trap connection portion 315 communicates with another side of the central portion 312, and is coupled to an air trap 362 which extends to a pressure sensor 361 installed at the top of the tub 220 (refer to FIG. 6) and forms an air pressure chamber in which the pressure increases in proportion to the water level of the tub 220.

The cap coupling portion 316 has an open bottom side and communicates with the bottom of the central portion 312, and the filter cap unit 330 is assembled with or affixed to the cap coupling portion 316.

Referring to FIGS. 11 to 13, the cap coupling portion 316 includes a groove portion 317, a pair of guide bumps 318, and an assembling protrusion 319.

The groove portion 317 includes a flange portion 317a contacting one surface of the filter cap unit 330 and a circumference portion 317b on the circumference of the flange portion 317a so as to protrude downward and contact the outer surface of the filter cap unit 330.

When the filter cap unit 330 is assembled with or affixed to the filter main body 310, a main body coupling portion 331 of the filter cap unit 330 contacts the flange portion 317a and the circumference portion 317b when the main body coupling portion 331 is inserted into the groove portion 317.

The pair of guide bumps 318 are on the groove portion 317 so as to protrude inward and form a slit 318a into which coupling portions 332 and 333 on the filter cap unit 330 are inserted while moving along a circular trace.

The assembling protrusion 319 has one or more spaces between the pair of guide bumps 318 facing each other.

Referring to FIGS. 7, 8 and 10, the hose connection unit 320 in accordance with embodiment(s) of the present invention includes an extension portion 321, a ventilation pipe connection portion 322, and a drain hose connection portion 323.

The hose connection unit 320 forms a flow path through which wash water of the filter main body 310 stably flows toward the drain hose 300c, and is connected to and/or in communication with the foam discharge pipe 292 of the ventilation device 290.

One side of the hose connection unit 320 is connected to the hose connection portion 314, and another side of the hose connection unit 320 extends toward the rear panel 210 and connected to the drain hose 300c.

One side of the extension portion 321 is connected to the hose connection portion 314, and another side of the extension portion 321 extends toward to the rear panel 210.

The ventilation pipe connection portion 322 having a T-shaped cross-section is connected to and/or in communication with the extension portion 321, and connected to the ventilation device 290 to discharge air within the tub 220.

The drain hose connection portion 323 having a bent shape (e.g., downward when the washing machine is mounted on a wall or other vertical surface) is connected to and/or in communication with a rear end of the ventilation pipe connection portion 322, and has a lower end connected to the drain hose 300c.

Referring to FIGS. 14 to 18, the filter cap unit 330 includes a main body coupling portion 331, a manipulation portion 335, and a filter portion 338.

The main body coupling portion 331 is coupled to the cap coupling portion 316 through rotational manipulation, and forms a cap to close or open the inside of the filter main body 310.

The main body coupling portion 331 includes the coupling portions 332 and 333 including first and second coupling portions 332 and 333 and a concave groove portion 334.

The first coupling portion 332 extends along the outer surface of the filter cap unit 330, between the guide bump 318 and the assembling protrusion 319, and may be inserted into one of the pair of guide bumps 318.

The second coupling portion 333 has a larger width than a distance between the guide bump 318 and the assembling protrusion. The second coupling portion 333 may face the first coupling portion 332 and be inserted into the other of the pair of guide bumps 318.

Referring to FIG. 17, the first coupling portion 332 has a width of x, and the second coupling portion 333 has a width of y which is larger than x.

When the filter cap unit 330 is assembled to the cap coupling portion 316, a width between the assembling protrusion 319 and the guide bump 318 into which the first coupling portion 332 is inserted from the bottom side is larger than x and smaller than y.

Thus, the first coupling portion 332 may be inserted between the guide bump 318 and the assembling protrusion 319, but the second coupling portion 332 cannot be inserted between the guide bump 318 and the assembling protrusion 319.

A user may simply assemble and/or couple the filter cap unit 330 to the filter main body 310 through a simple rotational manipulation by inserting the first coupling portion 332 between the guide bump 318 and the assembling protrusion 319 and rotating the first coupling portion 332 in the clockwise direction.

Thus, it is possible to prevent a user's mistake of inserting and misassembling the second coupling portion 333 between the guide bump 318 and the assembling protrusion 319. Therefore, the user does not need to check or change the assembling state of the filter cap unit 330.

The concave groove portion 334 is at one side of the filter cap unit 330, which contacts the filter main body 310, and forms a concave container to contain foreign matter filtered by the filter portion 338.

The manipulation portion 335 includes a concave or substantially cylindrical depression 336 in the underside (exposed to the outside of the cover 260) and a protruding handle portion 337 in the depression 336.

The foreign matter filtered by the filter portion 338 is moved by gravity into the concave groove portion 334 at the bottom of the filter portion 338, and the filtered foreign matter is contained and stacked in the concave groove portion 334.

The filter portion 338 serves to filter foreign matter in the wash water passing through the filter main body 310.

The filter portion 338 protrudes at a part of the main body coupling portion 331, which contacts the filter main body 310 and is inserted into the central portion 312 of the filter main body 310 so as to be positioned across a wash water flow path inside the filter main body 310.

The filter portion 338 is positioned at the boundary between the central portion 312 and the actuator installation portion 313, and filters foreign matter in the wash water flowing from the central portion 312 to the actuator installation portion 313.

In the present embodiment, the filter portion 338 has a filter shape or lattice shape capable of filtering foreign matter (e.g., it may include a mesh or screen having openings of a size configured to permit water to pass through easily but retain foreign matter that is easily visible to the unaided eye; e.g., the openings may have a size≥0.5 cm). However, the present invention is not limited thereto.

When the filter portion 338 includes a through-hole having a smaller width than the connection (flow path) between the central portion 312 and the actuator installation portion 313, the filter portion 338 may filter coins or buttons having a larger width than the through-hole.

That is, the filter portion 338 is not limited to a specific structure and shape, as long as the filter portion 338 may filter foreign matter such as coins, buttons and wash water remnants.

When the filter portion 338 has a curved surface corresponding to the inner surface of the central portion 312, the structure capable of filtering foreign matter through the filter portion 338 may be stably implemented without obstructing the flow of wash water, which may occur when foreign matter is stuck in the gap from the connection (connection flow path) between the central portion 312 and the actuator installation portion 313.

Referring to FIG. 8, the fixing unit 340 serves to fix the filter cap unit 330 to the filter main body 310 through a fastening member 350, and includes a cap fixing portion 341 and a main body fixing portion 344.

Referring to FIGS. 15 to 18, the main body fixing portion 344 protrudes on the outer surface of the filter cap unit 330, and has a hole 344a through which the fastening member 350 passes.

Referring to FIGS. 12 and 13, the cap fixing portion 341 is on the filter main body 310, and forms a movement space 342 through which the main body fixing portion 344 may be moved along a circular trace when the cap fixing portion 344 is inserted.

An assembling portion 343 having a fixing hole 343a is at a position of the cap fixing portion 341, which corresponds to the hole 344a. The fastening member 350 may be fastened to the fixing hole 343a.

The fastening member 350 fixes the filter cap unit 330 to the filter main body 310 while fastened through the hole 344a and the fixing hole 343a.

Figure 19:
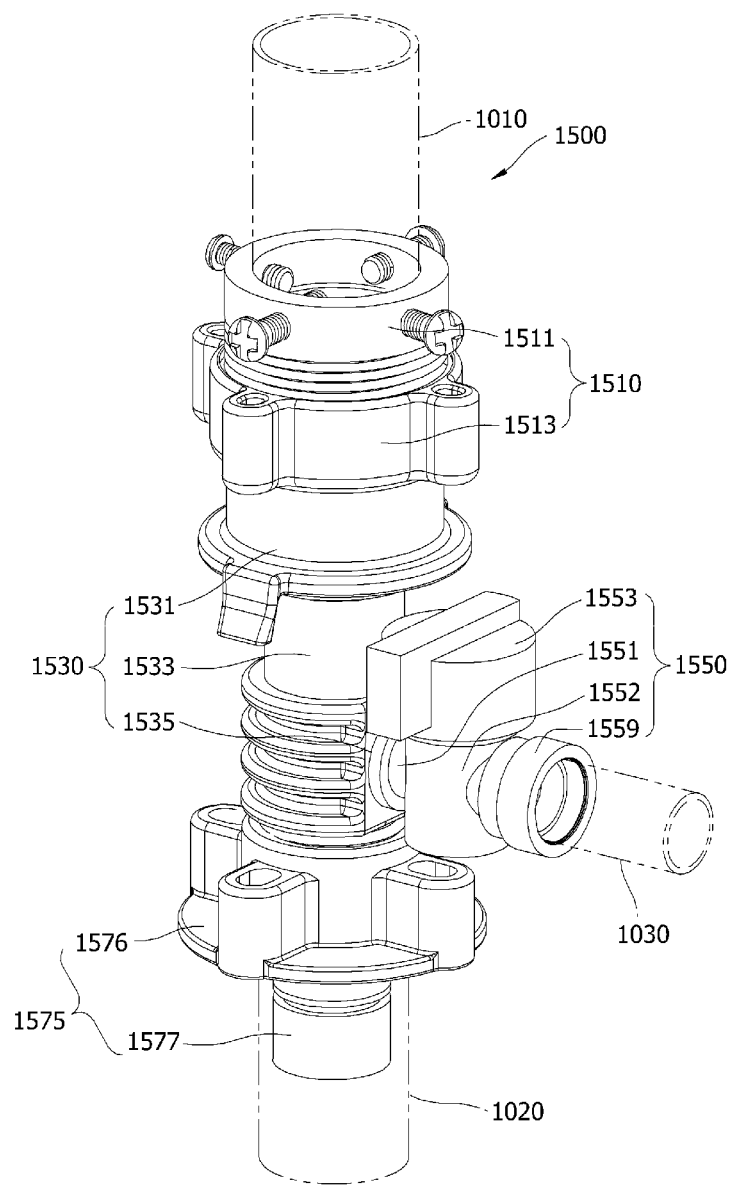
FIG. 19 is a perspective view of a water supply hose connection device for a washing machine in accordance with a first embodiment of the present invention.
Figure 20:
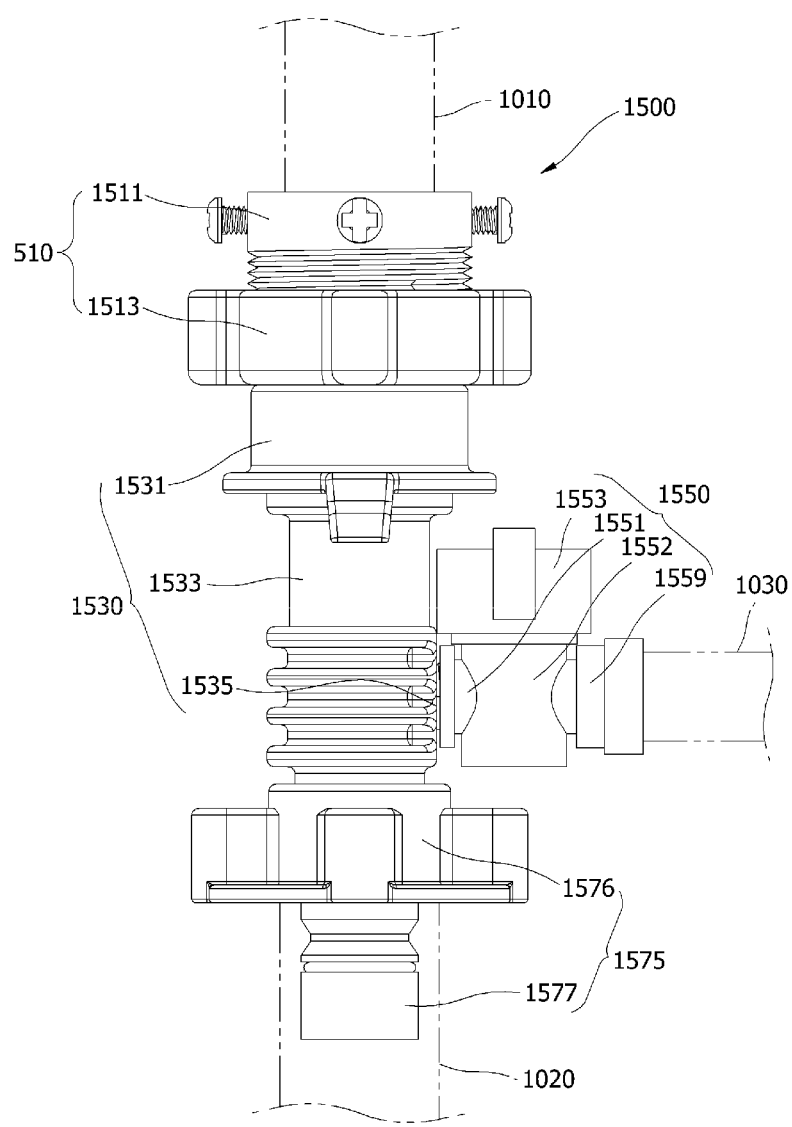
FIG. 20 is a front view of the water supply hose connection device for a washing machine in accordance with one or more embodiments of the present invention.
Figure 21:
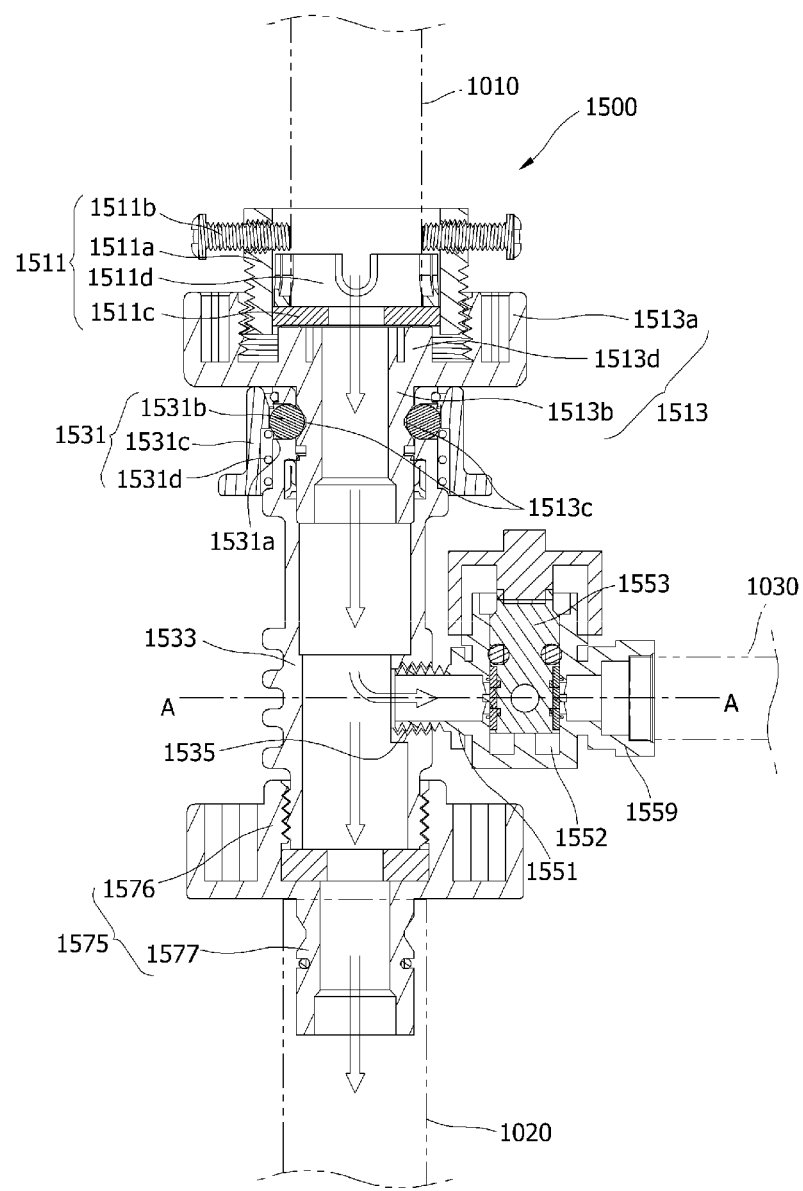
FIG. 21 is a cross-sectional view of the water supply hose connection device for a washing machine in accordance with one or more embodiments of the present invention.
Figure 22:
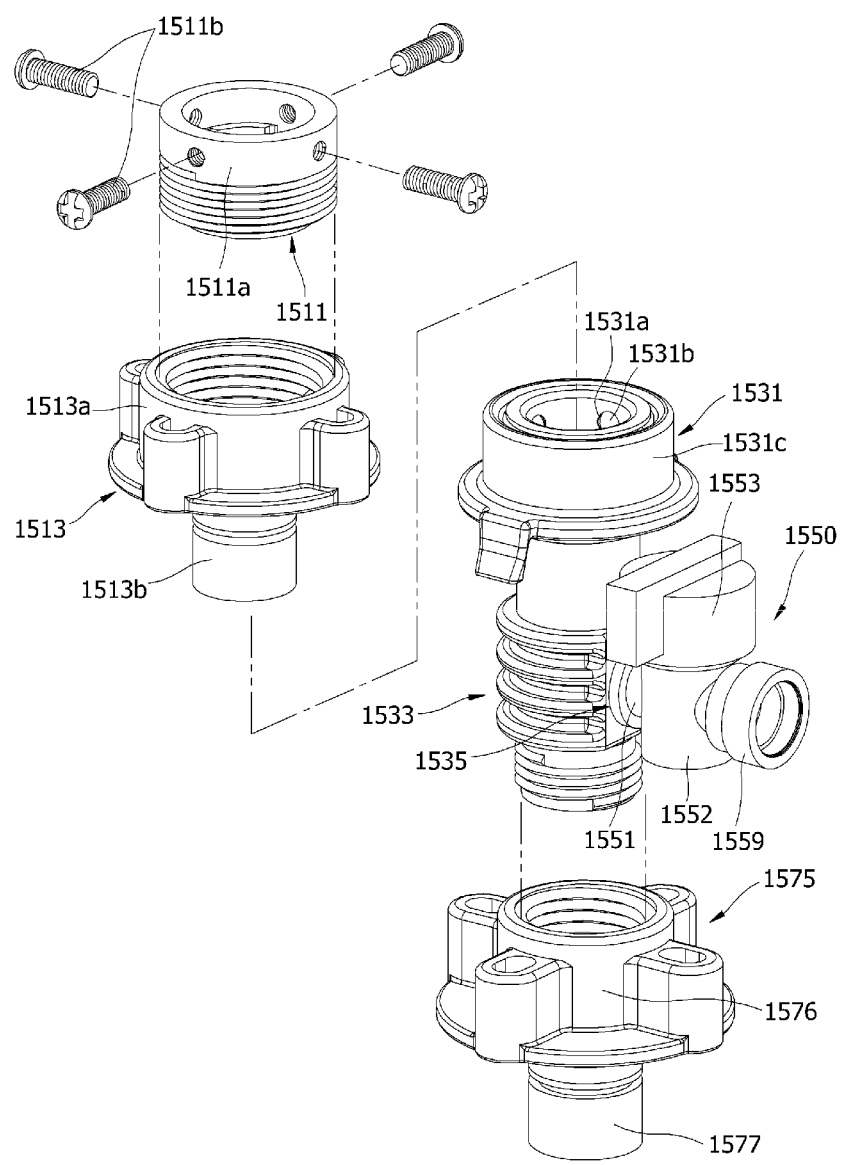
FIG. 22 is an exploded perspective view of the water supply hose connection device for a washing machine in accordance with one or more embodiments of the present invention.
Figure 23:
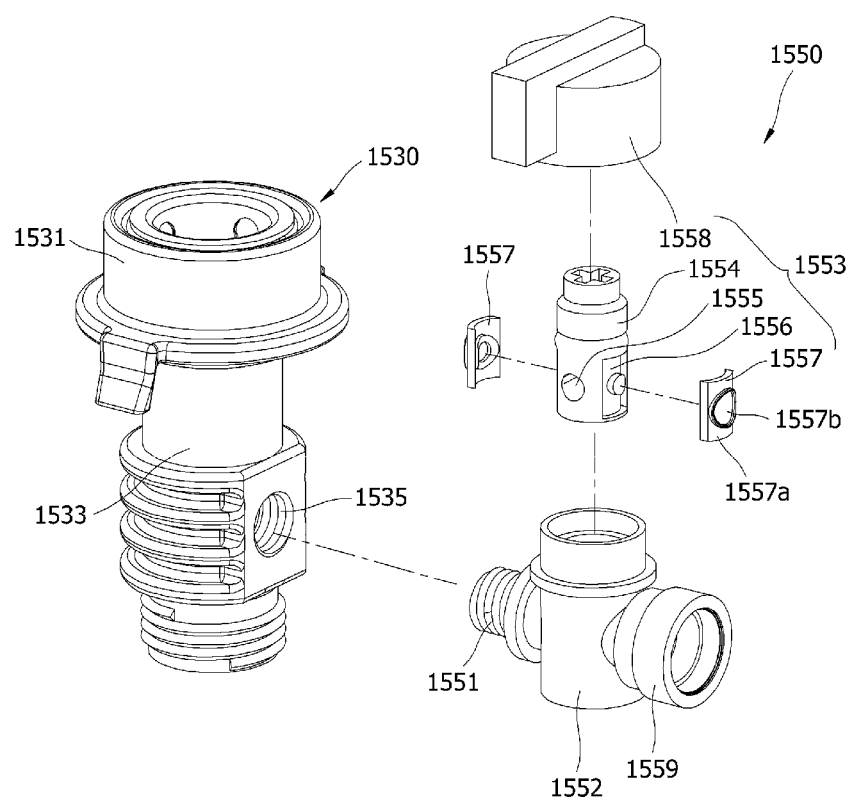
FIG. 23 is an exploded perspective view of a sub hose connection unit of the water supply hose connection device for a washing machine in accordance with one or more embodiments of the present invention.
Figure 24:
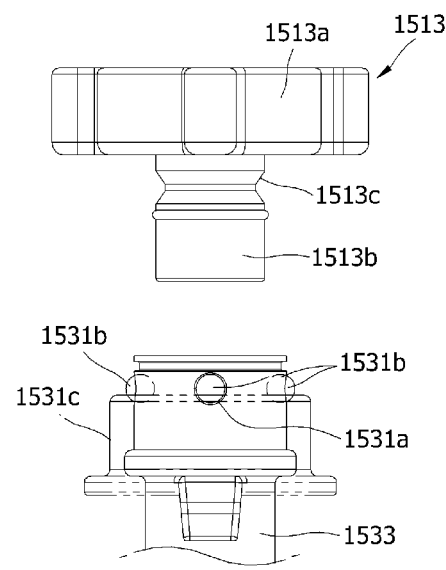
FIGS. 24 to 26 are conceptual views illustrating an assembling process of a water supply connection and a diverging connection in the water supply hose connection device for a washing machine in accordance with one or more embodiments of the present invention.
Figure 25:
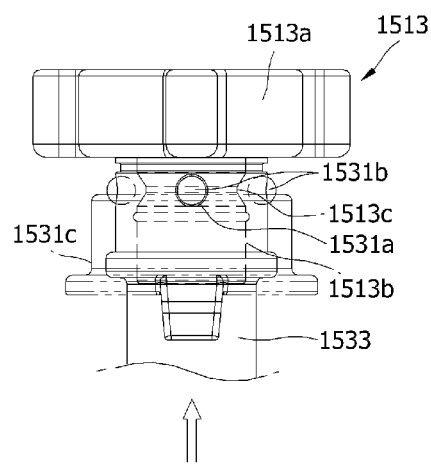
Figure 26:
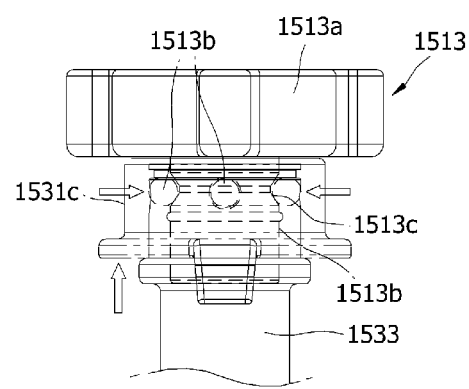
Figure 27:
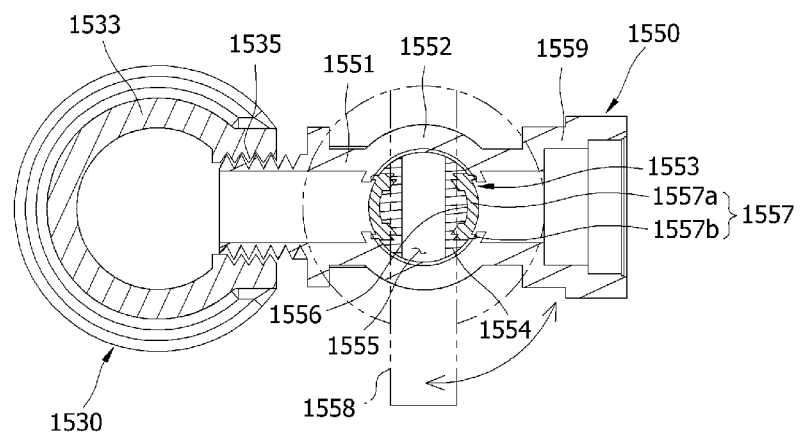
FIG. 27 is a cross-sectional view of the water supply hose connection device for a washing machine in accordance with one or more embodiments of the present invention, taken along line A-A of FIG. 21.
Figure 28:
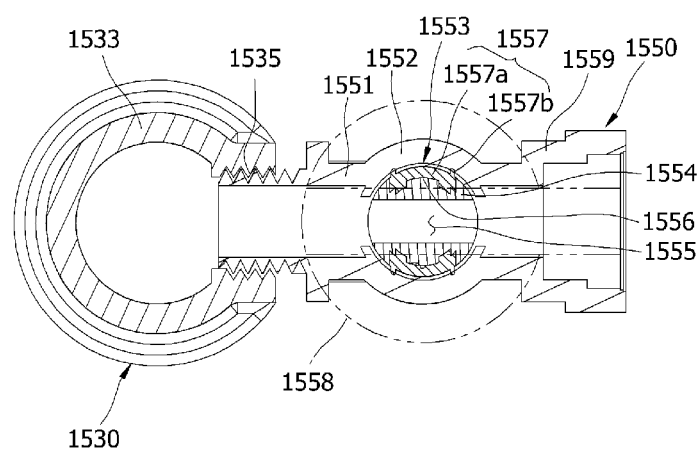
FIG. 28 is a cross-sectional view illustrating a state in which an internal flow path of the sub hose connection unit is closed in the water supply hose connection device for a washing machine in accordance with one or more embodiments of the present invention.
Figure 29:
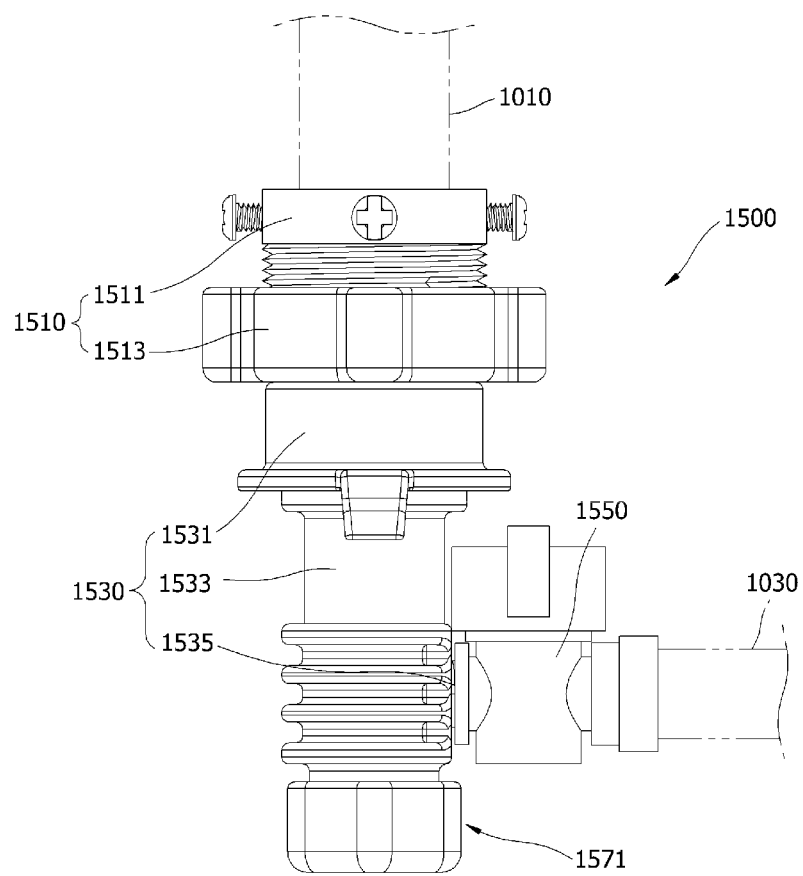
FIG. 29 is a front view of a water supply hose connection device for a washing machine in accordance with a second embodiment of the present invention.
Figure 30:
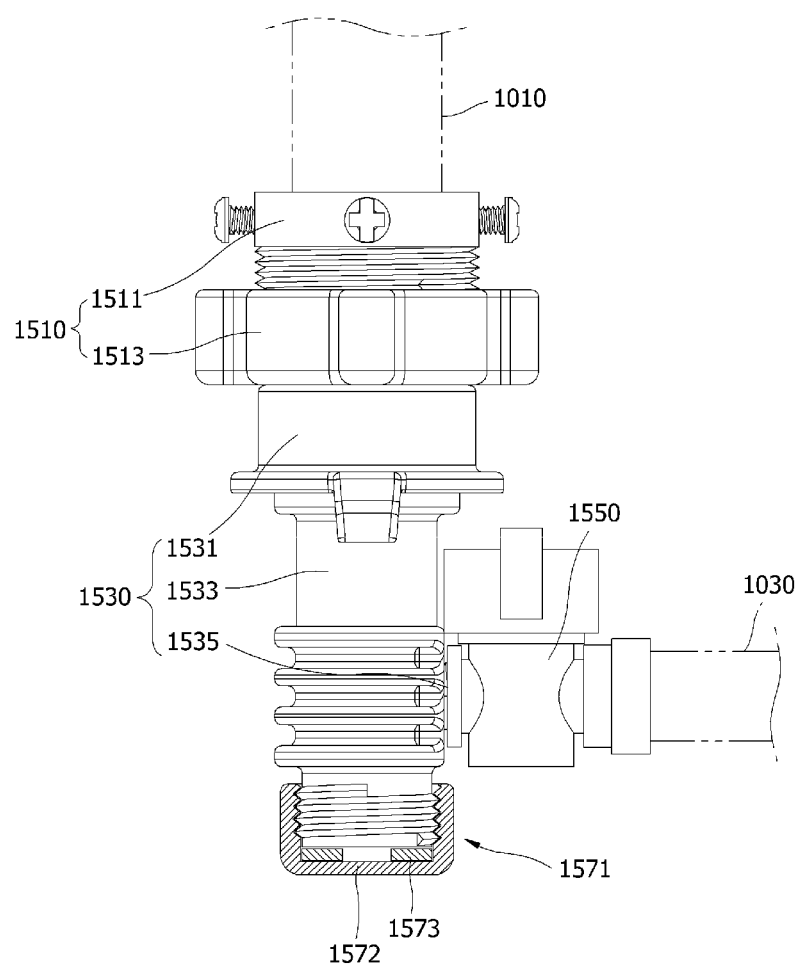
FIG. 30 is a cross-sectional view of the water supply hose connection device for a washing machine in accordance with one or more embodiments of the present invention.
Figure 31:
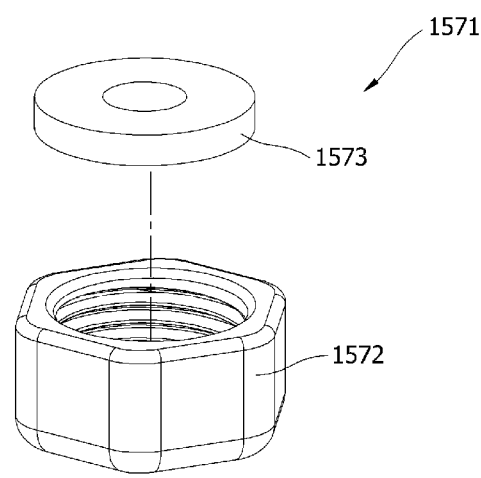
FIG. 31 is an exploded perspective view of a cap of the water supply hose connection device for a washing machine in accordance with one or more embodiments of the present invention.
Figure 32:
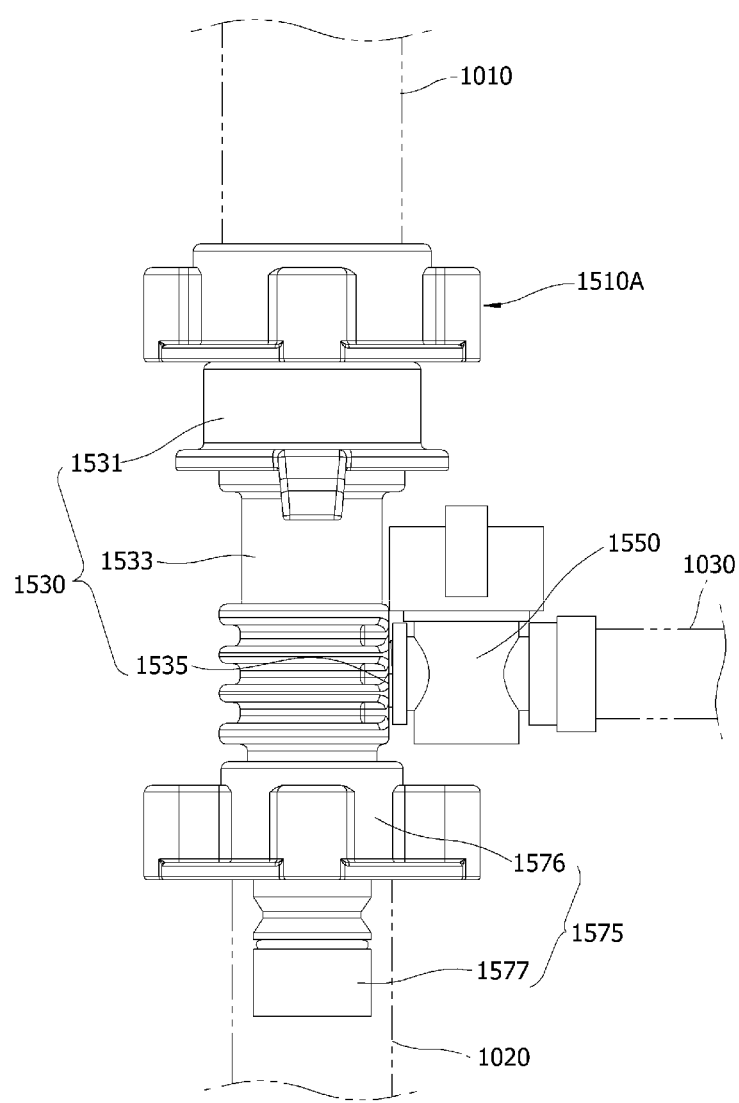
FIG. 32 is a front view of a water supply hose connection device for a washing machine in accordance with a third embodiment of the present invention.
Figure 33:
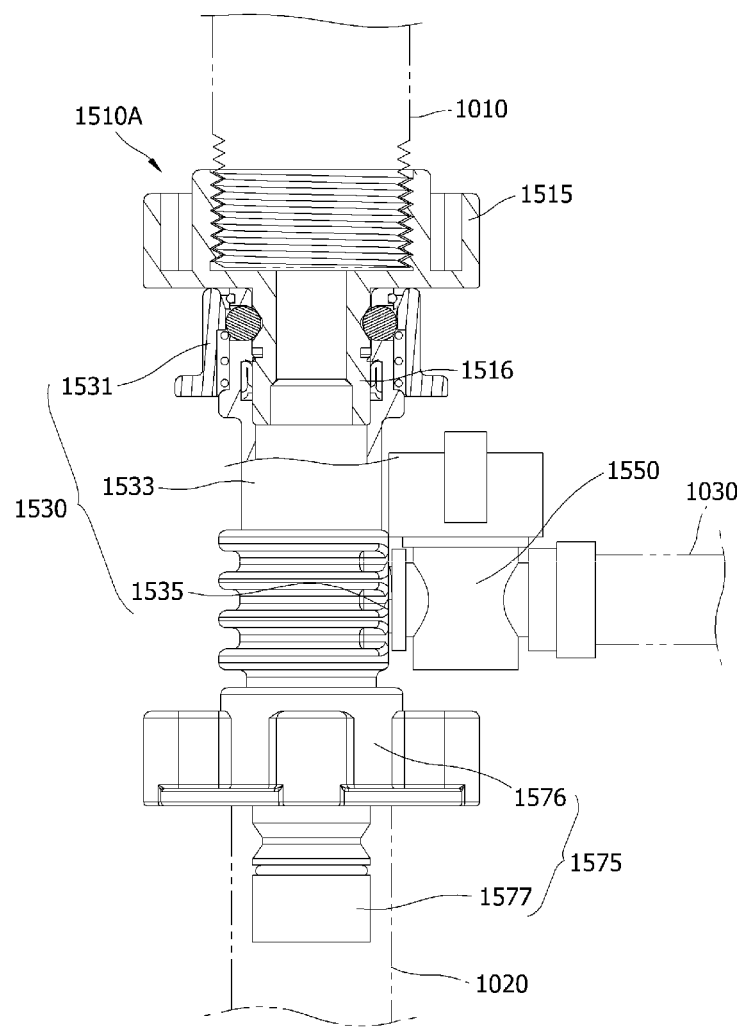
FIG. 33 is a cross-sectional view of the water supply hose connection device for a washing machine in accordance with one or more embodiments of the present invention.
Figure 34:
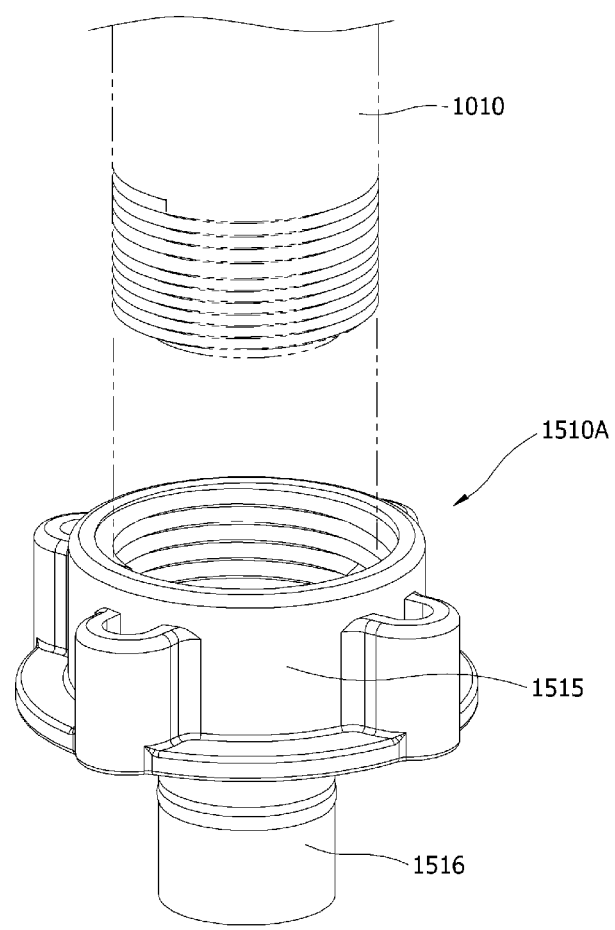
FIG. 34 is a perspective view of a water supply connection unit of the water supply hose connection device for a washing machine in accordance with one or more embodiments of the present invention.

FIG. 19 is a perspective view of a water supply hose connection device for a washing machine in accordance with a first embodiment of the present invention. FIG. 20 is a front view of the water supply hose connection device for a washing machine in accordance with one or more embodiments of the present invention. FIG. 21 is a cross-sectional view of the water supply hose connection device for a washing machine in accordance with one or more embodiments of the present invention. FIG. 22 is an exploded perspective view of the water supply hose connection device for a washing machine in accordance with one or more embodiments of the present invention. FIG. 23 is an exploded perspective view of a sub hose connection unit of the water supply hose connection device for a washing machine in accordance with one or more embodiments of the present invention. FIGS. 24 to 26 are conceptual views illustrating an assembling process of a water supply connection and a diverging connection in the water supply hose connection device for a washing machine in accordance with one or more embodiments of the present invention. FIG. 27 is a cross-sectional view of the water supply hose connection device for a washing machine in accordance with one or more embodiments of the present invention, taken along line A-A of FIG. 21. FIG. 28 is a cross-sectional view illustrating a state in which an internal flow path of the sub hose connection unit is closed in the water supply hose connection device for a washing machine in accordance with one or more embodiments of the present invention. FIG. 29 is a front view of a water supply hose connection device for a washing machine in accordance with a second embodiment of the present invention. FIG. 30 is a cross-sectional view of the water supply hose connection device for a washing machine in accordance with one or more embodiments of the present invention. FIG. 31 is an exploded perspective view of a cap of the water supply hose connection device for a washing machine in accordance with one or more embodiments of the present invention. FIG. 32 is a front view of a water supply hose connection device for a washing machine in accordance with a third embodiment of the present invention. FIG. 33 is a cross-sectional view of the water supply hose connection device for a washing machine in accordance with one or more embodiments of the present invention. FIG. 34 is a perspective view of a water supply connection unit of the water supply hose connection device for a washing machine in accordance with one or more embodiments of the present invention.

Referring FIGS. 19 and 20, the water supply hole connection device 1500 in accordance with an embodiment of the present invention includes a water supply pipe connection unit 1510, a diverging connection unit 1530, a sub hose connection unit 1550, and a main hose connection unit 1575.

The water supply pipe connection unit 1510 has an internal flow path through which wash water may flow, and is installed at an end of a water supply pipe 1010 (for example, faucet) for supplying wash water.

The diverging connection unit 1530 includes a plurality of end portions connected to communicate with the water supply pipe connection unit 1510, a water supply hose 1020 of a main washing machine, and the sub hose connection unit 1550, respectively, and is installed at the water supply pipe connection unit 1510.

The diverging connection unit 1530 may be assembled to or separated from the water supply pipe connection unit 1510 through a user's manipulation, and the main hose connection unit 1575 may also be assembled to or separated from the diverging connection unit 1530 through a user's manipulation.

The sub hose connection unit 1550 includes a valve unit 1553 connected to a diverging flow path portion 1535 in the diverging connection unit 1530. The sub hose connection unit 1550 is connected to and/or in communication with a water supply hose 1030 of a sub (e.g., second or auxiliary) washing machine.

The main hose connection unit 1575 includes a main hose connection portion 1577 connected to the water supply hose 1020 of the main washing machine, and is installed at an end of a main flow path portion 1533 in the diverging connection unit 1530.

An end portion 1576 of the main hose connection unit 1575 that contacts the diverging connection unit 1530 has a female screw corresponding to a male screw at the end portion of the diverging connection unit 1530, and is coupled to the diverging connection unit 1530 through the screws.

Referring to FIGS. 19 to 22, the water supply pipe connection unit 1510 in accordance with one or more embodiments of the present invention includes an installation portion 1511 and a connection portion 1513.

The installation portion 1511 is at one end of the water supply pipe connection unit 1510, and may be attached to or detached from an end of the water supply pipe 1010.

The connection portion 1513 is at another end of the water supply pipe connection unit 1510, and is connected to the diverging connection unit 1530.

Referring to FIG. 21, the installation portion 1511 includes a fixing ring 1511a, a plurality of fixing bolts 1511b, a sealing member 1511c, and an upper stopper 1511d.

The fixing ring 1511a has a ring shape and is inserted onto the circumference of the water supply pipe 1010.

The fixing bolts 1511b are coupled through the fixing ring 1511a, and arranged at even intervals. As the ends of the fixing bolts 1511b are pressurized and in contact with the water supply pipe 1010 inside the fixing ring, the water supply pipe connection unit 1510 is fixed to the water supply pipe 1010.

The sealing member 1511c is made of an elastic member such as rubber, and installed in the fixing ring 1511a so as to be closely attached to the end of the water supply pipe 1010 inserted into the fixing ring 1511a.

The water supply pipe 1010 and the water supply pipe connection unit 1510 may be closely attached to each other through the sealing member 1511c, thereby preventing wash water from leaking through a gap between the water supply pipe 1010 and the water supply pipe connection unit 1510.

The upper stopper 1511d is installed between the fixing bolt 1511b and the sealing member 1511c. One end of the upper stopper 1511d contacts the ends of the fixing bolts 1511b protruding to the inside of the fixing ring 1511a, and another end of the upper stopper 1511d contacts the top of the sealing member 1511c.

Referring to FIG. 21, the connection portion 1513 includes a fixing ring assembling portion 1513a, a main body connection portion 1513b, and a lower stopper 1513d.

The fixing ring assembling portion 1513a has a female screw which is to be fastened to a male screw on the outer circumference of the fixing ring 1511a, and is assembled to the installation portion 1511 through the screws or separated from the installation portion 1511.

The main body connection portion 1513b, to which the diverging connection unit 1530 is detachably assembled, has a groove portion 1513c on the circumference thereof, and lock balls 1531b of the diverging connection unit 1530 are inserted into the groove portion 1513c.

The lower stopper 1513d is in the fixing ring assembling portion 1513a so as to protrude toward the sealing member 1511c, and in contact with the bottom of the sealing member 1511c.

When the connection portion 1513 is coupled to the installation portion 1511, the sealing member 1511c may be stuck between the upper stopper 1511d and the lower stopper 1513d as illustrated in FIG. 21, and installed at a regular position within the fixing ring 1511a.

Referring to FIGS. 19 to 23, the diverging connection unit 1530 in accordance with one or more embodiments of the present invention includes a main flow portion 1533, a detachable assembling portion 1531, and a diverging flow path portion 1535.

The main flow portion 1533 has one end connected to the water supply pipe connection unit 1510 and another end connected to the water supply hose 1020 of the main washing machine.

The main flow portion 1533 forms an internal flow path through which wash water supplied from the water supply pipe 1010 and passing through the water supply pipe connection unit 1510 is induced toward the water supply hose 1020 of the main washing machine.

The detachable assembling portion 1531 is coupled to the one end of the main flow portion 1533 in contact with the water supply pipe connection unit 1510, and may be attached to or detached from the connection portion 1513 through a user's manipulation.

The diverging flow path portion 1535 diverges from the main flow path portion 1533 such that wash water passing through the main flow path portion 1533 may flow in a different direction from the end of the main flow path portion 1533.

Referring to FIG. 21, the diverging flow path portion 1535 in accordance with one or more embodiments of the present invention is formed through the main flow path portion 1533, and has a female screw to which the sub hose connection unit 1550 may be fastened. However, the present invention is not limited thereto.

That is, the diverging flow path portion 1535 may protrude to the outside of the main flow path portion 1533, and may have a male screw on the outer surface thereof. As the diverging flow path portion 1535 is in the main flow path portion 1533, but diverges from the main flow path portion 1533, the diverging flow path portion 1535 is not limited to a specific structure and shape.

Referring to FIG. 21, the detachable assembling portion 1531 includes a plurality of locking balls 1531*b*, a moving body 1531*c*, and a compression spring 1531*d*.

The plurality of locking balls 1531*b* are inserted and/or installed in the hole portion 1531*a* along the circumference of the end portion of the main flow path portion 1533, and moved in the hole portion 1531*a* toward the inside or outside of the main flow path portion 1533 by pressure.

The locking balls 1531*b* protrude to the inside of the main flow path portion 1533 when the diverging connection unit 1530 is coupled to the water supply pipe connection unit 1510, and the parts of the locking balls 1531*b* protruding to the inside of the main flow path portion 1533 are inserted and stuck in the groove portion 1513*c* of the water supply pipe connection unit 1510.

The moving body 1531*c* is inserted and/or installed onto the circumference of the end portion of the main flow path portion 1533, and has a protruding bump to easily receive a manipulation force of a user.

The compression spring 1531*d* elastically pressurizes the moving body 1531*c* toward the end portion of the main flow path portion 1533 (upward direction in FIGS. 21 and 24).

Referring to FIG. 24, when the moving body 1531*c* is moved downward to expose the locking balls 1531*b* to the outside, the locking balls 1531*b* may move outside the main flow portion 1533 through pressure, to push the locking balls 1531*b* from the inside to the outside of the main flow path portion 1533.

That is, when the main flow path portion 1533 is inserted into the connection portion 1513 as illustrated in FIG. 25 when the moving body 1531*c* is moved downward as illustrated in FIG. 24, the locking balls 1531*b* contact the outer surface of the connection portion 1513 and are pushed to the outside of the main flow path portion 1533.

At this time, the locking balls 1531*b* correspond to and/or complement the groove portion 1513*c* in the connection portion 1513.

When the downward pressure force applied to the moving body 1531*c* is released in such a state as illustrated in FIG. 25, the moving body 1531*c* pushes the locking balls 1531*b* to the inside of the main flow path portion 1533, while being pushed and moved toward the end of the main flow path portion 1533 by the elasticity of the compression spring 1531*d* as illustrated in FIG. 26.

At this time, the locking balls 1531*b* are pushed by the moving body 1531*c* and are inserted and/or locked in the groove portion 1513*c* when the locking balls 1531*b* partially protrude to the inside of the main flow path portion 1533.

The diverging connection unit 1530 may be simply coupled to the water supply pipe connection unit 1510 through a simple manipulation of inserting the end portion of the diverging connection unit 1530 into the connection portion 1513 of the water supply pipe connection unit 1510 when the moving body 1531*c* is moved downward, and then releasing the pressure force applied to the moving body 1531*c*.

Furthermore, the diverging connection unit 1530 may be simply separated from the water supply pipe connection unit 1510 through a simple manipulation of moving the moving body 1531*c* downward as illustrated in FIG. 25 and separating the diverging connection unit 1530 from the connection portion 1513 of the water supply pipe connection unit 1510 as illustrated in FIG. 24.

When the main hose connection portion 1577 of the main hose connection unit 1575 has the same shape as the connection portion 1513 of the water supply pipe connection unit 1510, the end portion of the water supply hose 1020 of the main washing machine having the same structure as the detachable assembling portion 1531 of the diverging connection unit 1530 may be selectively assembled to the main hose connection portion 1577 and the connection portion 1513.

As illustrated in FIGS. 24 to 26, when the diverging connection unit 1530 is coupled to the water supply pipe connection unit 1510 and the water supply hose 1020 of the main washing machine is connected to the main hose connection portion 1577, wash water may be supplied to the main washing machine through the diverging connection unit 1530.

Furthermore, when only the main washing machine is operated, the water supply hose 1020 of the main washing machine may be directly connected to the connection portion 1513 when the diverging connection unit 1530 is separated from the water supply pipe connection unit 1510, in order to supply wash water to the main washing machine.

Referring to FIGS. 19 and 20, the sub hose connection unit 1550 in accordance with one or more embodiments of the present invention includes a diverging connection portion 1551, a sub hose connection portion 1559, a valve installation portion 1552, and a valve unit 1553.

The sub hose connection unit 1550 has a structure in which the diverging connection portion 1551, the valve installation portion 1552, and the sub hose connection portion 1559 are sequentially connected to each other, and the valve unit 1553 is on the valve installation portion 1552.

The diverging connection portion 1551 is connected to and/or in communication with the diverging connection portion 1535.

The diverging connection portion 1551 has a male screw on the outer circumference thereof corresponding to the female screw on the diverging flow path portion 1535, and the diverging connection portion 1551 is assembled to the diverging connection unit 1530 through the screws.

The sub hose connection portion 1559 is connected to and/or in communication with the diverging connection portion 1551, and the water supply hose 1030 of the sub washing machine is inserted into and/or connected to the sub hose connection portion 1559.

The valve installation portion 1552 communicates between the diverging connection portion 1513 and the sub hose connection portion 1559, and an end portion of the valve unit 1553 is inserted into the valve installation portion 1552.

The valve unit 1553 on the valve installation portion 1552 blocks or passes wash water flowing from the diverging connection portion 1513 toward the sub hose connection portion 1559.

Referring to FIGS. 23, 27, and 28, the valve unit 1553 in accordance with one or more embodiments of the present invention includes a flow path insertion portion 1554, a through-hole portion 1555, a handle 1558, an assembling groove portion 1556 and a water-tight assembling portion 1557.

The flow path insertion portion 1554 has an end portion inserted into the valve installation portion 1552, and extending to the outside of the valve installation portion 1552.

The through-hole portion 1555 is through the end portion of the flow path insertion portion 1554 inserted into the valve installation portion 1552.

Referring to FIG. 28, open ends of the through-hole portion 1555 are formed at positions corresponding to an internal flow path of the diverging connection portion 1551 and an internal flow path of the sub hose connection portion 1559, respectively, when the internal flow path of the sub hose connection unit 1550 is opened.

The handle 1558 is coupled to the flow path insertion portion 1554 outside the valve installation portion 1552, and rotated with the flow path insertion portion 1554 by a user's rotational manipulation force as illustrated in FIGS. 27 and 28.

In this configuration, the through-hole portion 1555 in the flow path insertion portion 1554 moves together with the handle 1558.

When the through-hole portion 1555 does not communicate with the internal paths of the diverging connection portion 1551 the sub hose connection portion 1559 as illustrated in FIG. 27, the internal flow path of the sub hose connection unit 1550 is blocked by the flow path insertion portion 1554.

When the through-hole portion 1555 is positioned to communicate with the internal flow paths of the diverging connection portion 1551 and the sub hose connection portion 1559 as illustrated in FIG. 28, wash water in the diverging connection portion 1551 may continuously flow toward the sub hose connection portion 1559 through the through-hole portion 1555.

The assembling groove portion 1556 may be depressed in the outer surface of the flow path insertion portion 1554 between the open ends of the through-hole portion 1555.

When the internal flow path of the sub hose connection unit 1550 is closed as illustrated in FIG. 27, the assembling groove portion 1556 is at one or more positions corresponding to the internal flow path of the diverging connection portion 1551 and the internal flow path of the sub hose connection portion 1559.

The water-tight assembling portion 1557 is a sealing unit to prevent wash water of the diverging connection portion 1551 from leaking toward the valve installation portion 1552 and the sub hose connection portion 1559 through a gap in the flow path insertion portion 1554.

Referring to FIGS. 23 and 27, the water-tight assembling portion 1557 in accordance with one or more embodiments of the present invention includes an insertion portion 1557*a* and a water-tight ring portion 1557*b*.

The insertion portion 1557*a* has a shape corresponding to the assembling groove portion 1556, and is inserted and/or assembled into the assembling groove portion 1556.

The water-tight ring portion 1557*b* protrudes from the outer surface of the insertion portion 1557*a* in contact with the inner surface of the valve installation portion 1552, and has a ring shape contacting the circumferences of the internal flow paths of the diverging connection portion 1551 and the sub hose connection portion 1559.

When the internal flow path of the sub hose connection unit 1550 is closed as illustrated in FIG. 27, the water-tight portion 1557*b* contacts the circumferences of the internal flow paths of the diverging connection portion 1551 and the sub hose connection portion 1559.

Thus, it is possible to prevent wash water in the diverging connection portion 1551 from leaking toward the valve installation portion 1552 and the sub hose connection portion 1559 through a gap from the flow path insertion portion 1554.

In accordance with one or more embodiments of the present invention, wash water in the water supply pipe 1010 may be supplied to the main washing machine and the sub washing machine through the main hose connection unit 1575 and the sub hose connection unit 1550 which are coupled to the diverging connection unit 1530.

Furthermore, the valve unit 1553 may be rotated to simply open and/or close the internal flow path of the sub hose connection portion 1550.

When the main washing machine and the sub washing machine are operated together, the valve unit 1553 may be manipulated to open the internal flow path of the sub hole connection unit 1550, thereby stably supplying wash water to the main washing machine and the sub washing machine at the same time.

When the sub washing machine is not operated but only the main washing machine is operated, the valve unit 1553 may be manipulated to close the internal flow path of the sub hole connection unit 1550, thereby stably blocking the supply of wash water to the sub washing machine.

Referring to FIGS. 29 to 31, the water supply hose connection device 1500 in accordance with one or more embodiments of the present invention has a structure in which a cap 1571 is coupled to the end portion of the diverging connection unit 1530, instead of the main hose connection unit 1575.

As illustrated in FIGS. 29 and 30, the cap 1571 is coupled to an end portion of the main flow path portion 1533 and blocks a flow of wash water through the end portion of the main flow portion 1533.

Referring to FIG. 31, the cap 1571 in accordance with one or more embodiments of the present invention includes a cap body 1572 and a sealing portion 1573.

The cap body 1572 having a cap shape to cover the end portion of the main flow portion 1533 includes a female screw on the inner surface thereof that corresponds to or complements a male screw at the end portion of the main flow path portion 1533, and is coupled to the main flow path portion 1533 through the screws.

The sealing portion 1573 is made of an elastic material such as rubber, and is placed or installed in the cap body 1572 so as to be closely attached to the end portion of the main flow path portion 1533 inserted into the cap body 1572.

When the cap body 1572 is fastened to the main flow path portion 1533 through the screws, the main flow path portion 1533 may be closely attached to the sealing portion 1573 so as to prevent wash water from leaking through a gap between the main flow path portion 1533 and the cap body 1572.

When the main washing machine is not operated, but only the sub washing machine is operated, the cap 1571 may be coupled to the end portion of the diverging connection unit 1530 in accordance with one or more embodiments of the present invention, thereby stably blocking the supply of wash water to the main washing machine.

Referring to FIGS. 32 to 34, the water supply hose connection device 1500 in accordance with one or more embodiments of the present invention has a structure in which it is coupled to the water supply pipe 1010 through screws, similar or in comparison to the embodiment(s) of FIGS. 19 to 28.

A water supply pipe connection unit 1510A provided in the water supply hose connection device 1500 in accordance with one or more embodiments of the present invention has an extension portion 1516 to which the detachable assembling portion 1531 of the diverging connection unit 1530 is coupled, and is installed at an end of the water supply pipe 1010.

Referring to FIG. 34, an end portion 1515 of the water supply pipe connection unit 1510A contacting the water supply pipe 1010 has a female screw corresponding or complementary to a male screw at the end portion of the water supply pipe 1010, and is coupled to the water supply pipe 1010 through the screws.

Since the extension portion 1516 has the same structure as the connection portion 1513, the detailed descriptions thereof are omitted herein.

When the water supply pipe 1010 has a male screw at the end portion thereof, the water supply hose connection device 1500 may be simply installed in the water supply pipe 1010 through the screws, using the water supply connection unit 1510A having the female screw corresponding or complementary to the water supply pipe 1010.

Figure 35:
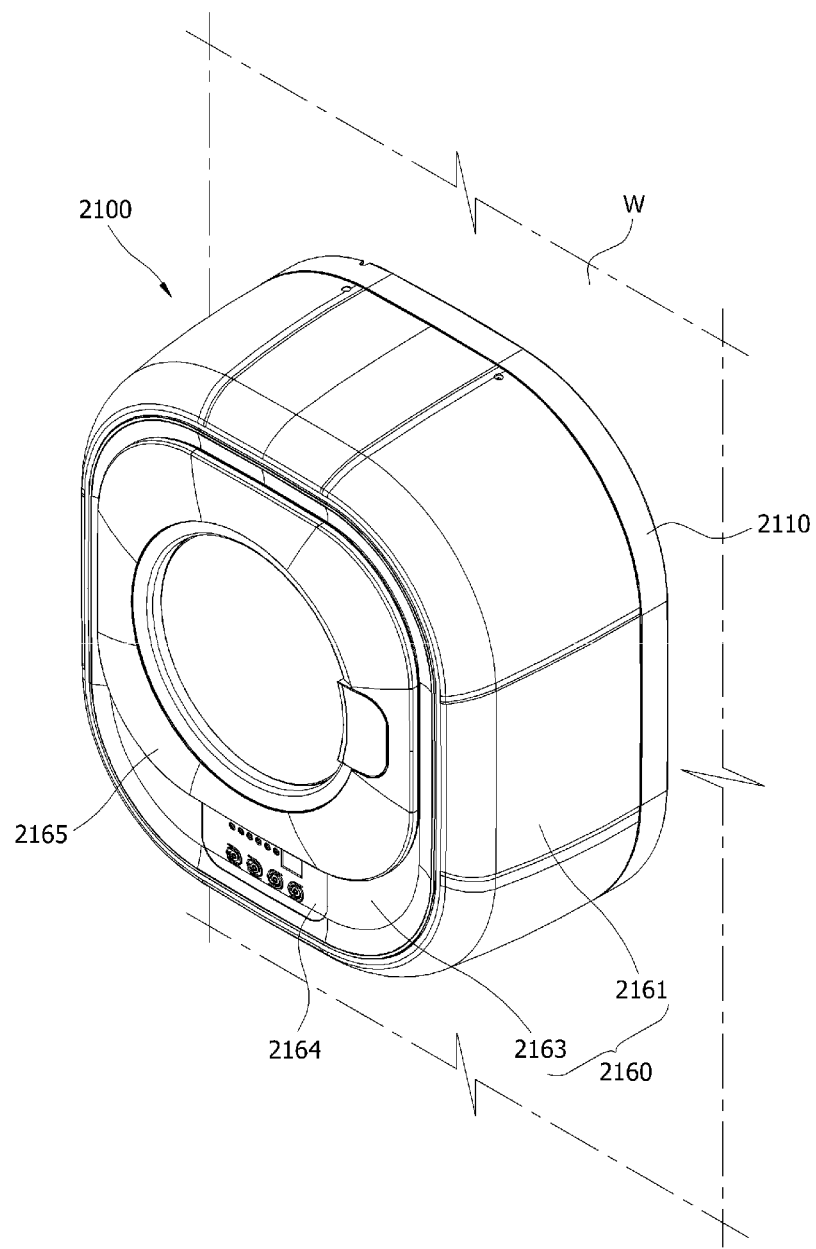
FIG. 35 is a perspective view of a washing machine in accordance with another embodiment of the present invention.
Figure 36:
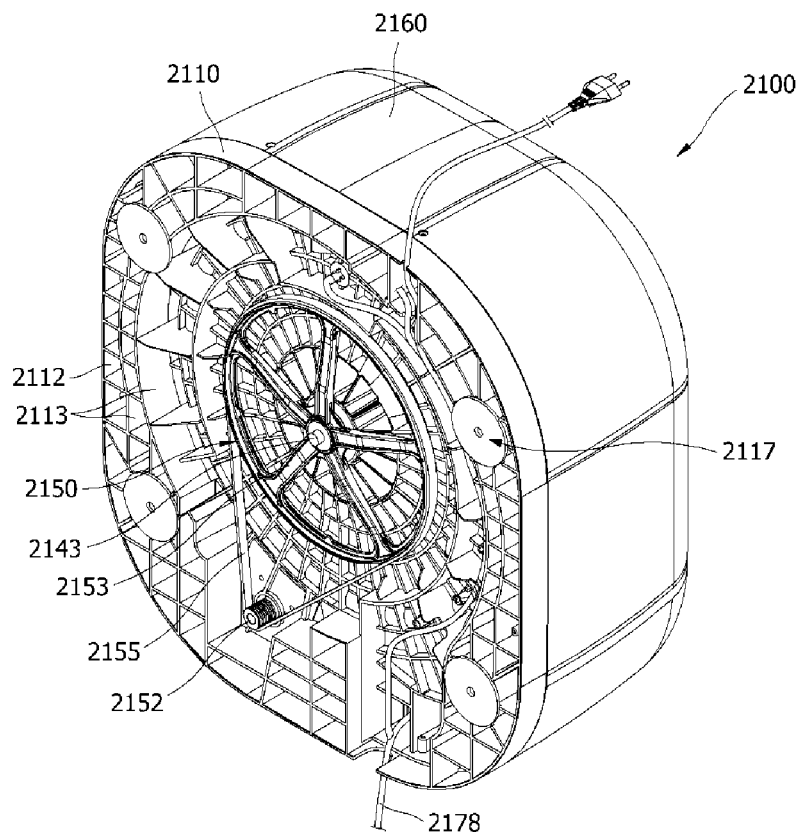
FIG. 36 is a rear perspective view of the washing machine in accordance with embodiment(s) of the present invention.
Figure 37:
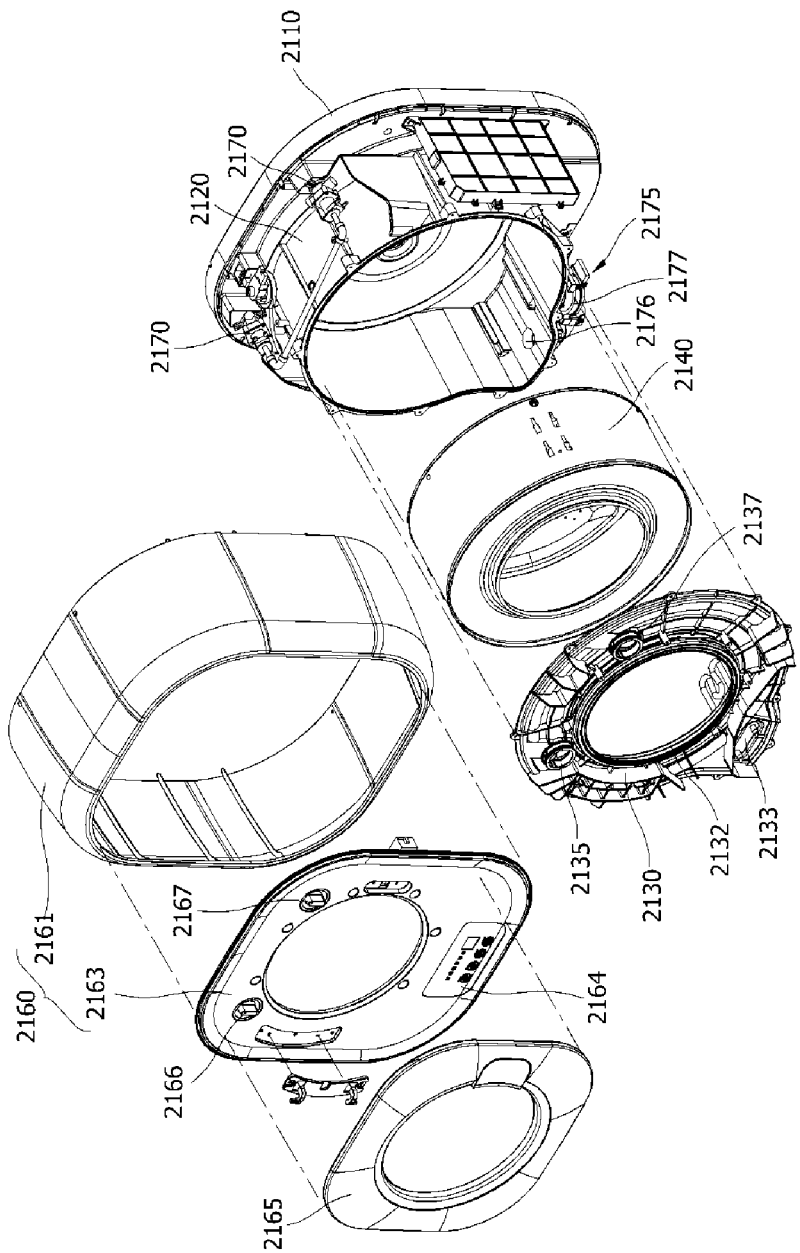
FIG. 37 is an exploded perspective view of the washing machine in accordance with embodiment(s) of the present invention.
Figure 38:
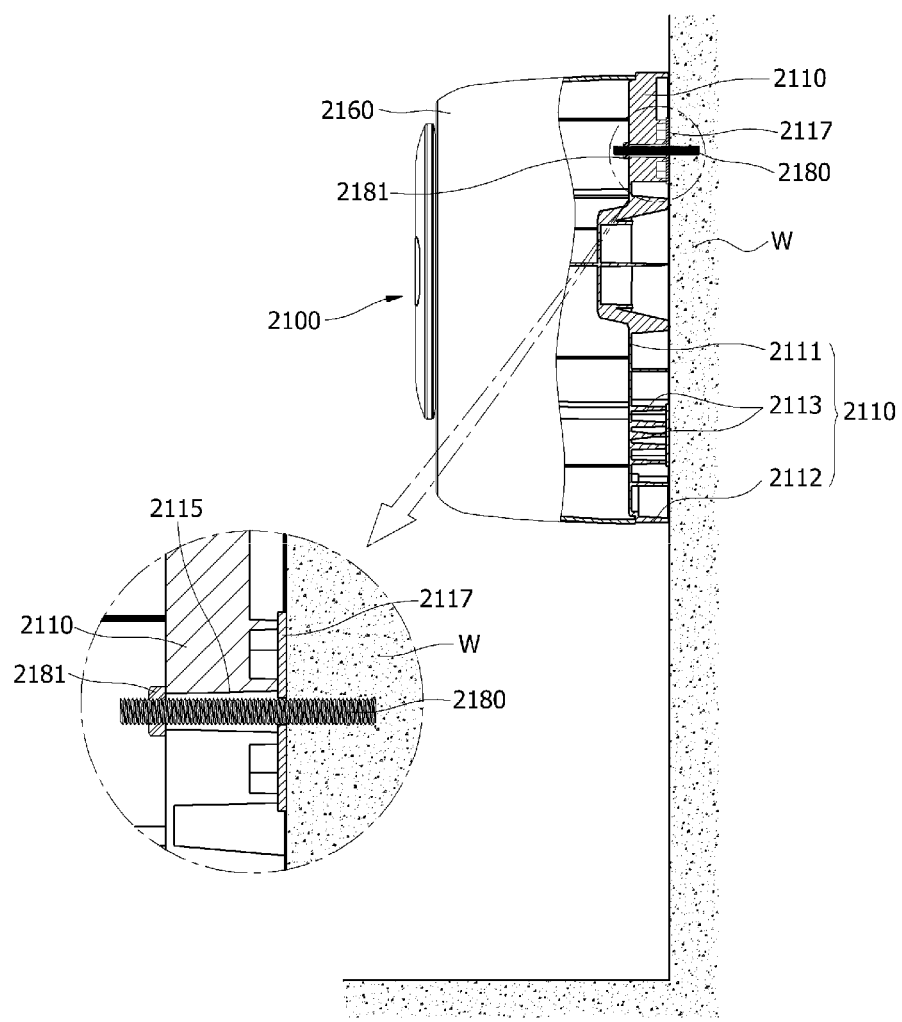
FIG. 38 is a side cross-sectional view of the washing machine in accordance with embodiment(s) of the present invention.
Figure 39:
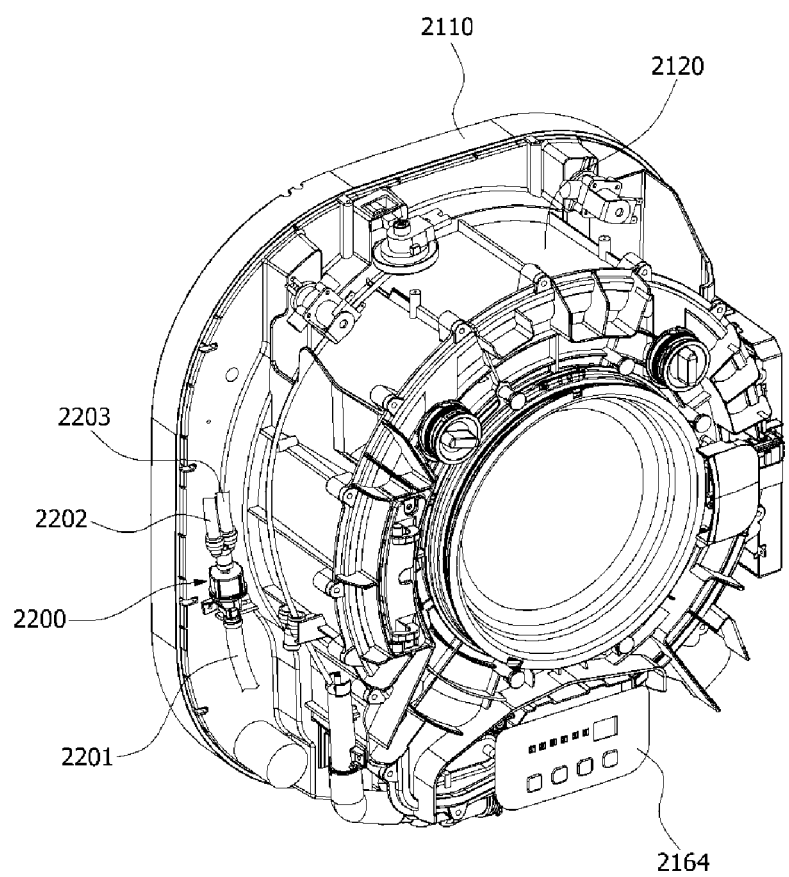
FIG. 39 is a perspective view illustrating an installation state of a check valve device of the washing machine in accordance with embodiment(s) of the present invention.
Figure 40:
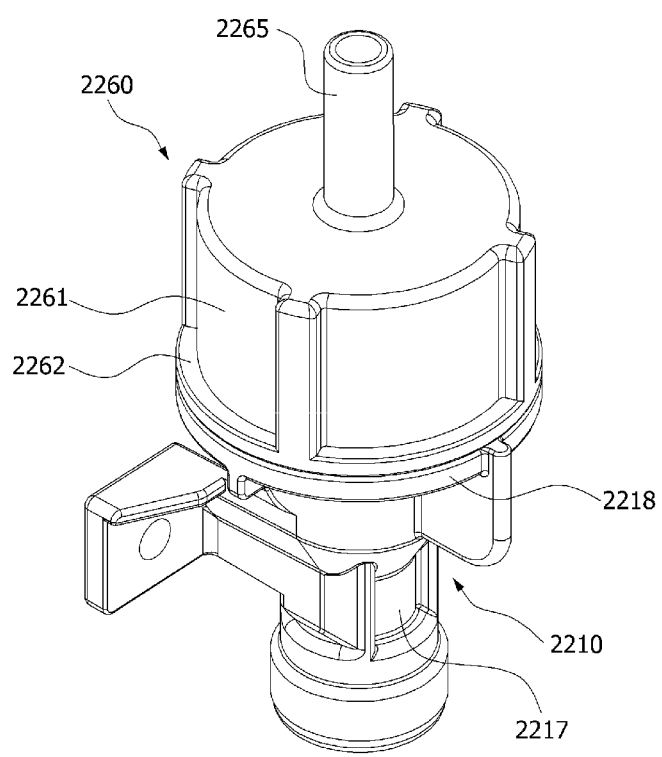
FIG. 40 is a perspective view of the check valve device of the washing machine in accordance with embodiment(s) of the present invention.
Figure 41:
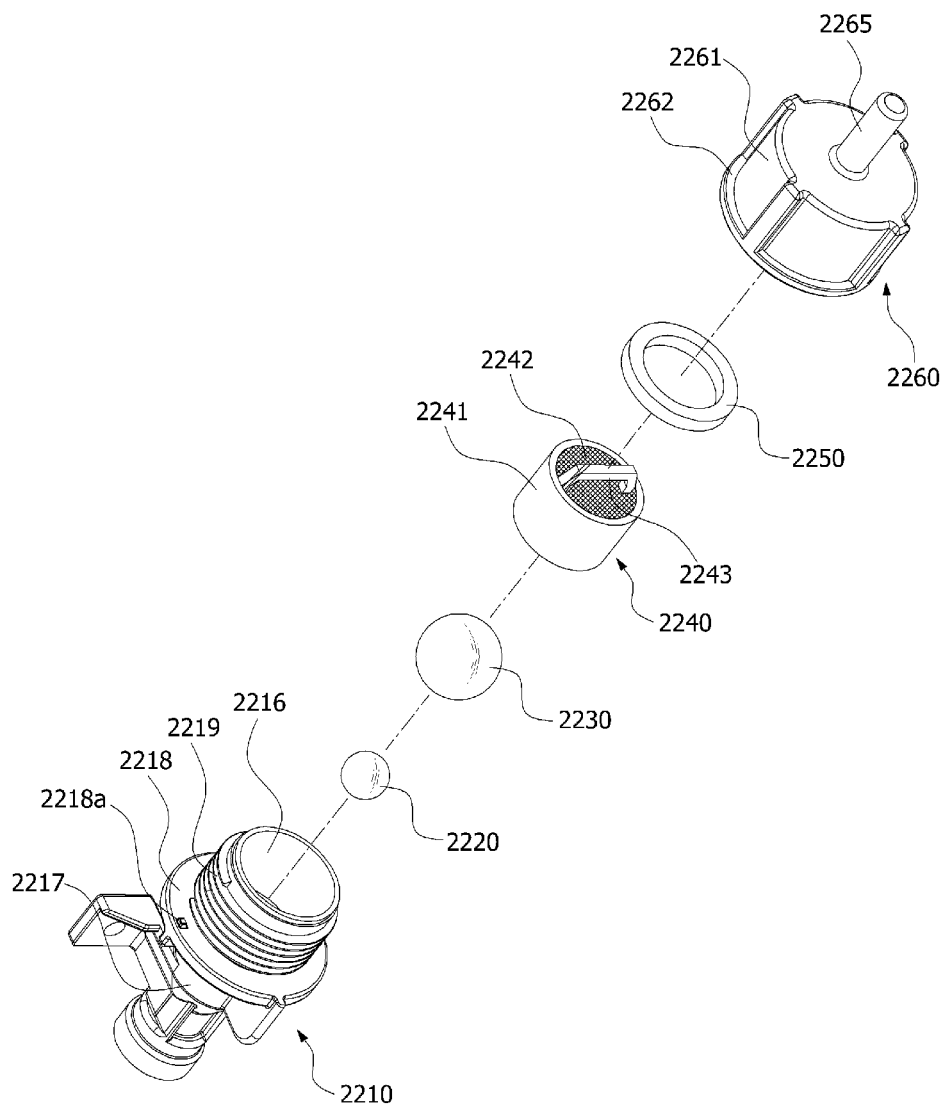
FIG. 41 is an exploded perspective view of the check valve device of the washing machine in accordance with embodiment(s) of the present invention.
Figure 42:
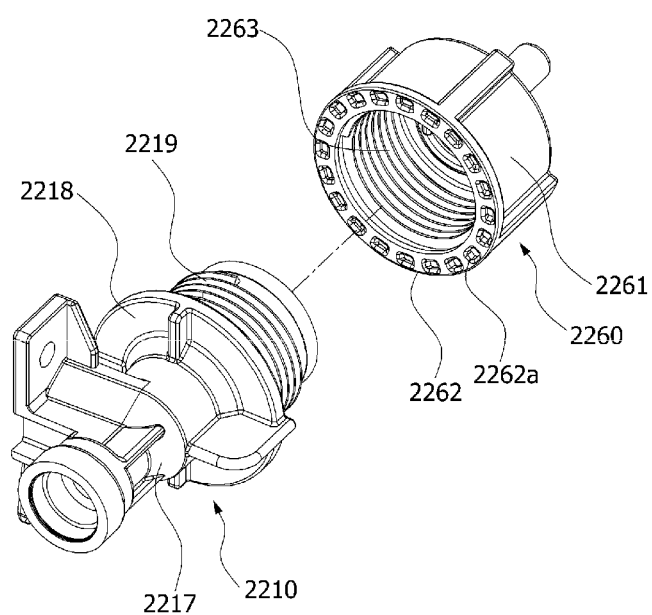
FIG. 42 is a perspective view of first and second main bodies of the check valve device of the washing machine in accordance with embodiment(s) of the present invention.
Figure 43:
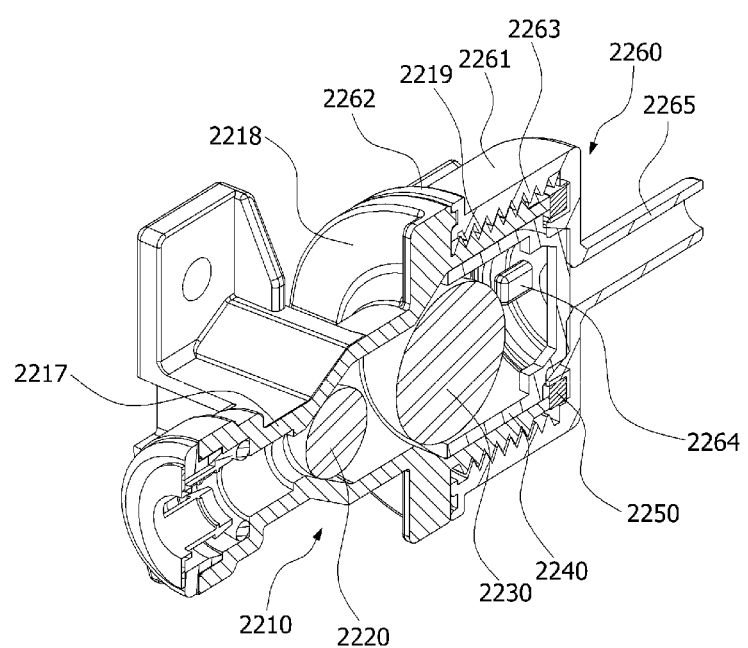
FIG. 43 is a cross-sectional perspective view of the check valve device of the washing machine in accordance with embodiment(s) of the present invention.
Figure 44:
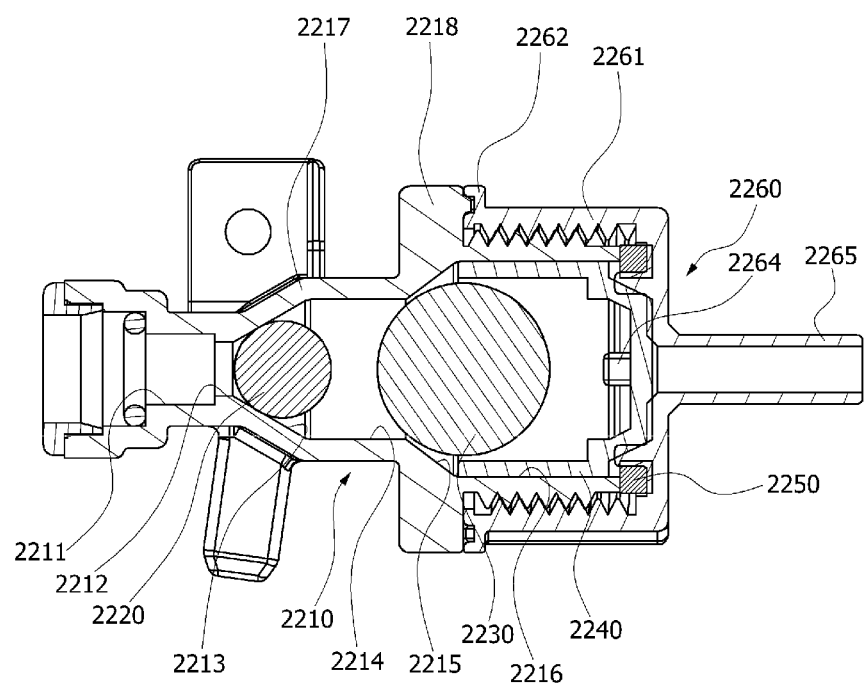
FIG. 44 is a cross-sectional view of the check valve device of the washing machine in accordance with embodiment(s) of the present invention.
Figure 45:
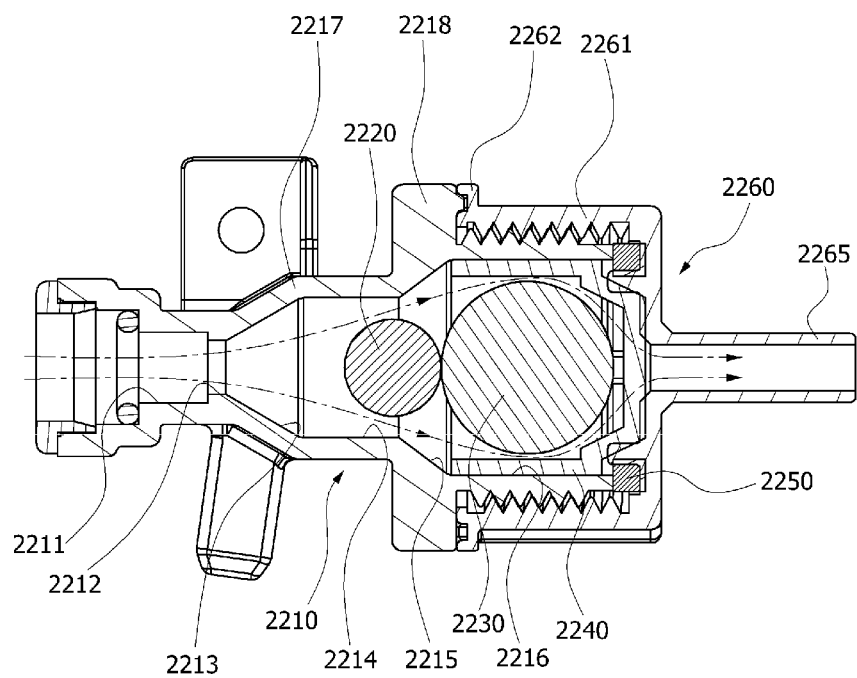
FIG. 45 is a cross-sectional view illustrating an operation state of the check valve device of the washing machine in accordance with embodiment(s) of the present invention.
Figure 46:
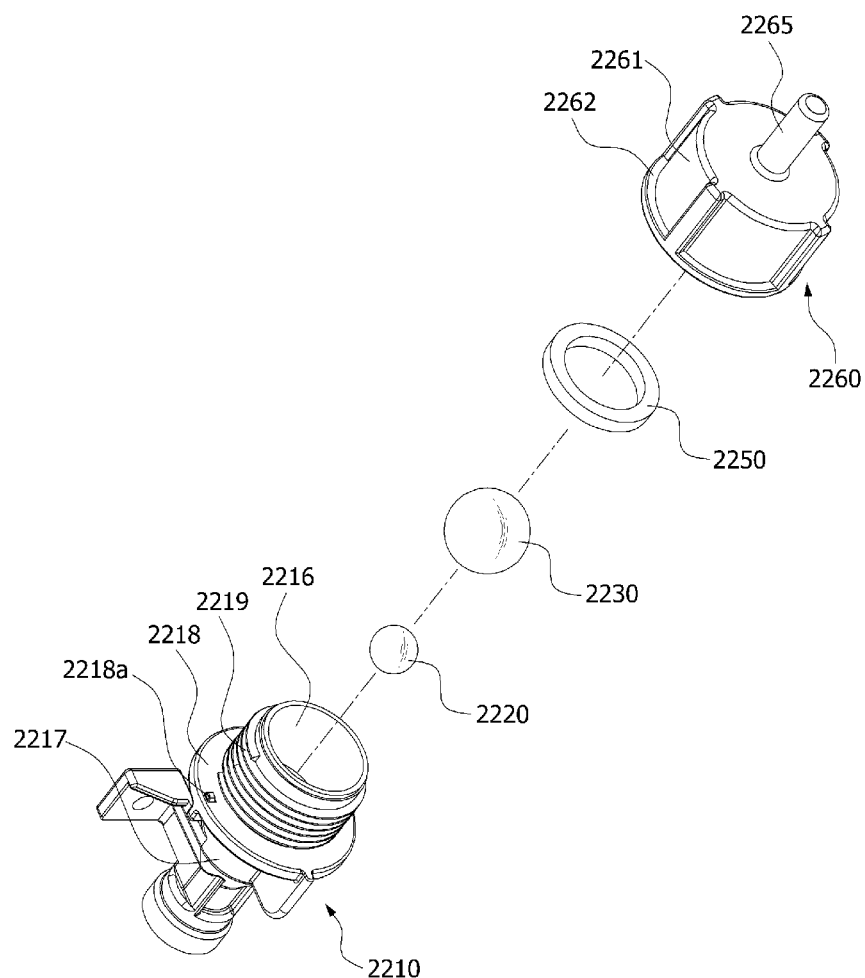
FIG. 46 is an exploded perspective view of a modification of the check valve device of the washing machine in accordance with embodiment(s) of the present invention.
Figure 47:
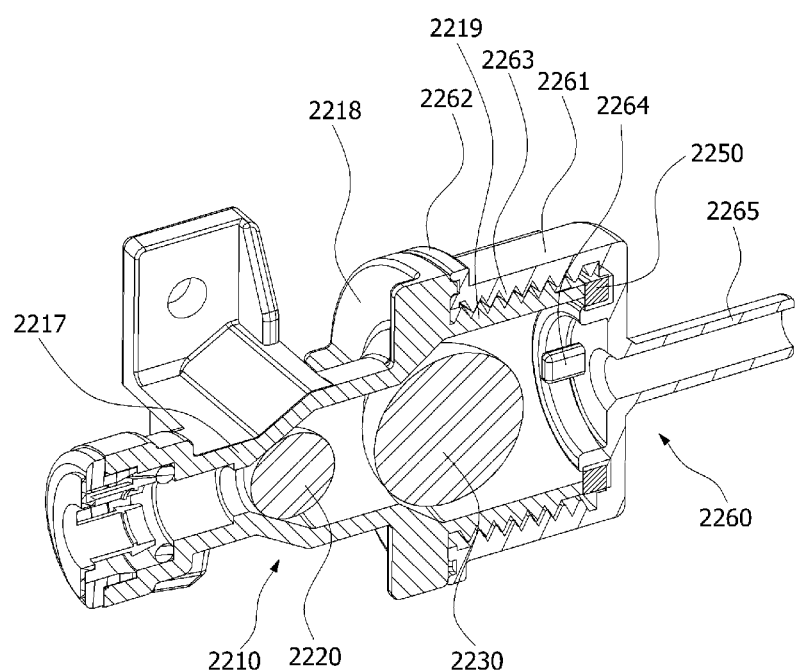
FIG. 47 is a cross-sectional perspective view of the modification of the check valve device of the washing machine in accordance with embodiment(s) of the present invention.
Figure 48:
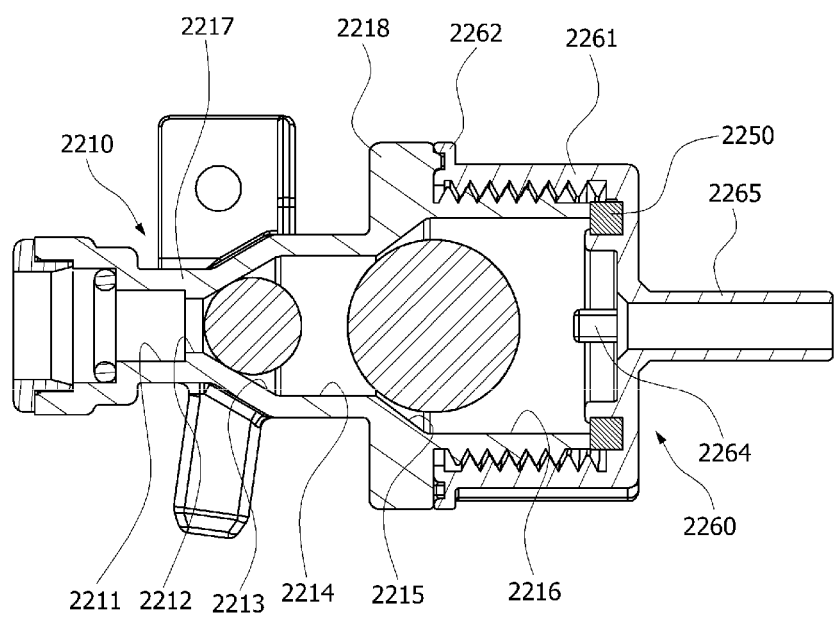
FIG. 48 is a cross-sectional view of the modification of the check valve device of the washing machine in accordance with embodiment(s) of the present invention.
Figure 49:
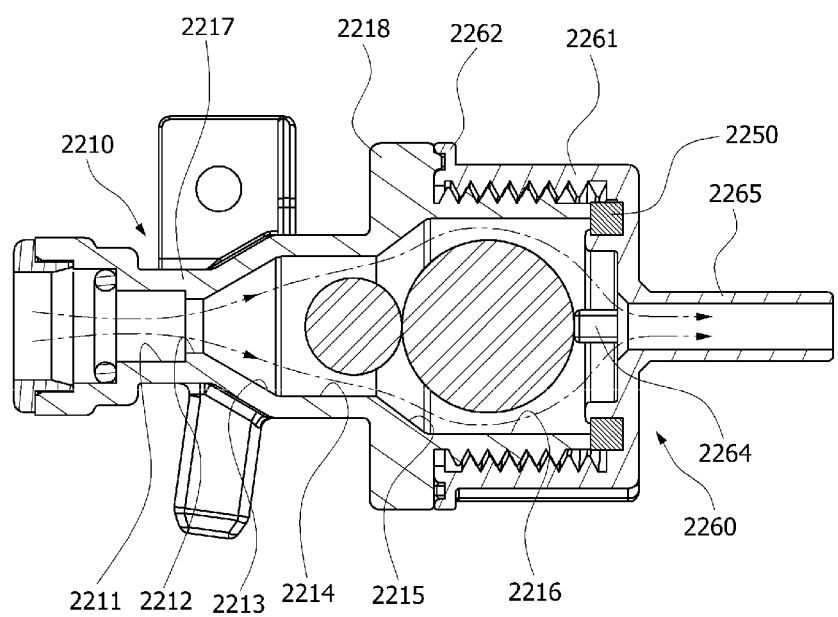
FIG. 49 is a cross-sectional view illustrating an operation state of the modification of the check valve device of the washing machine in accordance with embodiment(s) of the present invention.

FIG. 35 is a perspective view of a washing machine in accordance with another embodiment of the present invention. FIG. 36 is a rear perspective view of the washing machine in accordance with embodiment(s) of the present invention. FIG. 37 is an exploded perspective view of the washing machine in accordance with embodiment(s) of the present invention. FIG. 38 is a side cross-sectional view of the washing machine in accordance with embodiment(s) of the present invention. FIG. 39 is a perspective view illustrating an installation state of a check valve device of the washing machine in accordance with embodiment(s) of the present invention. FIG. 40 is a perspective view of the check valve device of the washing machine in accordance with embodiment(s) of the present invention. FIG. 41 is an exploded perspective view of the check valve device of the washing machine in accordance with embodiment(s) of the present invention. FIG. 42 is a perspective view of first and second main bodies of the check valve device of the washing machine in accordance with embodiment(s) of the present invention. FIG. 43 is a cross-sectional perspective view of the check valve device of the washing machine in accordance with embodiment(s) of the present invention. FIG. 44 is a cross-sectional view of the check valve device of the washing machine in accordance with embodiment(s) of the present invention. FIG. 45 is a cross-sectional view illustrating an operation state of the check valve device of the washing machine in accordance with embodiment(s) of the present invention. FIG. 46 is an exploded perspective view of a modification of the check valve device of the washing machine in accordance with embodiment(s) of the present invention. FIG. 47 is a cross-sectional perspective view of the modification of the check valve device of the washing machine in accordance with embodiment(s) of the present invention. FIG. 48 is a cross-sectional view of the modification of the check valve device of the washing machine in accordance with embodiment(s) of the present invention. FIG. 49 is a cross-sectional view illustrating an operation state of the modification of the check valve device of the washing machine in accordance with embodiment(s) of the present invention.

Referring to FIGS. 35 to 40, the washing machine 2100 in accordance with embodiment(s) of the present invention includes a rear panel 2110, a tub 2120, a front panel 2130, a drum 2140, a driving unit 2150, a cover 3160, a water supply device 2170, a drain device 2175, and a check valve device 2200. The washing machine 2100 in accordance with embodiment(s) of the present invention is a wall-mounted drum washing machine.

The rear panel 2110 has a panel shape and is mounted and/or fixed on a wall or other vertical surface W. In the present embodiment, the rear panel 2110 has a substantially rectangular shape of which the corners are rounded. However, the present invention is not limited thereto, and the rear panel 2110 may be formed in various shapes such as rectangular, square, square with rounded corners, circular and elliptical.

The rear panel 2110 includes a panel portion 2111, a circumference portion 2112, and a rib portion 2113.

The panel portion 2111 has a panel shape extending in parallel to the wall surface W.

The circumference portion 2112 protrudes from the edge of the panel portion 2111 toward the wall surface W, and a space is formed between the panel portion 2111 and the wall surface W by the circumference portion 2112.

The rib portion 2113 includes a plurality of ribs on a rear surface of the panel portion 2111 in the space formed between the panel portion 2111 and the wall surface W.

Since the strength of the rear panel 2110 is reinforced by the rib portion 2113, deformation and/or damage to the rear panel 2110 from vibrations generated by rotation of the drum 2140 may be reduced, minimized or prevented.

A part forming the exterior of the washing machine 2100 may be referred to as a housing. Thus, the rear panel 2110 forming a rear surface portion of the washing machine 2100, the cover 2160 forming a side surface portion, and a front surface portion of the washing machine 2100 are collectively referred to as the housing.

In the present embodiment, a rear surface portion of the housing of the washing machine 2100, that is, the rear surface portion of the rear panel 2110, has a through-hole 2115 through which a fixing anchor is inserted for coupling to the wall surface W. A buffer member 2117 is interposed between the through-hole 2115 and the wall surface W.

The tub 2120 is supported by the rear panel 2110, and contains wash water. In embodiment(s) of the present invention, the tub 2120 having a cylindrical shape is integrally connected to the front surface of the rear panel 2110, and protrudes forward from the front surface of the rear panel

2110. For example, the tub 2120 and rear panel 2110 may be unitary, and formed simultaneously by a molding process such as injection molding.

The tub 2120 has a drain hole 2126 at the bottom thereof, and wash water of the tub 2120 is discharged to the outside of the tub 2120 through the drain hole 2126.

The rotatable drum 2140 having a cylindrical shape is installed in the tub 2120, and houses laundry therein. The drum 2140 has a rotatable driving shaft 2143 installed in the rear panel 2110, and is connected to a driving unit 2150 installed on the rear surface of the rear panel 2110 through the panel potion 2111.

The driving unit 2150 provides power to the drum 2140.

The driving unit 2150 in accordance with embodiment(s) of the present invention includes a motor (not illustrated), a driving wheel 2153, and a belt 2155.

The motor is installed on the front surface of the rear panel 2110, and has a rotating shaft 2152 extending to the rear surface of the rear panel 2110 through the rear panel 2110.

The rotatable driving wheel 2153 is installed on the rear surface of the panel portion 2111 in a space in the rear side of the panel portion 2111, and connected to the driving shaft 2143 of the drum 2140.

The belt 2155 transmits the power of the motor to the driving wheel 2153. One part of the belt 2155 contacts the circumference of the rotating shaft 2152 of the motor, and another part of the belt 2155 contacts the circumference of the driving wheel 2153.

As the motor is driven, the torque of the motor is transmitted to the driving wheel 2153 through the belt 2155, and the drum 2140 connected to the driving wheel 2153 rotates to perform a washing operation.

The front panel 2130 has an opening 2132 at a position corresponding to an opening of the tub 2120, and is installed on the front surface of the tub 2120. The front panel 2130 includes a control unit 2133 at the bottom thereof, and has a detergent box installation hole 2135 and a conditioner box installation hole 2137 at the top thereof.

The control unit 2133 is connected to a manipulation unit 2164 in a cover portion 2163, and controls water supply operations, drainage, spin-drying, rotation of the drum 2140 and the like according to an operation and/or manipulation of or by the manipulation unit 2164.

The cover 2160 is installed on the rear panel 2110 so as to cover the tub 2120 and the front panel 2130, thereby forming the exterior of the wall-mounted drum washing machine 2100 in accordance with embodiment(s) of the present invention.

The cover 2160 in accordance with embodiment(s) of the present invention includes a box portion 2161 and the cover portion 2163.

The box portion 2161 is installed on the rear panel 2110 so as to cover the circumference of the tub 2120.

The cover portion 2163 is coupled to a front surface of the box portion 2161 so as to cover the front panel 2130, and includes a door 2165 installed at a position corresponding to the opening 2132.

The cover portion 2163 includes a manipulation unit 2164 at the bottom thereof. The manipulation unit 2164 has manipulation buttons, a figure display device and the like, and is connected to the control unit 2133.

The detergent box 2166 configured to contain detergent is detachably coupled to a detergent box installation hole portion 2135, and the conditioner box 2167 configured to contain conditioner is detachably coupled to a conditioner box installation hole portion 2137.

The water supply device 2710 is coupled to the top of the rear panel 2110, and supplies wash water from an external water supply source through the check valve device 2200 and the like into the tub 2120.

The drain device 2175 discharges wash water from the tub 2120 to the outside of the washing machine 2100, and particularly, outside of the cover 2160 or the rear panel 2110. The drain device 2175 in accordance with the present embodiment includes a drain hole 2176, a drain pump 2177, and a drain pipe 2178.

The drain hole 2176 is at the bottom of the tub 2120, and wash water within the tub 2120 is discharged to the outside of the tub 2120 through the drain hole 2176.

The drain pump 2177 is installed at the bottom of the tub 2120 at a position corresponding or proximate to the drain hole 2176. The top of the drain pump 2177 is coupled to the bottom of the tub 2120 so as to communicate with the drain hole 2176, and a rear end portion of the drain pump 2177 facing the rear panel 2110 is connected to the drain pipe 2178.

The drain pipe 2178 is connected to the drain pump 2177, and extends to the outside of the washing machine 2100 through the rear panel 2110. When the drain pump 2177 is operated, wash water within the tub 2120 is forcibly discharged toward the drain pipe 2178 through the drain hole 2176, and when the drain pump 2177 is not operated, the discharge of the wash water is stopped.

The check valve device 2200 is between the cover 2160 and the tub 2120. The bottom of the check valve device 2200 is connected to a supply pipe 2201 which supplies wash water from an external water supply source, and the top of the check valve device 2200 is connected to water supply pipes 2202 and 2203 which are connected to two water supply devices 2170, respectively, through a Y-shaped divider (not illustrated).

As the backflow of wash water is blocked by the check valve device 2200, the wash water flows sequentially through the water supply pipe 2201, the check valve device 2200, the water supply pipes 2202 and 2203, and the water supply device 2170.

Referring to FIGS. 40 to 44, the check valve device 2200 in accordance with embodiment(s) of the present invention includes a first main body 2210, a first opening/closing unit 2220, a second opening/closing unit 2230, a filter unit 2240, a sealing unit 2250 and a second main body 2260.

The first main body 2210 includes a first housing 2217, a first flange portion 2218, and a first screw thread 2219.

The first housing 2217 forms the exterior of the first main body portion 2217.

The first flange portion 2218 protrudes in a ring shape on the outside of the first housing 2217. As the first flange portion 2218 is closely attached to the second flange portion 2262 of the second body portion 2260, the first housing 2217 is water-tightly coupled to a second housing 2261.

The first screw thread 2219 is on one outside portion of the first housing 2217, which is adjacent to the second main body 2260 based on the first flange portion 2218. The second body 2260 has a second screw thread 2263 on the inside thereof configured to be coupled (e.g., complementary) to the first screw thread 2219.

As the first and second screw threads 2219 and 2263 are coupled to each other through the screws, the first and second main bodies 2210 and 2260 may be reliably coupled to each other. Since the first and second main bodies 2210 and 2260 may be simply separated only by releasing the screw coupling, internal parts may be easily replaced or repaired.

The first flange portion 2218 has a coupling protrusion 2218a protruding toward the second main body 2260, and more particularly, to the second flange portion 2262. The second flange portion 2262 has a coupling groove 2262a at a position facing the first flange portion 2218 configured to receive the coupling protrusion 2218a.

When the screw coupling between the first and second screw threads 2219 and 2263 is completed, the first and second flange portions 2218 and 2262 are closely attached to each other. At this time, since the coupling protrusion 2218a is received in the coupling groove 2262a, the screw coupling between the first and second screw threads 2219 and 2263 may be further prevented from being inadvertently released by an external force.

The first housing 2217 has an introduction hole portion 2211 and a first flow path portion 2212 to 2216 therein.

The introduction hole portion 2211 is connected to the supply pipe 2202 to introduce wash water from an external water supply source.

The first flow path portions 2212 to 2216 are connected to the introduction hole portion 2211, and include a first opening/closing hole portion 2212, a first inclined hole portion 2213, a second opening/closing hole portion 2214, a second inclined hole portion 2215, and a connection hole portion 2216.

The first opening/closing hole portion 2212 is connected to the introduction hole portion 2211, and has an internal flow path opened or closed by the first opening/closing unit 2220.

The first inclined hole portion 2213 is connected to the first opening/closing hole portion 2212, and has an inner diameter which increases as the distance from the first opening/closing hole portion 2212 increases, that is, as the distance from the second opening/closing hole portion 2214 decreases.

The second opening/closing hole portion 2214 is connected to the first inclined hole portion 2213, and has a larger inner diameter than the first opening/closing hole portion 2212. In accordance with the present embodiment, the second opening/closing hole portion 2214 has the same inner diameter as the maximum inner diameter of the first inclined hole portion 2213.

The second inclined hole portion 2215 is connected to the second opening/closing hole portion 2214, and has an inner diameter which increases as the distance from the second opening/closing hole portion 2214 increases, that is, as the distance from the connection hole portion 2216 decreases.

The connection hole portion 2216 is connected to the second inclined hole portion 2215, and has a larger inner diameter than the second opening/closing hole portion 2214. In accordance with one embodiment, the connection hole portion 2216 has the same inner diameter as the maximum inner diameter of the second inclined hole portion 2215.

The opening/closing units 2220 and 2230 open and close the first flow path portion 2212 to 2216 at a plurality of different points. Thus, since the backflow of wash water is blocked at multiple points, the backflow prevention performance of the washing machine may be improved.

In accordance with embodiment(s) of the present invention, the opening/closing units 2220 and 2230 include the first opening/closing unit 2220 and the second opening/closing unit 2230.

The first opening/closing unit 2220 serves to block backflow of wash water through the first opening/closing hole portion 2212, while opening and/or closing the first opening/closing hole portion 2212. For this operation, the first opening/closing portion 2220 has a spherical shape having a larger outer diameter than the first opening/closing hole portion 2212 (or the interface therewith).

The first opening/closing unit 2220 has a smaller outer diameter than the maximum inner diameter of the second opening/closing hole portion 2214, that is, the first inclined hole portion 2213 such that the first opening/closing unit 2220 smoothly moves inside the first flow path portion 2212 to 2216.

Referring to FIG. 45, when wash water flows forward, the first opening/closing unit 2220 opens the first opening/closing hole portion 2212 by separating from the first opening/closing hole portion 2212 by the pressure of the wash water passing through the first opening/closing hole portion 2212. Thus, the forward flow of the wash water is continuously maintained after the forward flow is started.

On the other hand, when wash water flows backward (refer to FIG. 44), the first opening/closing unit 2220 closes the first opening/closing hole portion 2212 while closely attached to the first inclined hole portion 2213 by the pressure of the wash water flowing backward. As the first opening/closing unit 2220 is closely attached to the first inclined hole portion 2213, the flow path of wash water from the inclined hole portion 2213 to the first opening/closing hole portion 2212 is closed. Thus, the wash water does not flow backward toward the introduction hole portion 2211 or the supply pipe 2201.

In the present embodiment, the operation of the first opening/closing unit 2220 to block the backflow of wash water is performed when the second opening/closing unit 2230 does not normally operate because of a breakdown of the second opening/closing unit 2230 or other reasons. That is, when the second opening/closing unit 2230 normally operates, a backflow of wash water may be blocked by the second opening/closing unit 2230, and the first opening/closing unit 2220 need not close the first opening/closing hole portion 2212 under such conditions.

The second opening/closing unit 2230 blocks the backflow of wash water through the second opening/closing hole portion 2214 when closing the second opening/closing hole portion 2214. For this operation, the second opening/closing unit 2230 has a spherical shape having a larger outer diameter than the second opening/closing hole portion 2214.

The second opening/closing unit 2230 has an outer diameter smaller than the maximum inner diameter of the connection hole portion 2216 and larger than the minimum diameter of the second inclined hole portion 2215 so that the second opening/closing unit 2230 smoothly moves inside the first flow path portion 2212 to 2216.

Referring to FIG. 45, when wash water flows forward, the second opening/closing unit 2230 opens the second opening/closing hole portion 2214 while separated from the second opening/closing hole portion 2214 by the pressure of wash water passing through the second opening/closing hole portion 2214. Thus, the forward flow of the wash water is continuously maintained after the forward flow is started.

On the other hand, when wash water flows backward (refer to FIG. 44), the second opening/closing unit 2230 closes the second opening/closing hole portion 2214 while closely attached to the second inclined hole portion 2215 by the pressure of the wash water flowing backward. As the second opening/closing unit 2230 is closely attached to the second inclined hole portion 2215, the flow path of wash water from the second inclined hole portion 2215 to the second opening/closing hole portion 2214 is closed. Thus, the wash water does not flow backward toward the introduction hole 2211 or the supply pipe 2201.

The filter unit 2240 is between the second opening/closing unit 2230 and the second main body 2260, or more specifically, a discharge hole portion 2265, so as to filter foreign matter. The filter unit 2240 may filter foreign matter, even when wash water flows backward as well as when wash water flows forward.

When wash water flows backward, foreign matter is filtered by the filter unit 2240 before reaching the second inclined hole portion 2215. Thus, the foreign matter in not in the second inclined hole portion 2215 or the first inclined hole portion 2213. The operation of the filter unit 2240 may improve the backflow prevention performance through the first opening/closing unit 2220 and/or the second opening/closing unit 2230.

Since foreign matter is filtered through the filter unit 2240, it is possible to prevent a situation in which the second opening/closing unit 2230 is not closely attached to the second inclined hole portion 2215 due to the foreign matter, or a situation in which the first opening/closing unit 2220 is not closely attached to the first inclined hole portion 2213 due to the foreign matter.

The filter unit 2240 includes a filter housing 2241, a filter 2242 and a spacer piece 2243.

The filter housing 2241 has a hollow, cylindrical shape configured to surround the second opening/closing unit 2230. Since the filter housing 2241 has an inner diameter larger than the outer diameter of the second opening/closing unit 2230, the second opening/closing unit 2230 may be smoothly moved by the pressure of wash water, even though the filter housing 2241 is between the second opening/closing unit 2230 and the discharge hole portion 2265.

The filter 2242 is at one end of the filter housing 2241, which is close to the discharge hole portion 2265, and filters foreign matter moving forward with the wash water. In one embodiment, when wash water flows forward, the motion of the second opening/closing unit 2230 is restricted by the filter 2242.

That is, the second opening/closing unit 2230 separated from the second opening/closing hole portion 2214 by the pressure of wash water is restricted from moving toward the discharge hole portion 2265 by the filter 2242. Thus, since the filter 2242 may prevent the second opening/closing unit 2230 from closing the discharge hole portion 2265, the forward flow of the wash water may be continuously maintained.

The spacer piece 2243 protrudes from one end of the filter housing 2241 toward the discharge hole portion 2265. Thus, the filter housing 2241 is spaced by a distance corresponding to the protrusion height of the spacer piece 2243 from the inner surface of the second main body 2260 having the discharge hole portion 2265 therein. Therefore, a gap between the filter 2242 and the discharge hole portion 2265 may be set or defined by the spacer piece 2243.

The sealing unit 2250 is between the first and second main bodies 2210 and 2260 and seals the gap between the first main body 2210 and the second main body 2260, thereby improving water-tightness. In accordance with one embodiment, the sealing unit 2250 is at one end of the first housing 2217 having the first screw thread 2219 therein, and on the inner surface of the second main body 2260, and water-tightly seals the space between the one end of the first housing 2217 and the inner surface of the second main body 2260.

The second main body 2260 is detachably coupled to the first main body 2210. The second main body 2260 includes the second housing 2261, the second flange portion 2262, the second screw thread 2263, one or more (e.g., a pair of) protrusions 2264, and the discharge hole portion 2265.

The second housing 2261 forms the exterior of the second main body 2260.

The second flange portion 2262 protrudes in a ring shape on the outside of the second housing 2261. The second flange portion 2262 has a coupling groove 2262a therein. When the second flange portion 2262 is closely attached to the first flange portion 2218, the coupling protrusion 2218a is received in the coupling groove 2262a.

The second screw thread 2263 is on the inner surface of the second housing 2261, and couples the first and second main bodies 2210 and 2260 through screw coupling with the first screw thread 2219.

The protrusion(s) 2264 protrude toward the first main body 2210 from the inner surface of the second housing 2261 having the discharge hole portion 2265 therein. In one embodiment, a pair of protrusions 2264 are on opposite sides of the discharge hole portion 2265, and the spacer piece 2243 is between the pair of protrusions 2264.

The discharge hole portion 2265 communicates with the first flow path 2212 to 2216, and wash water moving through the first flow path 2212 to 2216 may be discharged to a Y-shaped divider. The wash water passing through the Y-shaped divider is transferred to the water supply device 2170 through the water supply pipes 2202 and 2203.

Referring to FIGS. 46 to 49, a modification of the check valve device will be described. In accordance with the modification of the check valve device, the filter unit 2240 is omitted in comparison to the above-described embodiment. Thus, the detailed descriptions of the same components as those of the above-described embodiments are omitted herein.

In accordance with the modification of the check valve device, when the second opening/closing unit 2230 moves along a forward flow of wash water (refer to FIG. 49), the motion of the second opening/closing unit 2230 toward the discharge hole portion 2265 is restricted by the protrusions 2264, because the filter unit 2240 is omitted.

That is, since the protrusions 2264 protrude toward the first main body 2210, the motion of the second opening/closing unit 2230 toward the discharge hole portion 2265 may be allowed to only a preset point, but is then restricted by the protrusions 2264. Thus, the discharge hole portion 2265 is not closed.

In accordance with the modification of the check valve device, the protrusions 2264 may prevent the second opening/closing unit 2230 from closing the discharge hole portion 2265, and the forward flow of wash water may be continuously maintained.

In accordance with various embodiments of the present invention, the backflow of wash water may be blocked at the plurality of points in the first flow path by the opening/closing units 2220 and 2230. Thus, the backflow prevention performance of the washing machine may be improved.

Furthermore, although the backflow of wash water may not be blocked at a specific point due to introduction of foreign matter or the like, the backflow of wash water may be blocked at another point. Thus, it is possible to prevent a breakdown or malfunction of a washing machine that may be caused by the backflow of wash water.

Furthermore, the installation of the filter unit 2240 may prevent the reduction of the backflow prevention performance, which may be caused by foreign matter in the first flow paths 2212 to 2216.

Figure 50:
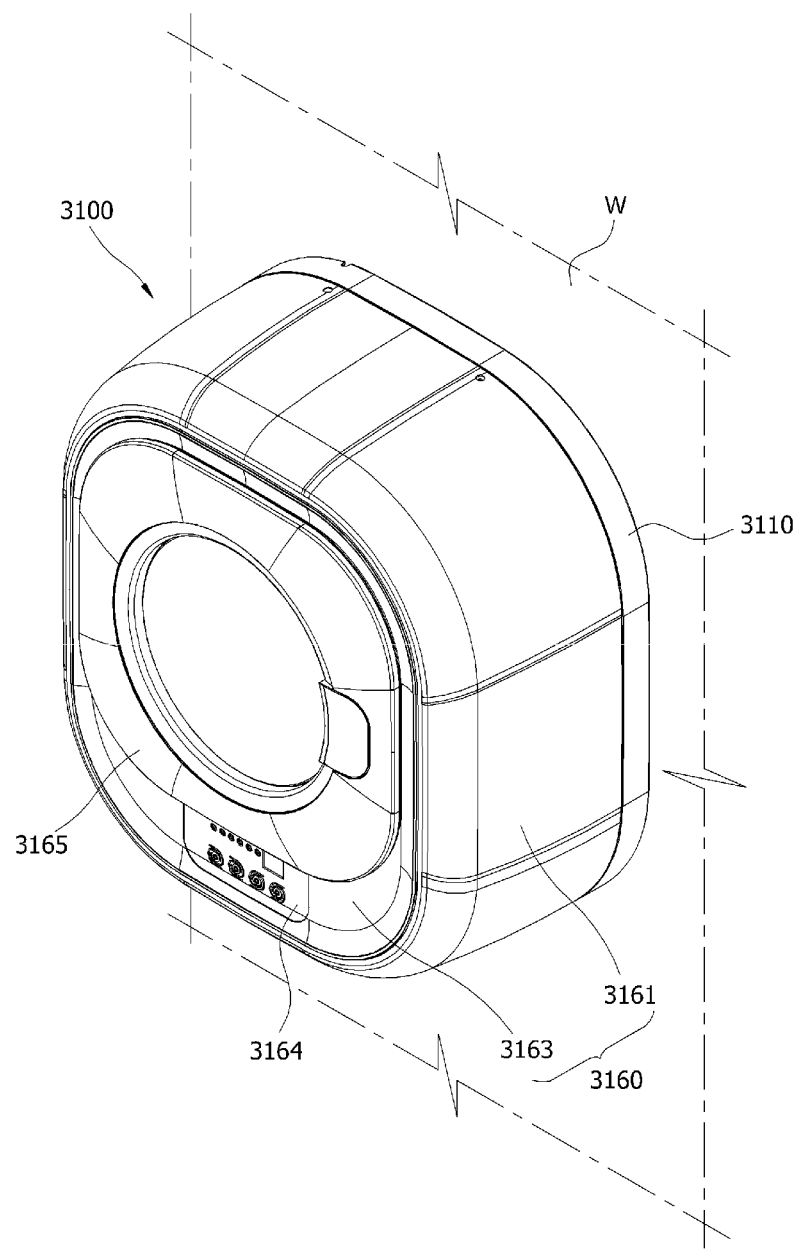
FIG. 50 is a perspective view of a washing machine in accordance with another embodiment of the present invention.
Figure 51:
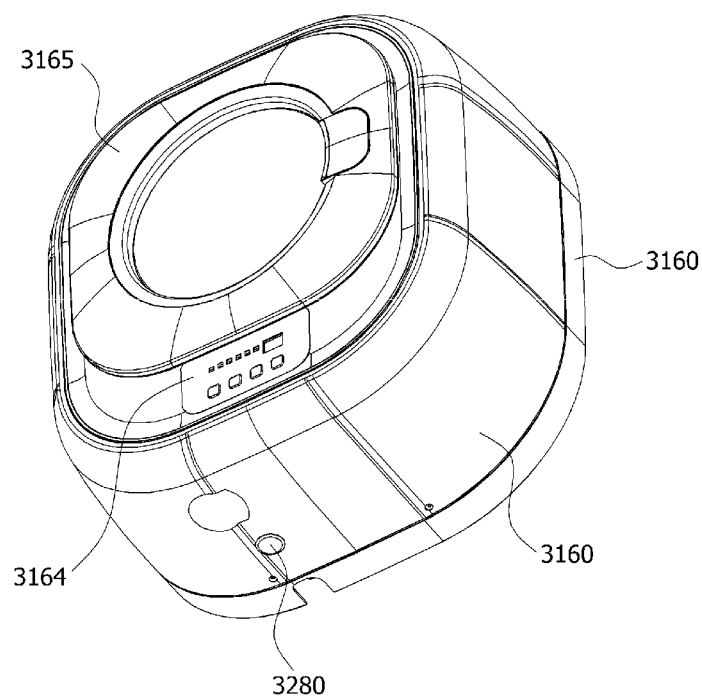
FIG. 51 is a bottom perspective view of the washing machine in accordance with embodiment(s) of the present invention.
Figure 52:
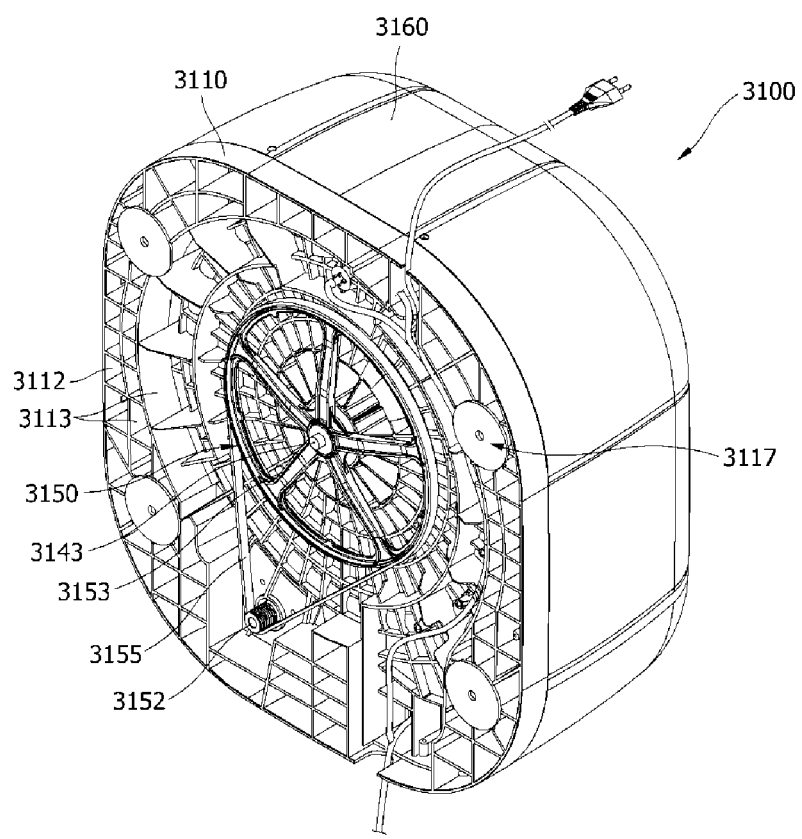
FIG. 52 is a rear perspective view of the washing machine in accordance with embodiment(s) of the present invention.
Figure 53:
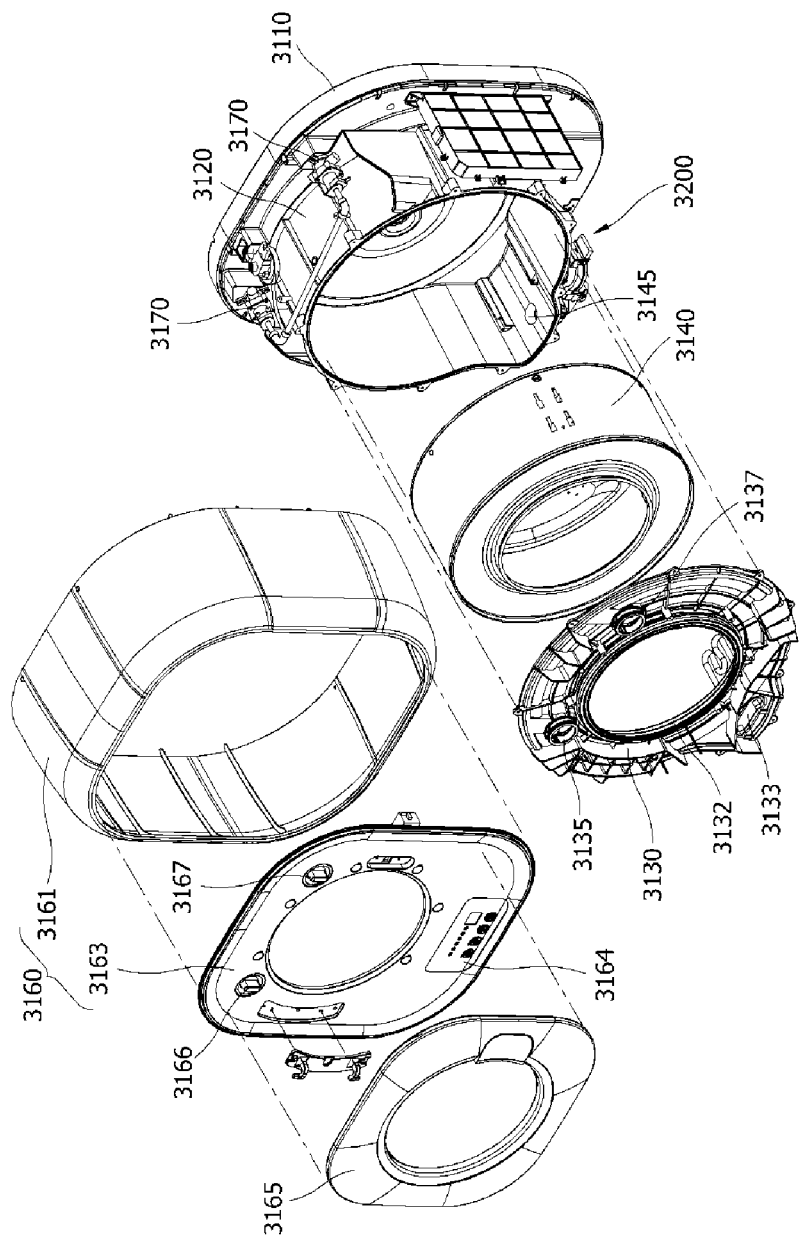
FIG. 53 is an exploded perspective view of the washing machine in accordance with embodiment(s) of the present invention.
Figure 54:
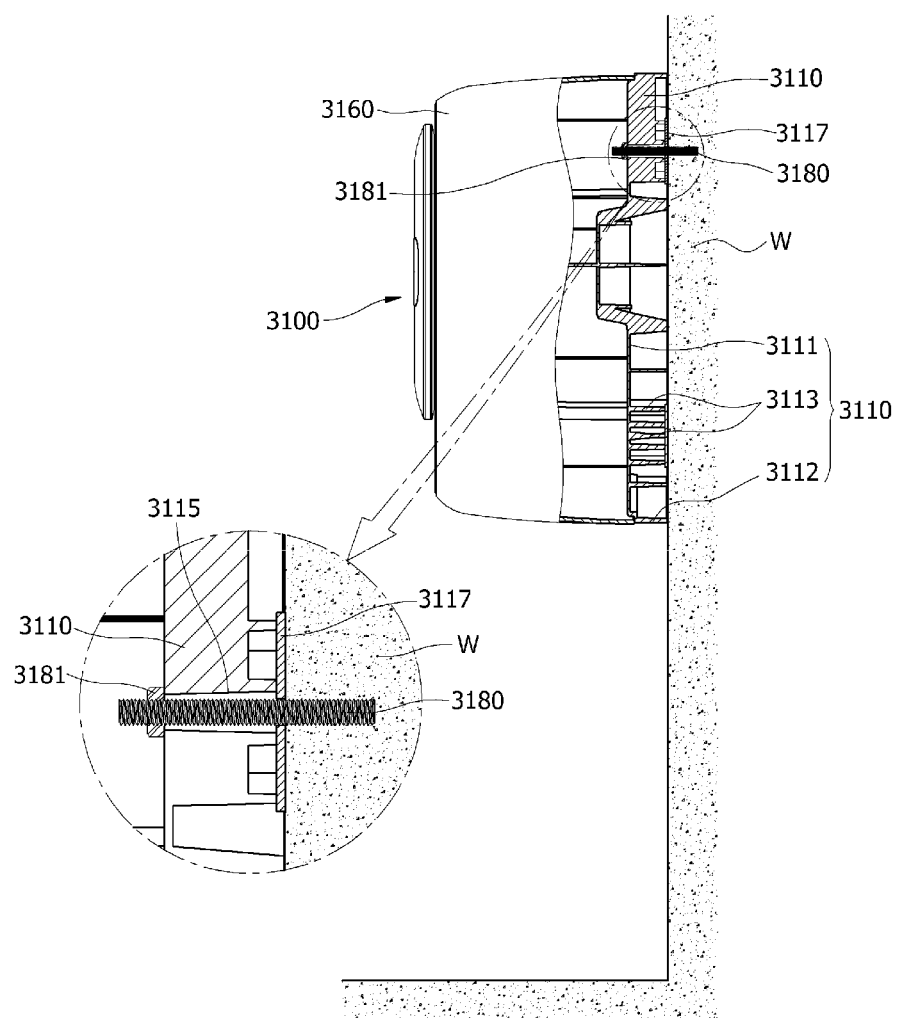
FIG. 54 is a side cross-sectional view of the washing machine in accordance with embodiment(s) of the present invention.
Figure 55:
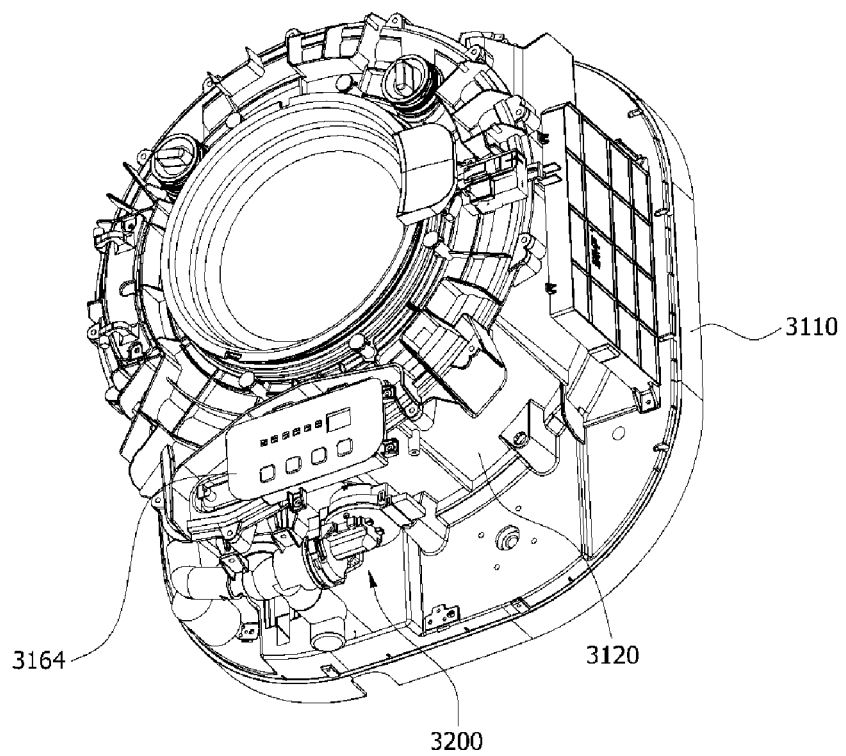
FIG. 55 is a perspective view illustrating an installation state of the washing machine in accordance with embodiment(s) of the present invention.
Figure 56:
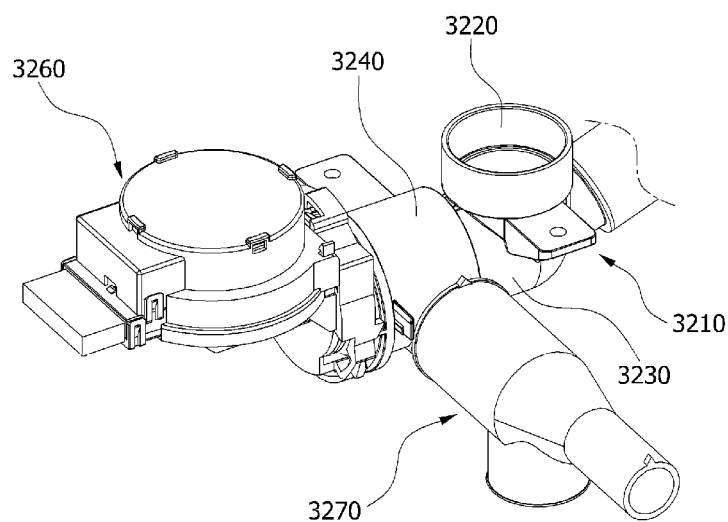
FIG. 56 is a perspective view of a drain device of the washing machine in accordance with embodiment(s) of the present invention.
Figure 57:
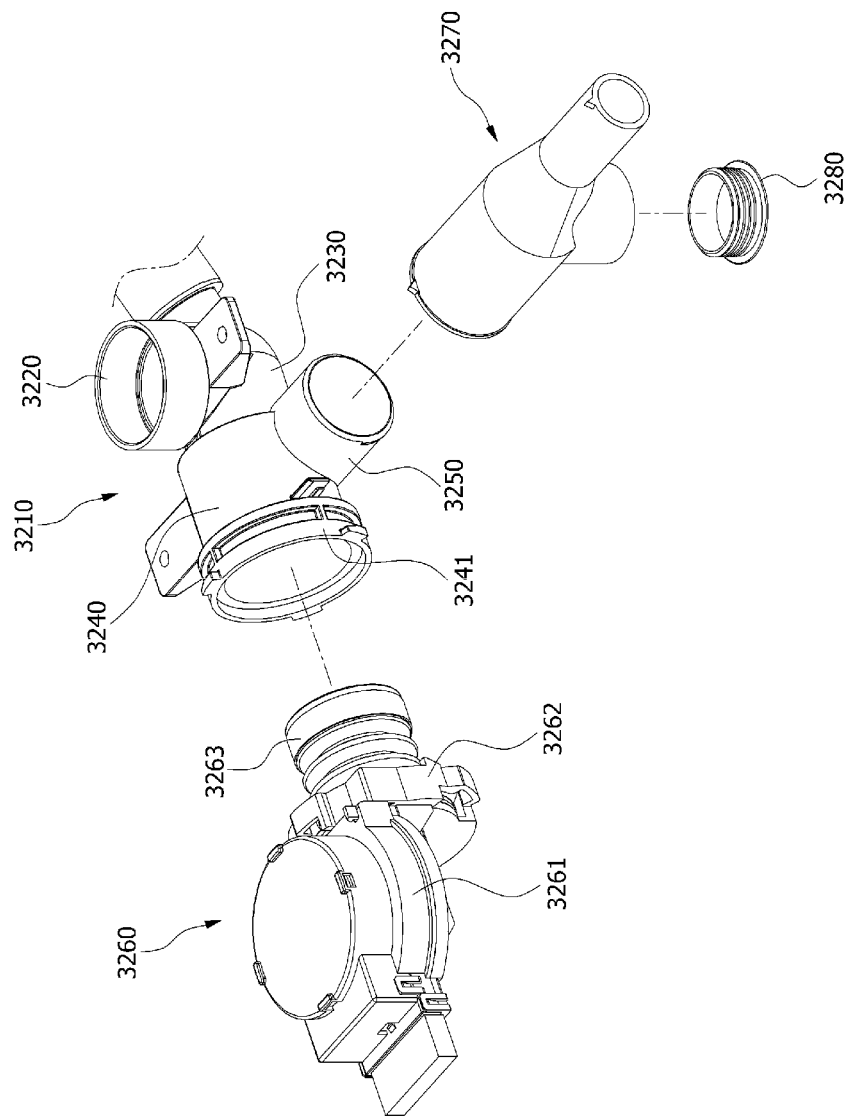
FIG. 57 is an exploded view of the drain device of the washing machine in accordance with embodiment(s) of the present invention.
Figure 58:
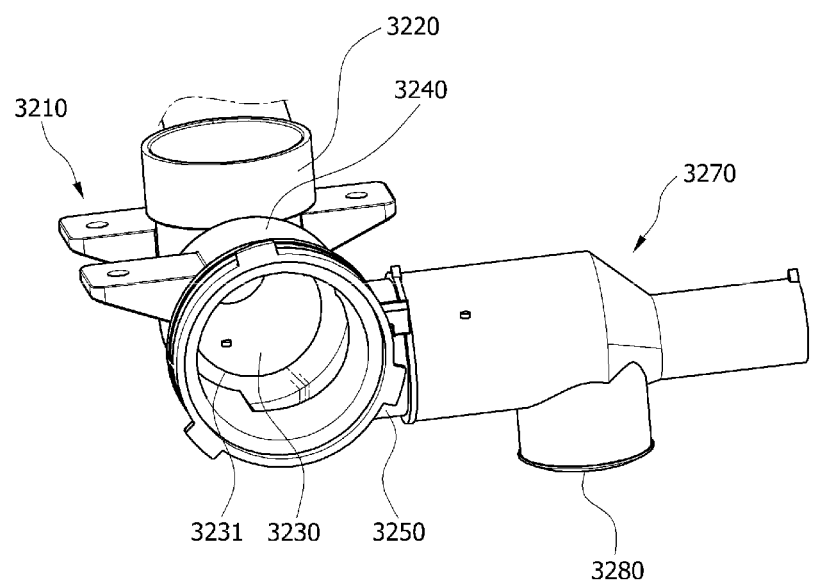
FIG. 58 is a perspective view illustrating a connection state between a connection pipe unit and a drain hose unit in the washing machine in accordance with embodiment(s) of the present invention.
Figure 59:
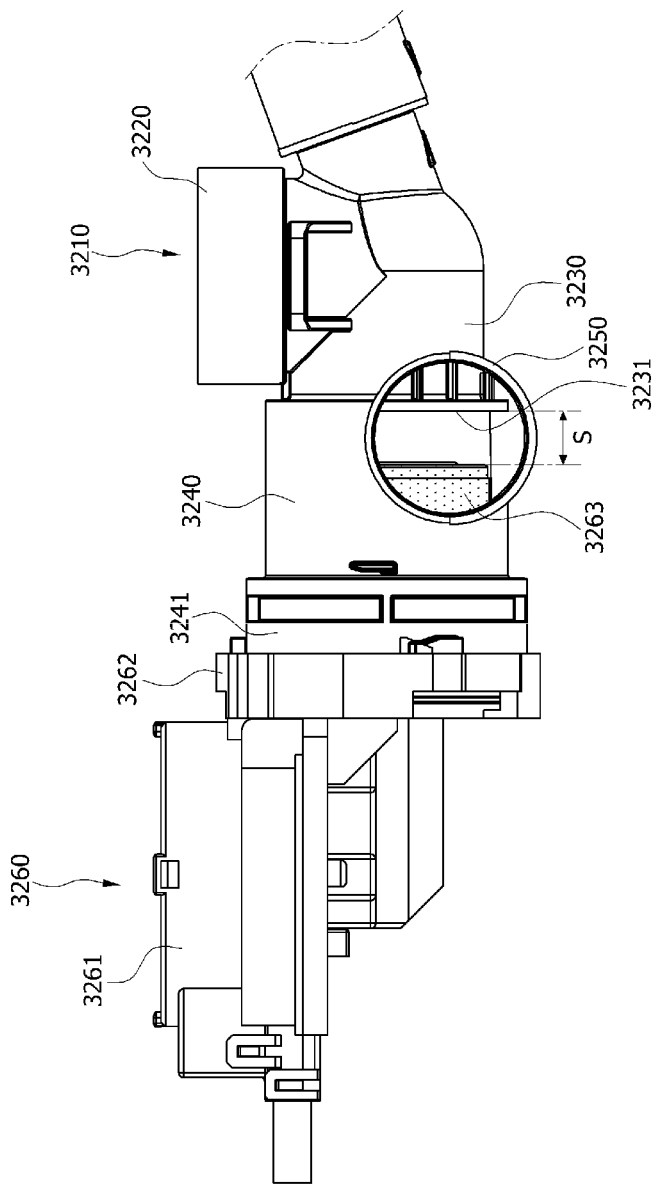
FIG. 59 is a side view illustrating a connection state between the connection pipe unit and a drain motor unit in the washing machine in accordance with embodiment(s) of the present invention.
Figure 60:
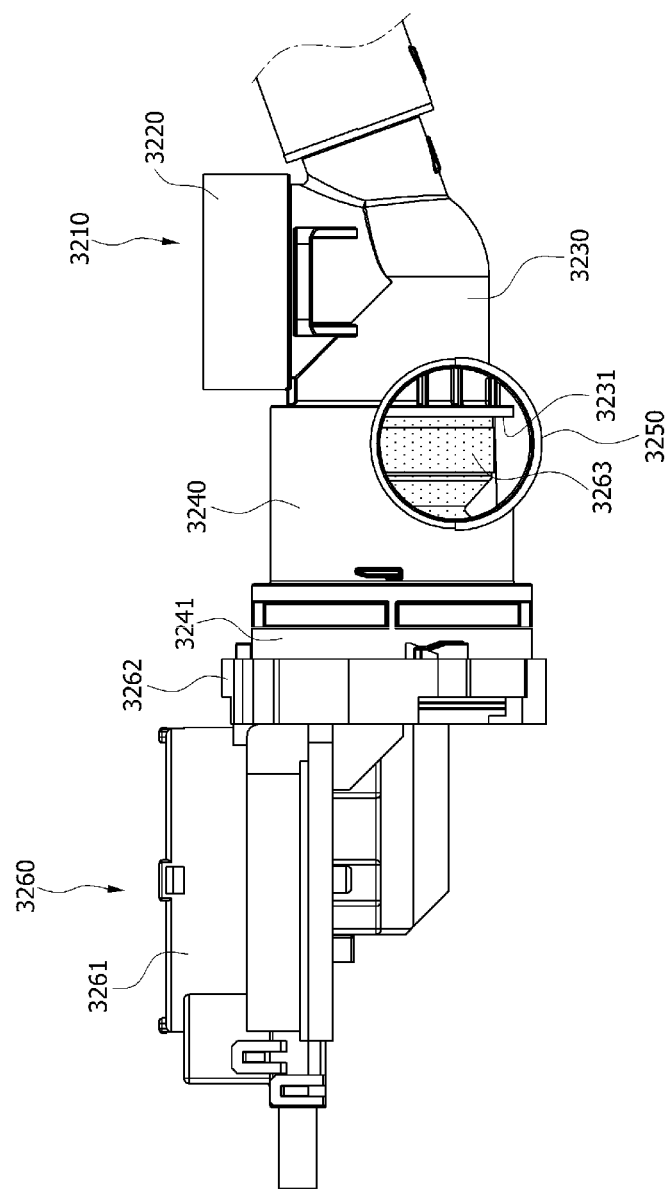
FIG. 60 is a side view illustrating a state in which a bellows portion is extended and moved in the washing machine in accordance with embodiment(s) of the present invention.
Figure 61:
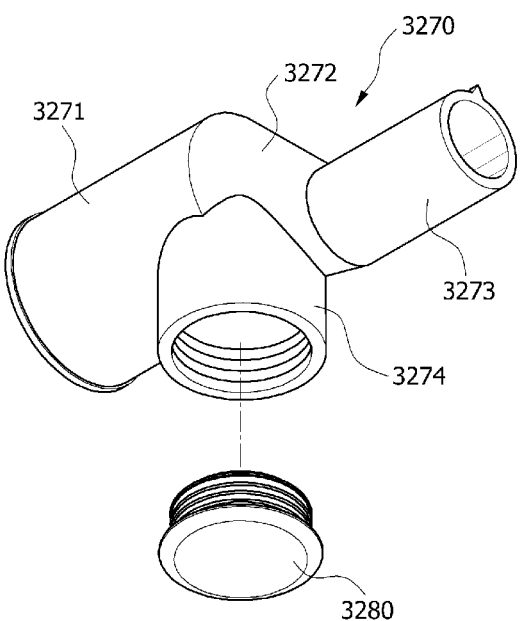
FIG. 61 is a perspective view illustrating the drain hose unit and a cap unit of the washing machine in accordance with embodiment(s) of the present invention
Figure 62:
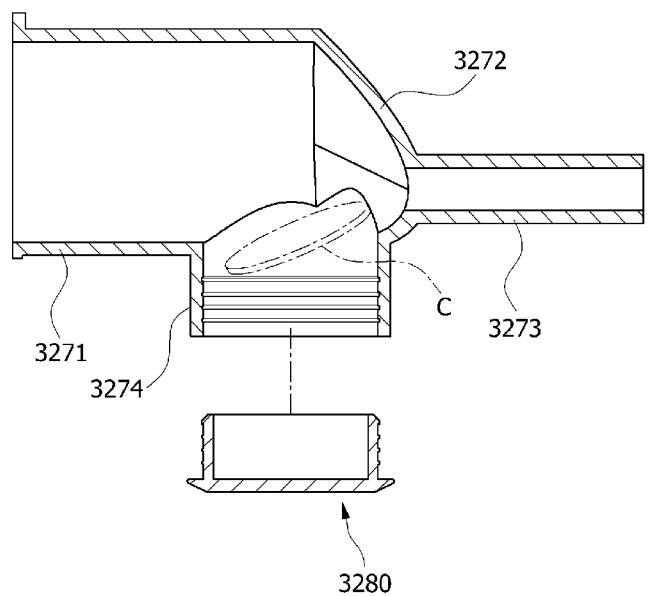
FIG. 62 is a side cross-sectional view of the drain hose unit and the cap unit of the washing machine in accordance with embodiment(s) of the present invention.
Figure 63:
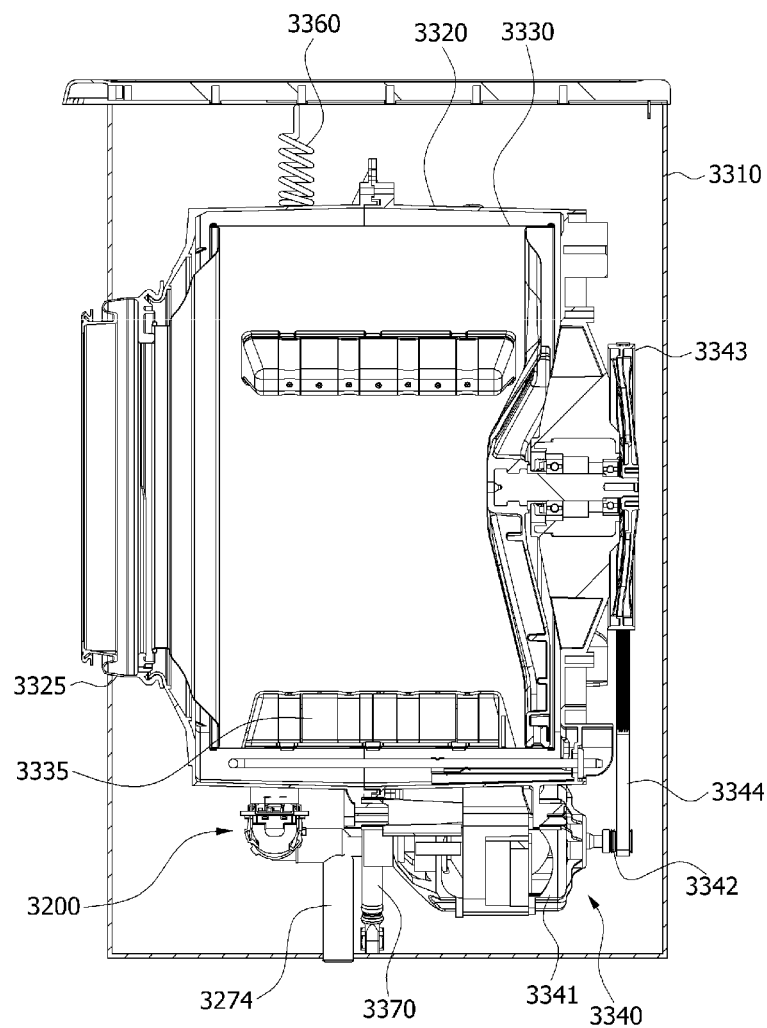
FIG. 63 is a perspective view illustrating a modification of the washing machine in accordance with embodiment(s) of the present invention.

FIG. 50 is a perspective view of a washing machine in accordance with another embodiment of the present invention. FIG. 51 is a bottom perspective view of the washing machine in accordance with embodiment(s) of the present invention. FIG. 52 is a rear perspective view of the washing machine in accordance with embodiment(s) of the present invention. FIG. 53 is an exploded perspective view of the washing machine in accordance with embodiment(s) of the present invention. FIG. 54 is a side cross-sectional view of the washing machine in accordance with embodiment(s) of the present invention. FIG. 55 is a perspective view illustrating an installation state of the washing machine in accordance with embodiment(s) of the present invention. FIG. 56 is a perspective view of a drain device of the washing machine in accordance with embodiment(s) of the present invention. FIG. 57 is an exploded view of the drain device of the washing machine in accordance with embodiment(s) of the present invention. FIG. 58 is a perspective view illustrating a connection state between a connection pipe unit and a drain hose unit in the washing machine in accordance with embodiment(s) of the present invention. FIG. 59 is a side view illustrating a connection state between the connection pipe unit and a drain motor unit in the washing machine in accordance with embodiment(s) of the present invention. FIG. 60 is a side view illustrating a state in which a bellows portion is extended and moved in the washing machine in accordance with embodiment(s) of the present invention. FIG. 61 is a perspective view illustrating the drain hose unit and a cap unit of the washing machine in accordance with embodiment(s) of the present invention. FIG. 62 is a side cross-sectional view of the drain hose unit and the cap unit of the washing machine in accordance with embodiment(s) of the present invention. FIG. 63 is a perspective view illustrating a modification of the washing machine in accordance with embodiment(s) of the present invention.

Referring to FIGS. 50 to 55, the washing machine 3100 in accordance with one or more embodiments of the present invention includes a rear panel 3110, a tub 3120, a front panel 3130, a drum 3140, a driving unit 3150, a cover 3160, a water supply device 3170 and a drain device 3200. The washing machine 3100 in accordance with embodiment(s) of the present invention is a wall-mounted drum washing machine.

The rear panel 3110 has a panel shape and is mounted and/or fixed on a wall or other vertical surface W. In the present embodiment, the rear panel 3110 has a rectangular panel shape of which the corners are rounded. However, the present invention is not limited thereto, and the rear panel 3110 may be formed in various shapes such as rectangular, square, square with rounded corners, circular and elliptical.

The rear panel 3110 includes a panel portion 3111, a circumference portion 3112, and a rib portion 3113.

The panel portion 3111 has a panel shape extending in parallel to the wall surface W.

The circumference portion 3112 protrudes from the edge of the panel portion 3111 toward the wall surface W, and a space is formed between the panel portion 3111 and the wall surface W by the circumference portion 3112.

The rib portion 3113 includes a plurality of ribs on a rear surface of the panel portion 3111 in the space formed between the panel portion 3111 and the wall surface W.

Since the strength of the rear panel 3110 is reinforced by the rib portion 3113, deformation and/or damage to the rear panel 3110 from vibrations generated by rotation of the drum 3140 may be reduced, minimized or prevented.

A part forming the exterior of the washing machine 3100 may be referred to as a housing. Thus, the rear panel 3110 forming a rear surface portion of the washing machine 3100, the cover 3160 forming a side surface portion, and a front surface portion of the washing machine 3100 may be referred to as the housing.

In the present embodiment, a rear surface portion of the housing of the washing machine 3100, that is, the rear surface portion of the rear panel 3110 has a through-hole 3115 through which a fixing anchor is inserted for coupling to the wall surface W. A buffer member 3117 is interposed between the through-hole 3115 and the wall surface W.

Referring to FIGS. 52 to 55, the tub 3120 is supported by the rear panel 3110 and is configured to contain wash water. In embodiment(s) of the present invention, the tub 3120 having a cylindrical shape is integrally connected to the front surface of the rear panel 3110, and protrudes forward from the front surface of the rear panel 3110. For example, the tub 3120 and rear panel 3110 may be unitary, and formed simultaneously by a molding process such as injection molding.

The tub 3120 has a drain hole 3145 at the bottom thereof, and wash water within the tub 3120 is discharged to the outside of the tub 3120 through the drain hole 3145.

The rotatable drum 3140 having a cylindrical shape is installed in the tub 3120, and houses laundry therein. The drum 3140 has a rotatable driving shaft 3143 installed in the rear panel 3110, and is connected to a driving unit 3150 installed on the rear surface of the rear panel 3110 through the panel potion 3111.

The driving unit 3150 provides power to the drum 3140. The driving unit 3150 in accordance with embodiment(s) of the present invention includes a motor (not illustrated), a driving wheel 3153, and a belt 3155.

The motor is installed on the front surface of the rear panel 3110, and has a rotating shaft 3152 extending to the rear surface of the rear panel 3110 through the rear panel 3110.

The rotatable driving wheel 3153 is installed on the rear surface of the panel portion 3111 in a space in the rear side of the panel portion 3111, and is connected to the driving shaft 3143 of the drum 3140.

The belt 3155 transmits the power of the motor to the driving wheel 3153. One part of the belt 3155 contacts the circumference of the rotating shaft 3152, and another part of the belt 3155 contacts the circumference of the driving wheel 3153.

As the motor is driven, the torque of the motor is transmitted to the driving wheel 3153 through the belt 3155, and the drum 3140 connected to the driving wheel 3153 rotates to perform a washing operation.

The front panel 3130 has an opening 3132 at a position corresponding to an opening of the tub 3120, and is installed on the front surface of the tub 3120. The front panel 3130 includes a control unit 3133 installed at the bottom thereof, and a detergent box installation hole 3135 and a conditioner box installation hole 3137 at the top thereof.

The control unit 3133 is connected to a manipulation unit 3164 in a cover portion 3163, and controls water supply operations, drainage, spin-drying, rotation of the drum 3140 and the like according to a manipulation and/or operation of or by the manipulation unit 3164.

The cover 3160 is installed on the rear panel 3110 so as to cover the tub 3120 and the front panel 3130, thereby forming the exterior of the wall-mounted drum washing machine 3100 in accordance with embodiment(s) of the present invention.

The cover 3160 in accordance with embodiment(s) of the present invention includes a box portion 3161 and the cover portion 3163.

The box portion 3161 is installed on the rear panel 3110 so as to cover the circumference of the tub 3120.

The cover portion 3163 is coupled to a front surface of the box portion 3161 so as to cover the front panel 3130, and includes a door 3165 installed at a position corresponding to the opening 3132.

The cover portion 3163 includes a manipulation unit 3164 at the bottom thereof. The manipulation unit 3164 has manipulation buttons, a number display device and the like, and is connected to the control unit 3133.

The detergent box 3166 configured to contain detergent is detachably coupled to a detergent box installation hole portion 3135, and the conditioner box 3167 configured to contain conditioner is detachably coupled to a conditioner box installation hole portion 3137.

The water supply device 3170 is coupled to the top of the rear panel 210, and supplies washing water into the tub 3120.

The water supply device 3170 in accordance with embodiment(s) of the present invention includes a water supply valve (not illustrated) and a water supply pipe (not illustrated). The water supply valve serves to control a flow rate of wash water supplied into the tub 3120 through the water supply pipe.

One side of the water supply valve is coupled to the top of the rear panel 3110 and connected to the water supply pipe, and another side of the water supply valve is coupled to the tub 3120 so as to supply wash water received from the water supply pipe into the tub 3120.

The water supply pipe is inserted into the circumference portion 3112 from a water supply source outside the washing machine 3100, and extends to the top of the rear panel 3110 so as to be connected to the water supply valve.

The drain device 3200 is connected to the tub 3120 through the drain hole 3145, and discharges wash water from the tub 3120 to the outside of the washing machine 3100. The drain device 3200 in accordance with embodiment(s) of the present invention may filter foreign matter having a large volume, such as coin or button, among foreign matter in the wash water discharged from the tub 3120.

Referring to FIGS. 56 to 62, the drain device 3200 in accordance with embodiment(s) of the present invention includes a connection pipe unit 3210, a drain motor unit 3260, a drain hose unit 3270 and a cap unit 3280.

The connection pipe unit 3210 is connected to the tub 3120 through the drain hole 3145, and has a wash water flow path therein. Thus, wash water discharged from the tub 3120 moves to the drain hose unit 3270 through the connection pipe unit 3210.

The connection pipe unit 3210 includes a tub connection portion 3220, a central pipe portion 3230, a bellows movement portion 3240, and a discharge hole portion 3250.

The tub connection portion 3220 is connected to the drain hole 3145 so as to receive wash water discharged from the tub 3120.

One side of the central pipe portion 3230 is connected to the tub connection portion 3220, and another side of the central pipe portion 3230 is connected to the bellows movement portion 3240 so as to guide the wash water introduced into the tub connection portion 3220 to the bellows movement portion 3240.

The central pipe portion 3230 has a central bump 3231 formed or characterized by a difference in inner diameter from the bellows movement portion 3240. That is, since the central pipe portion 3230 has a smaller inner diameter than the bellows movement portion 3240, the central bump 3231 is at a connection portion between the central portion 3230 and the bellows movement portion 3240 defined by the inner diameter difference.

One side of the bellows movement portion 3240 is connected to the central pipe portion 3230, and another side of the bellows movement portion 3240 is detachably coupled to the drain motor unit 3260. When the bellows movement portion 3240 and the drain motor unit 3260 are coupled to each other, a bellows portion 3263 of the drain motor unit 3260 may be moved inside the bellows movement portion 3240.

The discharge hole portion 3250 has a hollow cylindrical shape and a flow path therein. One side of one end portion of the discharge hole portion 3250 is connected to the outer surface of the central pipe portion 3230, and another side of the one end portion of the discharge hole portion 3250 is connected to the outer surface of the bellows movement portion 3240. Thus, the central bump 3231 at the connection between the central pipe portion 3230 and the bellows movement portion 3240 may be at a location where the one side and the other side of the one end portion of the discharge hole portion 3250 meet each other.

The discharge hole portion 3250 guides wash water from the bellows movement portion 3240 to the drain hose unit 3270.

The drain motor unit 3260 is coupled to the connection pipe portion 3210, or more specifically, to the bellows movement portion 3240 so as to control the movement of wash water through the connection pipe portion 3210. That is, a drain process of the washing machine 3100 in accordance with embodiment(s) of the present invention may be operated and stopped by controlling the movement of wash water in the connection pipe portion 3210 through the drain motor unit 3260.

The drain motor unit 3260 includes a motor housing 3261, a motor flange portion 3262, a bellows portion 3263 and a drain motor (not illustrated).

The motor housing 3261 forms the exterior of the drain motor unit 3260, and the drain motor is installed in the motor housing 3261.

The motor flange portion 3262 protrudes in a ring shape on the outside of the motor housing 3261. As the motor flange portion 3262 is detachably coupled to the connection flange portion 3241 of the bellows movement portion 3240, the drain motor unit 3260 is coupled to the bellows movement portion 3240.

The bellows portion 3263 expands and/or contracts by the operation of the drain motor.

When the drain process is intended to be stopped, the drain motor expands the length of the bellows portion 3263 (refer to FIG. 60). Thus, the length of the bellows portion 3263 is expanded until the bellows portion 3263 reaches the central bump 3231 and closes the internal flow path of the central pipe portion 3230. Then, since the wash water cannot move to the bellows movement portion 3240 from the central pipe portion 3230 (or move through the bellows movement portion 3240), the process for draining wash water is stopped.

When the drain process is intended to be started or resumed, the drain motor contracts the length of the bellows portion 3263 (refer to FIG. 59). Thus, the bellows portion 3263 returns to the original position and opens the internal flow path of the central pipe portion 3230. Then, since the wash water may be moved to the bellows movement portion 3240 from the central portion 3230 (or through the bellows movement portion 3240), the process for draining wash water is performed.

A section where the bellows portion 3263 moves inside the bellows movement portion 3240 (that is, a range in which the bellows portion 3263 expands and contracts) is indicated by symbol S. The motion section S of the bellows portion 3263 refers to a section from a point where the contracted bellows portion 3263 is positioned to a point where the bellows portion 3263 is expanded to the maximum. The point where the bellows portion 3263 is expanded to the maximum corresponds to a position of the central bump 3231.

The drain hose unit 3270 is connected to the connection pipe portion 3210, or more specifically, the discharge hole portion 350 so as to receive wash water from the discharge hole portion 3250. The drain hose unit 3270 has a flow path therein through which wash water may flow.

In the drain device 3200 in accordance with embodiment(s) of the present invention, foreign matter in wash water discharged from the tub 3120 having a large volume or size is filtered by the drain hose unit 3270. Representative examples of such foreign matter may include a coin C, a button and the like.

The coin C in wash water discharged from the tub 3120 passes through the connection pipe portion 3210 and is then filtered at the discharge hole portion 3270. That is, the coin C must pass without being caught in the internal flow path in the connection pipe portion 3210 corresponding to the upstream side of the discharge hose portion 3270.

For this structure, the discharge hole portion 3250 has a maximum inner-diameter portion that overlaps the motion section S of the bellows portion 3263 (refer to FIG. 59). That is, since the motion section S of the bellows portion 3263 overlaps not only the discharge hole portion 3250 but also the maximum inner-diameter portion of the discharge hole portion 3250, it is possible to secure a space through which the coin C may be moved toward the downstream side.

Thus, the coin C is not caught in the connection portion between the bellows movement portion 3240 and the discharge hole portion 3250, but is introduced into the drain hose unit 3270 through the discharge hole portion 3250.

In order to secure the maximum space through which the coin C passes, the centers of the maximum inner-diameter portion of the discharge hole portion 3250 and the motion section S of the bellows portion 3263 must be on the same line.

In the present embodiment, since the internal flow path of the discharge hole portion 3250 has a circular shape, the maximum inner-diameter portion of the discharge hole portion 3250 (or the center thereof) indicates the center of the discharge hole portion 3250. Furthermore, the inner diameter of the discharge hole portion 3250 may be up to three times larger than the motion section S of the bellows portion 3263.

The lowermost part of the inner circumference of the discharge hole portion 3250 connected to the bellows movement portion 3240 is under the lowermost part of the inner circumference of the central pipe portion 3230 such that the coin C passes without being caught in the internal flow path of the connection pipe portion 3210.

Thus, the coin C discharged from the central pipe portion 3230 is naturally introduced toward and/or into the discharge hole portion 3250 when the wash water is discharged by a level difference.

The discharge hole portion 3250 is coupled to the inner surface of the drain hose unit 3270. In accordance with the present embodiment, the drain hose unit 3270 may comprise a deformable material, and the discharge hole portion 3250 has an outer diameter equal to or slightly larger than the inner diameter of the drain hose unit 3270.

Thus, when the discharge hole portion 3250 is forcibly inserted into the inner surface of the drain hose unit 3270, the discharge hole portion 3250 is coupled to the inner surface of the drain hose unit 3270 while the diameter of the drain hose unit 3270 is expanded. Then, the drain hose unit 3270 may be reliably coupled to the discharge hole portion 3250.

In addition, a pressurizing member may be installed on the drain hose unit 3270 surrounding the discharge hole portion 3250 such that the drain hose unit 3270 is not separated from the discharge hole portion 3250.

The drain hose unit 3270 includes a first hose portion 3271, a catch hose portion 3272, a second hose portion 3273, and a foreign matter collection portion 3274.

The first hose portion 3271 is coupled to the discharge hole portion 3250 while surrounding the discharge hole portion 3250, and has a flow path therein, through which the coin C as well as wash water may pass.

One side of the catch hose portion 3272 is connected to the first hose portion 3271, and another side of the catch hose portion 3272 is connected to the second hose portion 3273. The lock hose portion 3273 has an internal flow path of which the cross-sectional area increases as the distance from the first hose portion 3271 increases, that is, as the distance from the second hose portion 3273 decreases.

In accordance with the present embodiment, the coin C arriving at the drain hose unit 3270 is caught by the catch hose portion 3272. Thus, the minimum diameter of the catch hose portion 3272 may be set in consideration of the size of a coin C, button, or other similarly sized object in common use.

The second hose portion 3273 is connected to the catch hose portion 3272. The second hose portion 3273 has the same diameter as the minimum diameter of the catch hose portion 3272. Since the coin C in wash water discharged from the tub 3120 is caught in the catch hose portion 3272, the second hose portion 3273 passes the wash water excluding the coin C to the downstream side.

The foreign matter collection portion 3274 is connected to the catch hose portion 3272 so as to collect and/or retain the coin C caught by the catch hose portion 3272. The foreign matter collection portion 3274 extends toward the ground from the catch hose portion 3272 such that the coin C or other object having a density greater than that of water is easily caught.

The cap unit 3280 is detachably installed in the foreign matter collection unit 3274. Thus, the coin C collected in the foreign matter collection unit 3274 during the process of draining wash water is not discharged to the outside of the foreign matter collection unit 3274 due to the cap unit 3280. After the drain process ends, a user may detach the cap unit 3280 from the foreign matter collection portion 3274, thereby easily picking up the coin C or other object in the foreign matter collection portion 3274.

Furthermore, since the cap unit 3280 is on the housing of the washing machine 3100, or more specifically, the cover portion 3163 and is exposed to the outside, the user may detach the cap unit 3280 without disassembling the housing of the washing machine 3100.

As described above, foreign matter having a large volume or size, such as the coin C, in the wash water discharged from the tub 3120 may be collected. Thus, the drain process may be smoothly performed, and a malfunction or breakdown of the washing machine caused by clogging of the drain path may be prevented.

Furthermore, since the coin C and the like filtered during the drain process may be collected without disassembling the housing of the washing machine, the operation speed and convenience of machine use may be improved.

FIG. 63 is a perspective view of a modification of the washing machine in accordance with embodiment(s) of the present invention.

Referring to FIG. 63, the washing machine in accordance with embodiment(s) of the present invention includes a cabinet 3310, a tub 3320, a drum 3330, a driving unit 3340, a balancer (not illustrated), a plurality of springs 3360, and a plurality of dampers 3370. The cabinet 3310 forms the exterior of the washing machine. The tub 3320 is positioned between front and rear plates of the cabinet 3310 and is configured to contain wash water therein. The drum 3330 in the tub 3320 is rotatable, and houses laundry therein. The driving unit 3340 generates power to rotate the drum 3330. The balancer is coupled to the front surface of the tub 3320. The springs 3360 serve to absorb vibration of the tub 3320. The dampers 3370 serve to reduce vibration of the tub 3320. The washing machine in accordance with embodiment(s) of the present invention is not a wall-mounted drum washing machine, but a typical drum washing machine.

The cabinet 3310 includes a laundry input hole (not illustrated) in the front plate thereof, through which laundry is put, and a door (not illustrated) to open/close the laundry input hole.

The tub 3320 is installed in the cabinet 3310, and has a hollow cylindrical shape lying on its side (as shown). The tub 3320 generally has an opening (not illustrated) at the rear side of the laundry input hole.

A water supply device (not illustrated) configured to supply wash water into the tub 3320 and a detergent housing (not illustrated) configured to supply detergent are provided at the top of the tub 3320. The rotatable drum 3330 is installed in the tub 3320.

The drum 3330 also has a hollow cylindrical shape like the tub 3320, and has an opening (not illustrated) at the rear side of the laundry input hole. The drum 3330 has a through-hole (not illustrated) in a side surface thereof, through which wash water in the tub 3320 passes, and a lifter 3335 mounted on the inner circumferential surface thereof so as to move laundry.

The driving unit 3340 generates power to rotate the drum 3330. The driving unit 3340 includes a motor 3341, a motor pulley 3342, a drum pulley 3343, and a belt 3344.

The motor 3341 is at the bottom rear side of the tub 3320, and serves to generate power. The motor pulley 3343 is connected to the motor 3341, and the drum pulley 3343 is connected to the drum 3330. One side of the belt 3344 contacts the motor pulley 3342, and another side of the belt 3344 contacts the drum pulley 3343.

The torque generated by the motor 3341 is transmitted to the motor pulley 3342. Then, the torque is transmitted to the drum pulley 3343 on the rear surface of the drum 3330 through the belt 3344, thereby rotating the drum 3330. The motor pulley 3342 and the drum pulley 3343 have a groove portion in the centers thereof so that the belt 3344 does not come off the pulleys.

The balancer is coupled to the front surface of the tub 3320. The balancer includes a body having a predetermined mass to rapidly reduce vibration generated during the washing process, and a housing having an internal space therein so as to guide the motion of the mass body.

The top of the spring 3360 is coupled to the top of a side plate of the cabinet 3310, and the bottom of the spring 3360 is coupled to the top surface of the tub 3320. Thus, the spring 3360 supports the tub 3320, and absorbs vibration of the tub 3320, which is generated during the washing process.

In one embodiment, two springs 3360 may be coupled to the left and right sides of the tub 3320, respectively, and absorb vibration generated by the motions of the tub 3320 in up to four directions.

The top of the damper 3370 is coupled to the bottom surface of the tub 3320, and the bottom of the damper 3370 is coupled to a bottom plate of the cabinet 3310. Thus, the damper 3370 reduces vibration of the tub 3320 generated during the washing process.

In another embodiment, two dampers 3370 may be coupled to the left and right sides of the tub 3320, respectively, and reduce vibration generated by the motions of the tub 3320 in up to four directions.

The lifter 3335 is on the inner circumference of the drum 3330 so as to face the central portion of the drum 3330. The lifter 3335 lifts laundry housed in the drum 3330 through the rotation of the drum 3320.

The drain device 3200 is connected to the tub 3320, and serves to discharge wash water from the tub 3320 to the outside of the washing machine. The drain device 3200 in accordance with embodiment(s) of the present invention may filter foreign matter having a large volume, such as coin or button, in wash water discharged from the tub 3320.

The drain device 3200 in accordance with the present embodiment has the same configuration and operational effect(s) as the drain device 3200 applied to the wall-mounted drum washing machine 3100. Thus, the detailed descriptions of the drain device 3200 in accordance with the present embodiment are omitted herein.

In accordance with various embodiments of the present invention, the drain filter may be used to effectively filter foreign matter contained in wash water discharged to the outside, and the foreign matter collected in the drain filter may be conveniently removed.

Furthermore, the water supply pipe connection unit may be stably fixed and installed to the water supply pipe, and wash water introduced into the diverging connection unit may be stably supplied to the main washing machine and a sub (e.g., second or auxiliary) washing machine through the main hose connection unit and the sub hose connection unit which are coupled to the diverging connection unit. That is, wash water supplied from one water supply pipe may be stably induced to a plurality of water supply hoses.

Furthermore, the valve unit may be rotationally manipulated to simply open/close the internal flow path of the sub hose connection unit.

Furthermore, when the main washing machine and the sub washing machine are operated together, the valve unit may be manipulated to open the internal flow path of the sub hose connection unit, thereby stably supplying wash water to the main washing machine and the sub washing machine.

Furthermore, when the sub washing machine is not operated, but only the main washing machine is operated, the valve unit may be manipulated to close the internal flow path of the sub hose connection unit, thereby stably blocking the supply of wash water to the sub washing machine.

Furthermore, when the main washing machine is not operated but only the sub washing machine is operated, a cap may be coupled to the end of the diverging connection unit instead of the main hose connection unit, thereby stably blocking the supply of wash water to the main washing machine.

Furthermore, since the backflow of wash water may be blocked at multiple points, it is possible to prevent a malfunction or breakdown of the main washing machine.

Furthermore, the filter unit may block foreign matter from being introduced into a check valve device. Thus, it is possible to prevent a reduction in the backflow prevention performance, which may be caused by foreign matter.

Furthermore, since foreign matter having a large volume or size in the wash water discharged from the tub may be collected, the drain process may be smoothly performed.

Furthermore, it is possible to prevent a malfunction or breakdown of the washing machine that may occur when a foreign matter such as coin or button blocks the drain path.

Furthermore, since foreign matter filtered during the drain process may be collected without disassembling the housing of the washing machine, the operation speed and convenience of use may be improved.

Embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A washing machine comprising:
   a rear panel configured to be mounted on a wall;
   a tub supported by the rear panel and configured to contain wash water, the tub integrally formed with the rear panel;
   a front panel having a first opening therein, on or in front of the tub;
   a rotatable drum in the tub;
   a driving unit providing power to the drum;
   a cover on the rear panel and covering the tub and the front panel;
   a water supply device configured to supply wash water to the tub; and
   a drain device having a drain filter in a wash water discharge path, the drain filter being configured to filter foreign matter in the wash water,
   wherein the drain filter comprises:
   a filter main body communicating with a drain hole in the tub and having a bottom side exposed through the cover and a drain opening in the bottom side; and
   a filter cap unit coupled to the drain opening and having a filter portion configured to filter foreign matter in the wash water passing through the filter main body,
   wherein the filter main body comprises:
   a tub connection portion connected to the tub and configured to communicate with the drain hole;
   a central portion having a hollow shape and connected to a bottom of the tub connection portion;
   an actuator installation portion connected to and/or communicating with one side of the central portion to receive an end portion of an actuator;
   a hose connection portion connected to and/or communicating with a rear surface of the actuator installation portion, wherein the hose connection portion is closed or opened by moving of the actuator, the hose connection portion is provided at bottom of the actuator installation portion, and when the hose connection portion is opened, the wash water is discharged from the actuator installation portion through the hose connection portion; and
   a cap coupling portion having an open bottom side, configured to communicate with a bottom of the central portion, and coupled to the filter cap unit,
   wherein the rear panel is greater than the diameter of the tub, and
   wherein the rear panel is served as a mounting member to fix the wall-mounted drum washing machine on the wall.

2. The washing machine of claim 1, wherein the filter cap unit comprises a main body coupling portion rotatably coupled to a cap coupling portion, configured to cover an opening in the filter main body.

3. A washing machine comprising:
   a rear panel configured to be mounted on a wall;
   a tub supported by the rear panel and configured to contain wash water, the tub integrally formed with the rear panel, the tub integrally formed with the rear panel;
   a front panel having an opening therein, on or in front of the tub;
   a rotatable drum in the tub;
   a driving unit providing power to the drum;
   a cover on the rear panel covering the tub and the rear panel;
   a water supply device configured to supply the wash water to the tub; and
   a drain device having (i) a drain filter in a wash water discharge path, configured to filter foreign matter in the wash water, and (ii) a filter cap detachably attached to the drain filter, an inside of which is opened or closed by detaching/attaching the drain filter,
   wherein the drain filter comprises a filter main body communicating with a drain hole in the tub, forming a flow path to discharge wash water outside of the rear panel or the cover, the filter main body having a bottom side exposed through the cover, the filter cap unit opening to expose the drain filter and closing to cover the drain filter,
   wherein the filter main body comprises:
   a tub connection portion connected to the tub and configured to communicate with the drain hole;
   a central portion having a hollow shape and connected to a bottom of the tub connection portion;
   an actuator installation portion connected to and/or communicating with one side of the central portion to receive an end portion of an actuator; and
   a cap coupling portion having an open bottom side, configured to communicate with a bottom of the central portion, and assembled with the filter cap unit,
   wherein the cap coupling portion comprises:
   a groove portion including a flange portion contacting one surface of the filter cap unit and a circumference portion on the circumference of the flange portion so as to protrude downward and contact the outer surface of the filter cap unit;
   a pair of guide bumps on the groove portion so as to protrude inward and form a slit into which coupling portions on the filter cap unit are inserted while moving along a circular trace;
   an assembling protrusion having one or more spaces between the pair of guide bumps facing each other; and
   a hose connection portion connected to and/or communicating with a rear surface of the actuator installation portion, wherein the hose connection portion is closed or opened by moving of the actuator, the hose connection portion is provided at bottom of the actuator installation portion, and when the hose connection portion is opened, the wash water is discharged from the actuator installation portion through the hose connection portion; and
   wherein the filer cap unit comprises:

a first coupling portion extending along the outer surface of the filter cap unit, between the guide bump and the assembling protrusion, and inserted into one of the pair of guide bumps; and a second coupling portion having a larger width than a distance between the guide bump and the assembling protrusion, configured to face the first coupling portion and inserted into the other of the pair of guide bumps, wherein the rear panel is greater than the diameter of the tub, and wherein the rear panel is served as a mounting member to fix the wall-mounted drum washing machine on the wall.

4. The washing machine of claim 3, wherein the filter cap unit comprises:

a main body coupling portion rotatably coupled to the filter main body and blocking or covering an opening in the filter main body; and a filter portion protruding at one side of the main body coupling portion, in the filter main body across a wash water flow path inside the filter main body, and configured to filter foreign matter in the wash water.

5. The washing machine of claim 3, wherein the filter cap further comprises:

a depressed groove portion having a concave upward shape at a bottom side exposed through the cover; and a manipulation portion having a handle that protrudes in the depressed groove portion.

\* \* \* \* \*